(12) United States Patent
McCullough et al.

(10) Patent No.: US 11,255,316 B2
(45) Date of Patent: Feb. 22, 2022

(54) PUMP

(71) Applicant: Jacobsen Innovations, Inc., Salt Lake City, UT (US)

(72) Inventors: John McCullough, Salt Lake City, UT (US); Wayco Scroggin, Sandy, UT (US)

(*) Notice: Subject to any disclaimer, the term of this patent is extended or adjusted under 35 U.S.C. 154(b) by 115 days.

(21) Appl. No.: 16/277,623

(22) Filed: Feb. 15, 2019

(65) Prior Publication Data

US 2019/0316573 A1 Oct. 17, 2019

Related U.S. Application Data

(60) Provisional application No. 62/631,294, filed on Feb. 15, 2018, provisional application No. 62/631,338, filed on Feb. 15, 2018, provisional application No. 62/631,285, filed on Feb. 15, 2018.

(51) Int. Cl.
| | |
|---|---|
| *F04B 7/00* | (2006.01) |
| *F16K 31/524* | (2006.01) |
| *F04B 9/04* | (2006.01) |
| *F04B 7/04* | (2006.01) |

(52) U.S. Cl.
CPC .......... *F04B 7/0053* (2013.01); *F04B 7/0057* (2013.01); *F04B 7/0092* (2013.01); *F16K 31/524* (2013.01); *F16K 31/52408* (2013.01); *F16K 31/52425* (2013.01); *F16K 31/52441* (2013.01); *F04B 7/0069* (2013.01); *F04B 7/04* (2013.01); *F04B 9/042* (2013.01)

(58) Field of Classification Search
CPC .... F04B 7/0057; F04B 7/0053; F04B 7/0092; F16K 31/524; F16K 31/52425; F16K 31/52441; F16K 31/52408; F16K 15/183; F16K 15/185
See application file for complete search history.

(56) References Cited

U.S. PATENT DOCUMENTS

| | | | | |
|---|---|---|---|---|
| 1,340,596 | A | * | 5/1920 | Boulade ..................... F04F 1/02 417/149 |
| 1,340,597 | A | * | 5/1920 | Boulade ................... F04B 7/04 417/149 |
| 2,225,541 | A | * | 12/1940 | Werner ............. F16K 31/52408 251/262 |
| 2,308,974 | A | * | 1/1943 | Harper ................... F04B 43/02 417/510 |

(Continued)

FOREIGN PATENT DOCUMENTS

| | | | | |
|---|---|---|---|---|
| GB | 1212647 A | * | 11/1970 | .......... E21D 15/585 |
| JP | 2005273865 | | 10/2005 | |

*Primary Examiner* — Christopher S Bobish
(74) *Attorney, Agent, or Firm* — Morriss O'Bryant Compagni Cannon, PLLC

(57) ABSTRACT

A pump includes a pair of valves, coupled to a camshaft that selectively opens and closes the valves such that when one valve opens the other valve closes. The valves are in fluid communication with a piston chamber. A crankshaft operates a piston in a piston cylinder with the opening and closing of the valves such that as the piston is drawn from the piston chamber, the inlet valve is open and the outlet valve is closed and when the piston is forced into the chamber, the outlet valve is open and the inlet valve is closed. The camshaft and crankshaft are coupled together to cause synchronous operation of the valves and piston.

65 Claims, 31 Drawing Sheets

(56) References Cited

U.S. PATENT DOCUMENTS

| | | | |
|---|---|---|---|
| 3,179,057 A | 4/1965 | Cosner | |
| 3,246,872 A | 4/1966 | Seltsam | |
| 3,282,049 A | 11/1966 | Benton | |
| 3,477,693 A * | 11/1969 | Bezanis | F16K 7/16 251/251 |
| 3,565,298 A * | 2/1971 | Ohlin | F04B 53/14 222/309 |
| 3,613,729 A * | 10/1971 | Dora | F16K 31/524 137/614.18 |
| 3,743,245 A | 7/1973 | Demler | |
| 3,951,574 A * | 4/1976 | Panuline | F04B 1/066 417/510 |
| 4,236,881 A * | 12/1980 | Pfleger | F04B 7/0053 417/502 |
| 4,298,183 A * | 11/1981 | Kawakami | F16K 31/52408 251/263 |
| 4,395,205 A | 7/1983 | McCullough | |
| 4,457,340 A * | 7/1984 | Krueger | B29B 7/801 137/533.11 |
| 4,804,164 A * | 2/1989 | Nakazawa | F16K 31/52408 251/335.3 |
| 4,990,066 A * | 2/1991 | Kern | F04B 43/04 417/307 |
| 5,088,515 A * | 2/1992 | Kamen | F16K 31/005 137/15.17 |
| 5,108,069 A | 4/1992 | Tada et al. | |
| 5,113,899 A * | 5/1992 | Yonezawa | F16K 15/18 137/461 |
| 5,549,274 A * | 8/1996 | Buchanan | F02M 59/466 251/129.14 |
| 6,164,269 A * | 12/2000 | Feucht | F16K 15/185 123/568.11 |
| 6,564,547 B1 | 5/2003 | Potma | |
| 6,588,724 B2 * | 7/2003 | Yie | F16K 31/3835 251/34 |
| 6,953,183 B2 * | 10/2005 | Uryu | F16K 31/0665 251/129.08 |
| 7,093,615 B2 * | 8/2006 | Shane | E03C 1/086 137/801 |
| 7,845,330 B2 * | 12/2010 | Villaire | F02M 63/0225 123/179.9 |
| 9,140,244 B2 * | 9/2015 | Henderson | F04B 1/32 |
| 10,493,476 B2 * | 12/2019 | Micnerski | F04B 9/14 |
| 10,648,582 B2 * | 5/2020 | Imamura | F16K 15/18 |
| 2006/0013701 A1 | 1/2006 | Boos et al. | |
| 2006/0159574 A1 * | 7/2006 | Winiger | F04B 7/0053 417/510 |
| 2007/0284553 A1 * | 12/2007 | Franconi | F16K 15/183 251/129.14 |
| 2009/0060756 A1 * | 3/2009 | Jones | A61M 60/40 417/254 |
| 2010/0043901 A1 | 2/2010 | Richardson et al. | |
| 2010/0284841 A1 | 11/2010 | Jahn et al. | |
| 2011/0268590 A1 * | 11/2011 | Stein | F04B 49/24 417/298 |
| 2012/0137667 A1 | 6/2012 | Jacobsen et al. | |
| 2018/0209414 A1 * | 7/2018 | Lumkes | F04B 7/0069 |

\* cited by examiner

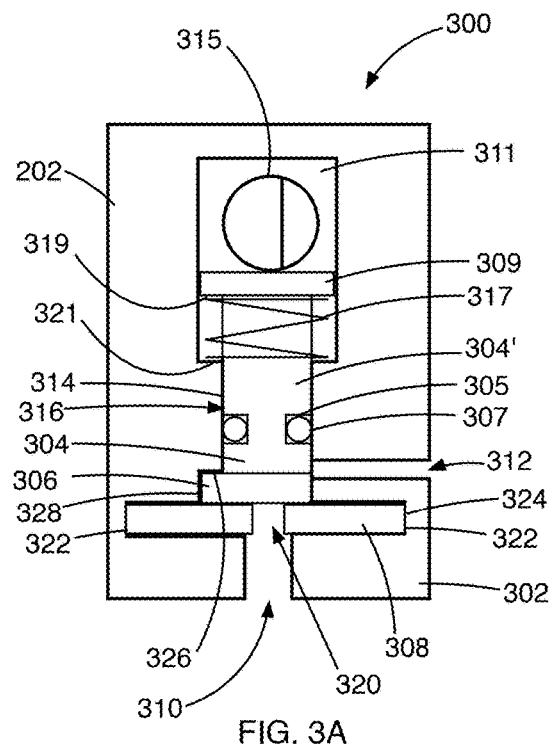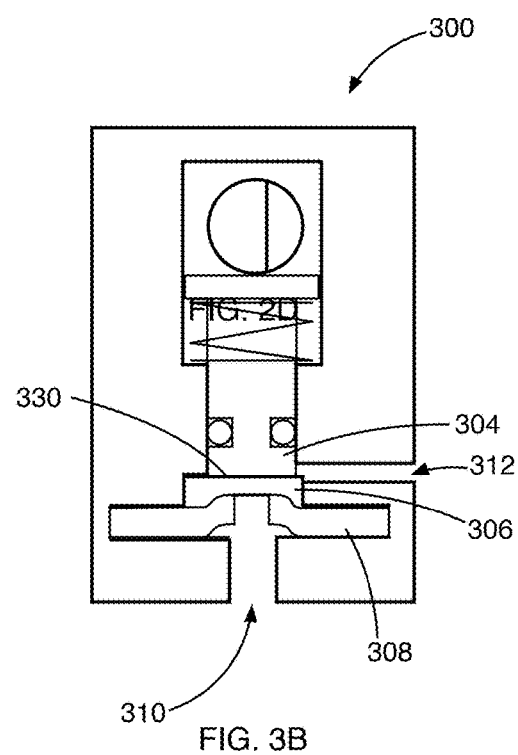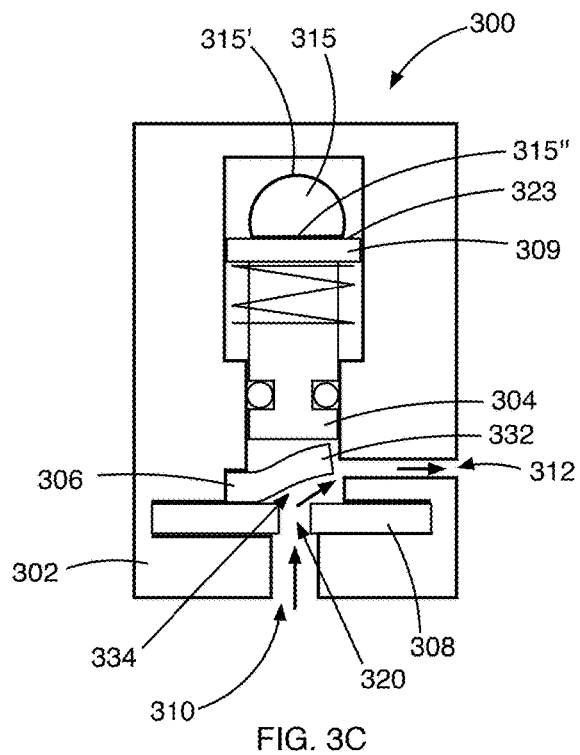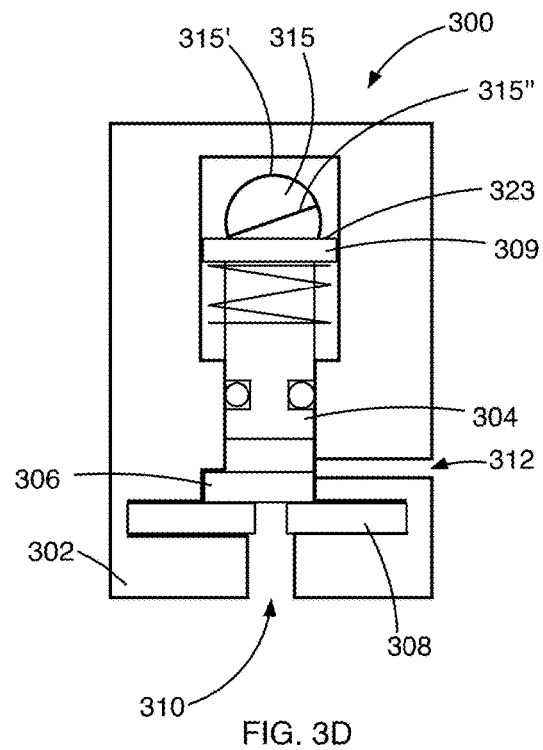

PUMP

CROSS-REFERENCE TO RELATED APPLICATION

This application claims priority to U.S. Provisional Patent Application Ser. No. 62/631,285, filed on Feb. 15, 2018, and U.S. Provisional Patent Application Ser. No. 62/631,294, filed on Feb. 15, 2018, and U.S. Provisional Patent Application Ser. No. 62/631,338, filed on Feb. 15, 2018, the entirety of each of which is incorporated by this reference.

BACKGROUND

Field of the Invention

The present invention relates generally to pumps and systems utilizing such pumps, and more particularly to pumps for use in medical devices, such as drug pumps or other applications where highly efficient and effective pumps have particular applicability.

State of the Prior Art

Pumps using common direct force type valve seals have many disadvantages. In prior art direct force valve seals, a hard valve head is forced into a soft elastomer seal. A direct force valve must always seal to the maximum possible system pressure every time it seals, regardless of system pressure. This characteristic of direct for valves makes them inefficient to repeatedly open and close. In some hydraulic systems, especially such hydraulic systems that rely on battery power or hydraulic systems that employ many valves, energy use is at a premium. High-energy consumption of a hydraulic system is readily apparent in a peristaltic pump. A peristaltic pump essentially makes a direct force seal every section of the tube it compresses and it compresses the entire length of the tube at least three times for each pump cycle. As a result, a peristaltic pump consumes a significant amount of energy during operation. The difference between a direct force valve of a piston pump and a peristaltic pump is that in a direct force valve the valve only has to seal a small area once every cycle instead of sealing the entire length of the tube of a peristaltic pump. A direct force valve also requires sufficient power to force the valve head against the seal. Note that the force to seal this valve has to be the amount of force necessary to seal against 100 psi even though it only operates at 3 psi or less. Thus, a direct force valve is an inefficient way to provide a valve seal.

Pumps that use close fit valve seals, such as those in servo valves, also have a number of distinct disadvantages. For example, close fit valves always have some level of leakage. Moreover, close fit valves are expensive to manufacture.

Advantages

The pumps of the present invention are reliable, capable of accurate and repeatable operation and inexpensive to manufacture. Furthermore, the pumps of the present invention can be used in various fluid-type systems, such as drug delivery systems, pumps, and the like.

SUMMARY OF THE INVENTION

The pumps of the present invention can be inexpensively manufactured while providing a complete seal when activated so as to not allow fluid to be forced through a system that employs the valves of the present invention. A pump according to the present invention comprises a pump housing with first and second valves housed within the pump housing. Each valve comprises a valve body defining an inner chamber in fluid communication with a valve inlet and a valve outlet, a valve head positioned within the inner chamber, the valve head moveable between a first position and a second position, a valve seal defining an aperture in fluid communication with the valve inlet and having a sealing surface, a bi-directional sealing member positioned between a the valve head and the valve seal, the bi-directional sealing member movable between a first closed position where the bi-directional sealing member engages with the sealing surface of the valve seal to seal the aperture and a second open position where the bi-directional sealing member can disengage from the sealing surface of the valve seal to allow flow through the aperture of the valve seal, and a cam engaged with a first surface of the valve head, whereby rotation of the cam causes movement of the valve head between the first position and the second position and whereby movement of the valve head to the first position holds the bi-directional sealing member in the first closed position. The pump also includes a piston and a piston chamber with the piston chamber in fluid communication with an outlet of the first valve and an inlet of the second valve above the piston. A camshaft comprises first and second cams, with the first cam engaging a valve head of the first valve and the second cam engaging a valve head of the second valve. The first and second cams are oriented to open the first valve when the second valve is closed and to close the second valve when the first valve is open. A crankshaft is coupled to the piston for moving the piston within the piston chamber. The crankshaft is configured to move the piston in a first direction when the first valve is open and the second valve is closed to draw fluid through the first valve and into the piston chamber and to move the piston in a second direction when the second valve is open and the first valve is closed to force the fluid from the piston chamber through the second valve.

In another embodiment, the crankshaft and camshaft are integrally formed with the crankshaft extending from a distal end of the camshaft.

In another embodiment, the inner chamber of each valve defines an inner cylindrical wall and the valve head is sized and shaped to slidably engage the inner cylindrical wall and the bidirectional sealing member is disc-shaped.

In another embodiment, the valve inlet of each valve is positioned below the sealing member and the outlet comprises a port in fluid communication with the inner chamber at a position above the sealing member.

In another embodiment, each valve further comprises a head seal interposed between the valve head and the inner wall to form a slidable seal therein between.

In another embodiment, the valve seal of each valve comprises a flexible flap held in a fixed position along a first side relative to the inner chamber and sealed to one side of the sealing surface and having a second side that is free to move from a resting position on the sealing surface to a flexed position into the inner chamber where the second side disengages from he sealing surface with a change in fluid pressure between the inlet and the outlet to allow a flow through the inlet.

In another embodiment, the sealing member of each valve is disc-shaped having an outer rim portion that is fixed to the sealing surface, defines a central aperture that is in fluid communication with the inlet, and has a flexible inner portion around the aperture that can move from a resting position to a flexed position where the flexible portion extends into the inner chamber.

In another embodiment, the valve head of each valve comprises a body portion having a distal end for engagement with the sealing member and a proximal end defining a cam engagement surface in contact with the cam, whereby rotation of the cam causes movement of the valve head between the first position and the second position.

In another embodiment, the cam shaft comprises first and second cams, one for each of the first and second valves, each cam having a generally cylindrical body having a semicircular side and a flat side that forms a chordally extending surface, the flat side of the first cam oriented 180 degrees from the flat side of the second cam.

In another embodiment, the first and second cams of each of the first and second valves, for a respective valve, each force the valve head toward the sealing member when the semicircular side engages the valve head and allows the valve head to move in a direction away from the sealing member when the flat side engages the valve head.

In another embodiment, each of the first and second valves comprise a biasing member interposed between the valve head and the inner chamber to apply a biasing force the valve head away from the sealing member, the cam providing sufficient force against the valve head when the semicircular side of the cylindrical body forces the valve head toward the sealing member to overcome the biasing force of the biasing member.

In another embodiment, each of the first and second valves comprise a spherical member interposed between a distal end of the valve head and the sealing member, the spherical member having a diameter greater than a diameter of the aperture of the sealing member.

In another embodiment, when the valve head is in the first position, the distal end of the valve head forces the spherical member into engagement with the sealing member to seal the inlet and when the valve head is in the second position, the valve head moves in a direction away from the spherical member to open the inlet.

In another embodiment, when the valve head is in transition between the first position and the second position, a pressure differential between the inlet and the outlet causes the inner portion to flex and seal against the spherical member until the valve head moves to the second position.

In another embodiment, a motor is coupled to the cam shaft to control rotation of the cams and thereby control opening and closing of the first and second valves.

In another embodiment, the cam of the first valve and the cam of the second valve are synchronized in their respective rotations such that when the first valve is open, the second valve is closed and when the second valve is open, the first valve is closed.

In another embodiment, the cam of the first valve and the cam of the second valve are synchronized in their respective rotations such that when the first valve is open, the second valve is closed and when the second valve is open, the first valve is closed.

In another embodiment, the crankshaft further comprises a crank arm coupled thereto with the crank arm coupled to a crank member at a distal end of the crankshaft, the crank member extending from the crankshaft at a position offset from a center axis of the crankshaft so that as the crankshaft rotates, the crank arm moves in a circular motion, which motion is determined by a radial distance the crank member is from a center of rotation of the crankshaft.

In another embodiment, a distal end of the crank arm is coupled to the piston to drive the piston vertically back and forth within the pump chamber as the crank arm pushes or pulls the piston as the crank member rotates.

In another embodiment, a pump body defines a vertical slot in a side of the pump body to provide an opening for the distal end of the crank arm to be coupled to the piston, the slot being sufficiently long enough to allow full range of motion of the crank arm with the piston 1646 sealed to the pump body above the slot.

In another embodiment, a priming pump is coupled to an inlet of the first valve.

In another embodiment, a check valve is in fluid communication with an inlet of the pump housing to prevent back flow from the priming pump.

In another embodiment, a lever member is pivotally attached to the pump housing, a first side of the lever coupled to the distal end of the crank arm, and further comprising a perpendicularly extending rod extending from the distal end of the crank arm, the rod engaging with a lever bar attached to and perpendicularly extending from a proximal end of the lever, the distal end of the lever being coupled to a body of a piston of the priming pump so that actuation of the priming pump is synchronized with the movement of the cam shaft.

In another embodiment, at a beginning of a pump cycle, fluid is drawn into the inlet 1 the pump housing by the priming pump and as the first valve opens, the direction of the priming pump is reversed so as to force fluid into the inlet of the first valve to provide an initial priming of fluid into the first valve and help offset a volume of empty space of the pump at the start up of the pump.

In one embodiment of a valve in accordance with the present invention, the valve is comprised of a valve body within which is contained a valve head, valve closing member and valve seal. The valve body includes a fluid inlet and a fluid outlet. The valve head resides within a cylinder wall and is vertically movable within the space defined by the cylinder wall. The valve seal resides above the inlet and includes a central aperture that is arranged concentrically with the inlet so that fluid flowing through the inlet can flow through the central aperture. The valve seal is retained on its outer perimeter by a seal recess formed within the valve body. The valve closing body may be a valve flap that is held along one side to the valve body with the other side of the valve flap able to lift relative to the valve seal. The valve closing body may alternatively be a valve ball that is able to close the valve seal when in contact therewith and to open the valve seal when moved away from the valve seal.

The inlet is a port in the valve body on the valve seal side. The outlet is a port in the valve body that enters the valve head chamber. When the valve head is mechanically timed to be open and the outlet pressure is higher than the inlet pressure, the resulting reverse fluid flow forces the valve closing body against the valve seal, thus stopping the flow of fluid through the valve. The pressure differential forces the valve closing member into the valve seal to self-energize the seal into a closed position. When the valve head is mechanically timed to be open and the inlet pressure is higher than the outlet, then the pressure differential lifts the valve closing member to allow flow through the valve. When the valve head is mechanically timed to be closed and the outlet pressure is higher than the inlet pressure, the pressure differential forces the valve closing member into the valve seal to stop flow and the valve head has the valve closing member against the valve seal so that no flow occurs to move the valve closing member into the valve seal. When the valve head is mechanically timed to be closed and the inlet pressure is higher than the outlet pressure, the pressure differential wants to lift the valve closing member away from the valve seal. The position of the valve head, however, holds the valve closing member in place and the differential pressure lifts the valve seal into the valve closing member, thus energizing the seal. As such the seal lifts into the valve closing member to increase the sealing contact between the valve closing member and the valve seal. Moreover, no fluid flow is necessary to move the valve closing member into the valve seal. Conversely, in a typical check valve there is always some back flow of fluid required to close the check valve. The valve of the present invention is mechanically timed so that the valve head moves the valve closing member into a closed position. When mechanically timed to be open, the valve closing member acts like a typical check valve and is subject to some closing back flow, but when mechanically timed to be closed it is already in a closed position.

As discussed herein, the valves of the present invention utilize a bi-directional self-energizing seal. In another embodiment of a valve in accordance with the present invention the valve is comprised of a valve body within which is contained a valve head and a self-energizing valve seal. The valve body includes a fluid inlet and a fluid outlet. The valve head resides within a cylinder wall and is vertically movable within the space defined by the cylinder wall. The valve seal resides above the inlet and includes a central aperture that is arranged concentrically with the inlet so that fluid flowing through the inlet can flow through the central aperture. The valve seal is retained on its outer perimeter by a seal recess formed within the valve body. Here, the valve head need only make contact with the self-energizing valve seal. When the valve is closing, the valve head is moved closer to the valve seal. As the gap between the valve seal gets smaller the flow velocity in the gap between the valve head and the valve seal increases to create a Bernouli effect that lifts the valve seal into contact with the valve head. As a result, the Bernouli effect quickly closes the valve with low system energy even against a pressure differential. When the valve seal touches the valve head, a positive flow of fluid through the valve immediately stops and a positive pressure differential between the inlet and outlet of the valve will lift the valve seal into the valve head. If there is a negative pressure differential between the inlet and the outlet (i.e., the outlet pressure is greater than the inlet pressure), the fluid pressure from outlet will force the valve head into the valve seal. Because the valve seal is able to lift itself into contact with the valve head, which is opposite from prior art valves, and because the valve head can be forced into the valve seal, the valve of the present invention is capable of bi-directional, self-energizing operation. When the valve opens, if there is a positive pressure differential with the inlet side being higher than the outlet side, the positive pressure differential assists in opening the valve.

Once contact with the valve head is made upon the seal, the seal uses the fluid pressure of fluid flowing through the valve to energize the seal. As the fluid pressure increase, the seal increases its sealing force. Thus when operating at low pressure, such as 3 psi, the seal only uses enough force to seal 3 psi. At higher pressure, such as 100 psi, the self-energizing seal automatically increases its sealing force and prevents fluid flow through the valve.

The bi-directional self-energizing seals of the present invention require low energy to operate, but are capable of sealing against high pressure, such as a 100 psi or more pressure drop, regardless of whether the pressure on the valve is from inlet to outlet or from outlet to inlet.

The valves of the present invention also utilize both passive and mechanically operated valve features. The passive valve features have the advantages of being easy to manufacture and prevent any back flow in the system regardless of the state of the valve and its associated system. Such passive valve features, however, can allow free flow in the opposite direction.

In order to actuate the valve head of the valve according to the present invention, in one embodiment, the valve utilizes a rotatable cam, cam shaft or other timing mechanism to mechanically open and close the valve. The timing of the rotation of the cam prevents the occurrence of free flow in the system. Moreover, because the cam and an associated crank shaft are of a unitary construction, a plurality of valves, each operated by a corresponding cam operated by a single crank shaft, prevent any possible mistiming of the plurality of valves. That is, the timing mechanism can be configured to ensure that at least one valve is always in a closed position to prevent flow of fluid through the system when one or more of the other valves in the system may be open. By combing passive and mechanical valve features into a single valve according to the present invention, a system of a plurality of valves of the present invention can be timed relative to one another to prevent free flow while also being sensitive to pressure differential changes within each valve. Moreover, the bi-directional self-sealing seal in each valve provides a complete seal when outlet pressure of the valve surpasses the inlet pressure. That is the seal will increase its sealing force as the outlet pressure rises to prevent back flow through the valve. In the forward flow direction, when the valve is open the bi-directional self-sealing seal allows positive flow through the valve. Once the valve seal is mechanically closed, however, the bi-directional self-sealing seal self-energizes to close the valve.

In systems where the valves of the present invention are incorporated and sterility of the system is paramount, the valves may utilize one or more additional seals on the various moving components. For instance, slide O-ring seals may be utilized to seal the high pressure portion of the system from atmospheric pressure. In addition, rotary seals may be placed on the cam shaft to prevent contamination of the valve during operation. Such additional seals can be employed to create a sterile environment for both the inlet and outlet sides of the valve.

BRIEF DESCRIPTION OF THE DRAWINGS

The following detailed description of the illustrated embodiments is better understood when read in conjunction with the appended drawings. For the purpose of illustrating the invention, there is shown in the drawings exemplary embodiments which illustrate what is currently considered to be the best mode for carrying out the invention, it being understood, however, that the invention is not limited to the specific methods and instruments disclosed. In the drawings:

FIG. 3A is a cross-sectional side view of a third embodiment of a valve in a first state of operation in accordance with the principles of the present invention.

FIG. 3B is a cross-sectional side view of the valve of FIG. 3A in a second state of operation in accordance with the principles of the present invention.

FIG. 3C is a cross-sectional side view of the valve of FIG. 3A in a third state of operation in accordance with the principles of the present invention.

FIG. 3D is a cross-sectional side view of the valve of FIG. 3A in a fourth state of operation in accordance with the principles of the present invention.

DETAILED DESCRIPTION OF THE ILLUSTRATED EMBODIMENTS

Figure 1A:
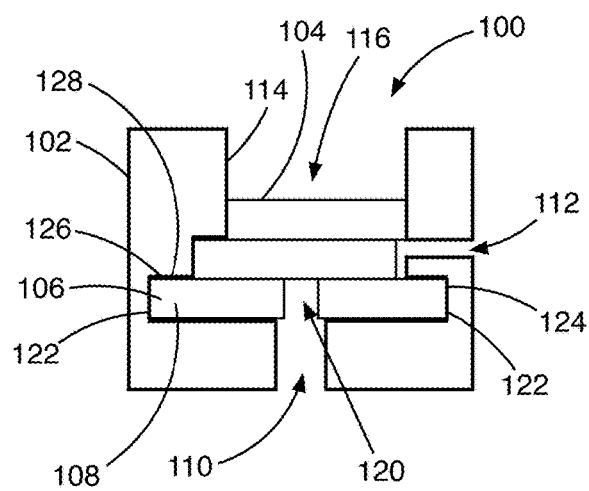
FIG. 1A is a cross-sectional side view of a first embodiment of a valve in a first state of operation in accordance with the principles of the present invention.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention. It should be noted that there are many different and alternative configurations, devices and technologies to which the disclosed inventions may be applied. Thus, the full scope of the invention is not limited to the examples that are described below.

As used herein, the term "valve head" refers to a movable rigid structure that either gives the sealing structure, such as a valve ball or a seal flap, space to move or moves into contact with the sealing structure to keep the sealing structure in contact with the valve seal. The valve head can be made of metal or plastic, but must be a rigid component.

"Valve ball" refers to a spherical object such as a Delrin ball. The valve ball may be made of other materials known in the art. The ball has a low mass so that it can be moved easily by fluid flow through the valve.

"Valve flap" refers to a structure formed from an elastomeric that is non-permeable, such as a flexible and resilient rubber or rubber-like compound including but not limited to silicon rubber. The valve flap may be made out of other suitable materials known in the art. The valve flap has sufficient flexibility to be deflected by fluid flow, but sufficient rigidity to maintain its general shape when deflected and to return to its original shape when not deflected by fluid flow.

"Valve seal" also refers to a structure formed from an elastomeric that is non-permeable, such as a flexible and resilient rubber or rubber-like compound including but not limited to silicon rubber. The valve seal includes a centrally located aperture through which fluid can flow when the valve seal is not closed by a valve flap or a valve ball.

With reference now to the drawings in which like reference characters designate like or similar parts throughout the several views, FIGS. 1A-1D illustrate a first embodiment of a bi-directional self-energizing valve, generally indicated at 100, in various states of operation in accordance with the principles of the present invention. The valve 100 is comprised of a valve body 102 within which is contained a valve head 104, a valve closing member in the form of a valve flap 106 and valve seal 108. The valve body 102 includes a fluid inlet 110 and a fluid outlet 112. The valve head 104 resides within a cylinder wall 114 and is vertically movable within the space 116 defined by the cylinder wall 114. The valve seal 108 resides above the inlet 110 and includes a central aperture 120 that is arranged concentrically with the inlet 110 so that fluid flowing through the inlet can flow through the central aperture 120. The valve seal 108 is retained on its outer perimeter 122 by a seal recess 124 formed within the valve body 102. The valve flap 106 is held one end 126 to the valve body 102 with a portion of the valve flap 106 positioned within a valve flap recess 128 within the valve body 102.

Figure 1B:
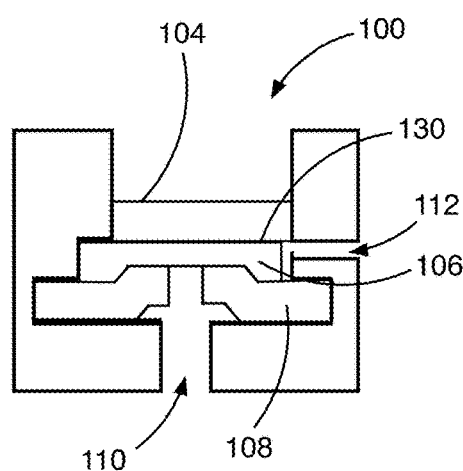
FIG. 1B is a cross-sectional side view of the valve of FIG. 1A in a second state of operation in accordance with the principles of the present invention.

As shown in FIG. 1A, the valve head 104 holds the valve flap 106 over the valve seal 108 to thereby create a seal between the valve seal 108 and the valve flap 106. This first valve state prevents a flow of fluid from the inlet 110 to the outlet 112. As the inlet pressure increases, as shown in FIG. 1B, with the valve head still in contact with the upper surface 130 of the valve flap 106, due to the pressure differential between the inlet 110 and the outlet 112 and the flexible and resilient nature of the valve seal 108 and valve flap 106, in this second valve state the valve seal 108 is upwardly forced into the valve flap 106, effectively increasing the strength of the seal between the valve seal 108 and the valve flap 106 in proportion to the pressure differential between the valve inlet 110 and the valve outlet 112.

Figure 1C:
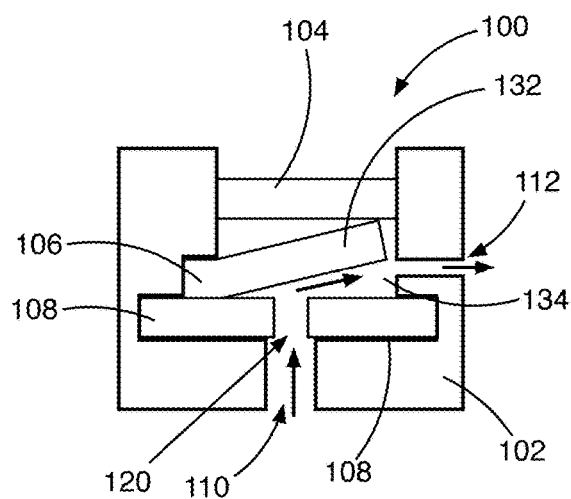
FIG. 1C is a cross-sectional side view of the valve of FIG. 1A in a third state of operation in accordance with the principles of the present invention.

As shown in FIG. 1C, a third valve state occurs when the valve head 104 is lifted relative to the valve flap 106. When the inlet pressure is greater than the outlet pressure, as the valve head 104 is lifted, the proximal end 132 of the valve flap 106 is upwardly forced by fluid pressure toward the valve head 104. This allows fluid flow (as represented by arrows) through the inlet 110, through the aperture 120 of the valve seal 108 into the inner valve chamber 134 defined by the valve body 102 and out the outlet 112.

Figure 1D:
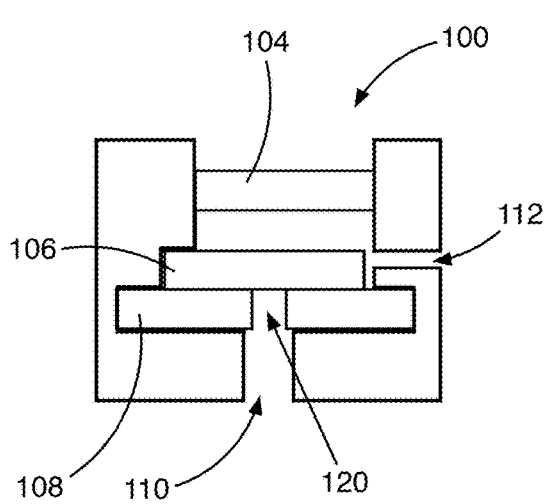
FIG. 1D is a cross-sectional side view of the valve of FIG. 1A in a fourth state of operation in accordance with the principles of the present invention.

As shown in FIG. 1D, however, when the valve head 104 is still in a lifted position relative to the valve flap 106 and the inlet pressure drops below the outlet pressure, the pressure differential between the outlet 112 will force the valve flap 106 into contact with the valve seal 108, thereby sealing the aperture 120 of the valve seal 108. This movement of the valve flap 106 is further enhanced by the Bernoulli principle. The Bernoulli effect will initially cause the valve flap 106 to quickly move to the seal aperture 120 in the event of a reverse flow through the valve 100. In this fourth valve state, the engagement of the valve flap 106 with the valve seal prevents back flow through the outlet 112 and into the inlet 110 when the outlet pressure exceeds the inlet pressure. As the outlet pressure increases, the strength of the seal between the valve flap 106 and the valve seal 108 increases proportionately. As such, the valve flap 106 in combination with the valve seal 108 thus provide a bi-directional self-energizing seal for the bi-directional self-energizing valve 100.

FIGS. 2A-2D illustrate a second embodiment of a bi-directional self-energizing valve, generally indicated at 200, in various states of operation in accordance with the principles of the present invention. The valve 200 is comprised of a valve body 202 within which is contained a valve head 204, a valve closing member in the form of a valve ball 206 and valve seal 208. The valve body 202 includes a fluid inlet 210 and a fluid outlet 212. The valve head 204 resides within a cylinder wall 214 and is vertically movable within the space 216 defined by the cylinder wall 214. The valve seal 208 resides above the inlet 210 and includes a central aperture 220 that is arranged concentrically with the inlet 210 so that fluid flowing through the inlet can flow through the central aperture 220. The valve seal 208 is retained on its outer perimeter 222 by a seal recess 224 formed within the valve body 202. The valve ball 206 is a bi-directional sealing member that performs a similar bi-directional sealing function as the valve flap 106 shown and described with reference to FIGS. 1A-1D. The valve ball 206 is positioned within an inner valve chamber 234 defined by the valve body 202 that is in fluid communication with both the inlet 210 and outlet 212 of the valve body 202.

Figure 2A:
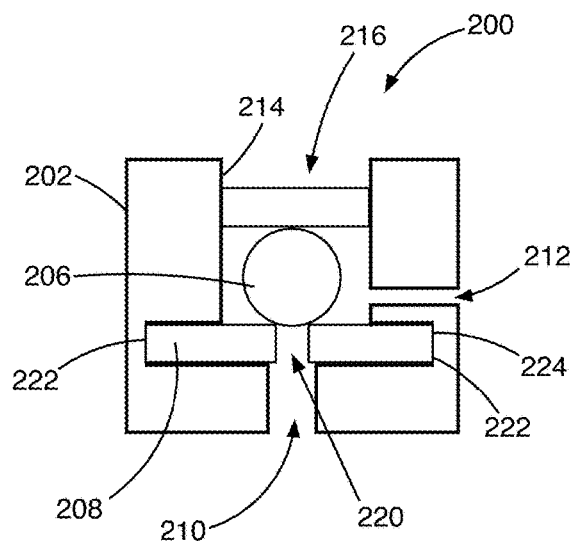
FIG. 2A is a cross-sectional side view of a second embodiment of a valve in a first state of operation in accordance with the principles of the present invention.
Figure 2B:
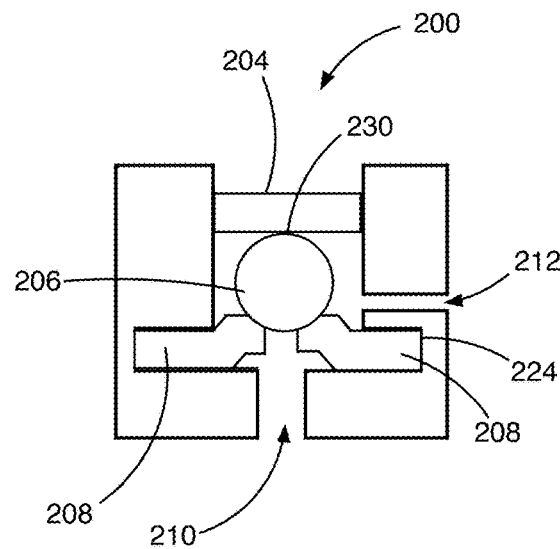
FIG. 2B is a cross-sectional side view of the valve of FIG. 2A in a second state of operation in accordance with the principles of the present invention.

As shown in FIG. 2A, the valve head 204 holds the valve ball 206 over the valve seal 208 to thereby create a seal between the valve seal 208 and the valve ball 206. This first valve state prevents a flow of fluid from the inlet 210 to the outlet 212. As the inlet pressure increases, as shown in FIG. 2B, with the valve head 204 still in contact with the upper surface 230 of the valve ball 206, due to the pressure differential between the inlet 210 and the outlet 212 and the flexible and resilient nature of the valve seal 208 and valve ball 206, in this second valve state the valve seal 208 is upwardly forced into the valve ball 206, effectively increasing the strength of the seal between the valve seal 208 and the valve ball 206 in proportion to the pressure differential between the valve inlet 210 and the valve outlet 212.

Figure 2C:
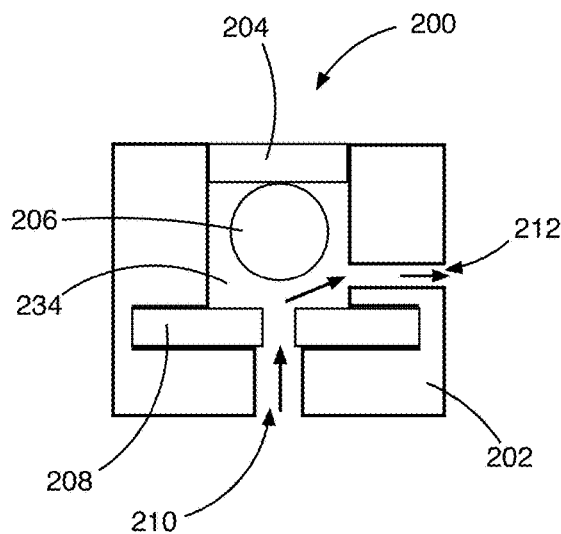
FIG. 2C is a cross-sectional side view of the valve of FIG. 2A in a third state of operation in accordance with the principles of the present invention.

As shown in FIG. 2C, a third valve state occurs when the valve head 204 is lifted relative to the valve ball 206. When the inlet pressure is greater than the outlet pressure, as the valve head 204 is lifted, the valve ball 206 is upwardly forced by fluid pressure toward the valve head 204. This allows fluid flow (as represented by arrows) through the inlet 210, through the aperture 220 of the valve seal 208 into the inner valve chamber 234 and out the outlet 212.

Figure 2D:
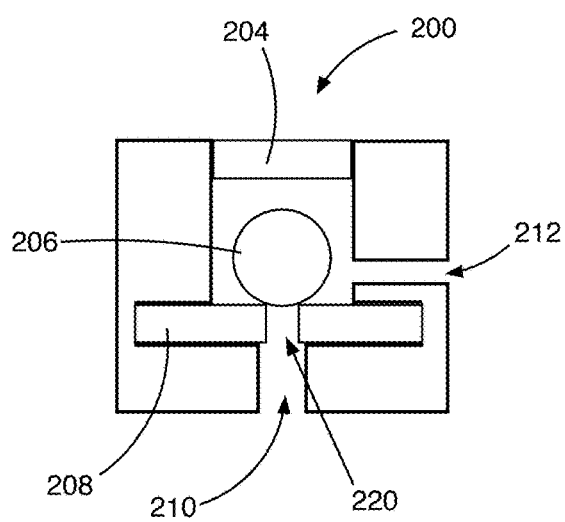
FIG. 2D is a cross-sectional side view of the valve of FIG. 2A in a fourth state of operation in accordance with the principles of the present invention.

As shown in FIG. 2D, however, when the valve head 204 is still in a lifted position relative to the valve ball 206 and the inlet pressure drops below the outlet pressure, the pressure differential between the outlet 212 will force the valve ball 206 into contact with the valve seal 208, thereby sealing the aperture 220 of the valve seal 208. This movement of the valve ball 206 is further enhanced by the Bernoulli principle. The Bernoulli effect will initially cause the valve ball 206 to quickly move to the seal aperture 220 in the event of a reverse flow through the valve 200. In this fourth valve state, the engagement of the valve ball 206 with the valve seal prevents back flow through the outlet 212 and into the inlet 210 when the outlet pressure exceeds the inlet pressure. As the outlet pressure increases, the strength of the seal between the valve ball 206 and the valve seal 208 increases proportionately. As such, the valve ball 206 in combination with the valve seal 208 thus provide a bi-directional self-energizing seal for the bi-directional self-energizing valve 200.

In order for the valve 100 shown and described with reference to FIGS. 1A-1D to operate, the valve head 104 must be selectively and precisely actuated between a first position where the valve 100 is forced to a closed position and a second position where the valve 100 can open if the valve inlet pressure exceeds the valve outlet pressure. As shown in FIGS. 3A-3D, the basic valve configuration of the valve 100 shown and described with reference to FIGS. 1A-1D has been incorporated into a mechanically actuated valve 300. The valve is a bi-directional self-energizing valve and is shown in various states of operation in accordance with the principles of the present invention. The valve 300 is comprised of a valve body 302 within which is contained a valve head 304, valve flap 306 and valve seal 308. The valve body 302 includes a fluid inlet 310 and a fluid outlet 312. The valve head 304 resides within a cylinder wall 314 and is vertically movable within the space 316 defined by the cylinder wall 314. The valve seal 308 resides above the inlet 310 and includes a central aperture 320 that is arranged concentrically with the inlet 310 so that fluid flowing through the inlet can flow through the central aperture 320. The valve seal 308 is retained on its outer perimeter 322 by a seal recess 324 formed within the valve body 302. The valve flap 306 is held one end 326 to the valve body 302 with a portion of the valve flap 306 positioned within a valve flap recess 328 within the valve body 302.

As shown in FIG. 3A, the valve head 304 comprises a vertically movable piston body 304' that defines a circumferential groove 305 for receiving and retaining an O-ring 307 to seal the piston body 304' to the cylinder wall 314 as the piston body 304' translates between first and second positions as illustrated in FIGS. 3A-3D. The valve head 304 further includes a cam head 309 positioned within a cam chamber 311. The cam head 309 is biased into contact with a rotatable cam 315 positioned above the cam head 309 with a biasing device 317, such as a coil spring, that extends between the underside 319 of the cam head and a floor 321 of the cam chamber. The biasing device 317 forces the valve head 304 toward the cam 315 and away from the valve flap 306.

In the closed position as illustrated in FIG. 3A, the lower end of the valve head 304 holds the valve flap 306 over the valve seal 308 to thereby create a seal between the valve seal 308 and the valve flap 306. This first valve state prevents a flow of fluid from the inlet 310 to the outlet 312. As the inlet pressure increases, as shown in FIG. 1B, with the valve head 304 still in contact with the upper surface 330 of the valve flap 306, due to the pressure differential between the inlet 310 and the outlet 312 and the flexible and resilient nature of the valve seal 308 and valve flap 306, in this second valve state the valve seal 308 is upwardly forced into the valve flap 306, effectively increasing the strength of the seal between the valve seal 308 and the valve flap 306 in proportion to the pressure differential between the valve inlet 310 and the valve outlet 312.

As shown in FIG. 3C, a third valve state occurs when the valve head 304 is lifted relative to the valve flap 306. This occurs as the cam 315 is rotated so that the upper surface 323 of the cam head 309 engages at least partially with the second cam surface 315". The second cam surface 315" has a shorter cam radius from a center of rotation of the cam 315 than the first cam surface 315'. When this occurs, the valve head 304 moves away from the valve flap 306. When the inlet pressure is greater than the outlet pressure, as the valve head 304 is lifted, the proximal end 332 of the valve flap 306 is upwardly forced by fluid pressure toward the valve head 304. This allows fluid flow (as represented by arrows) through the inlet 310, through the aperture 320 of the valve seal 308 into the inner valve chamber 334 defined by the valve body 302 and out the outlet 312.

As shown in FIG. 3D, however, when the valve head 304 is still in a lifted position relative to the valve flap 306, which may be when the cam 315 is rotated so that the upper surface 323 of the cam head 309 engages at least partially with the second cam surface 315", and the inlet pressure drops below the outlet pressure, the pressure differential between the outlet 312 will force the valve flap 306 into contact with the valve seal 308, thereby sealing the aperture 320 of the valve seal 308. This movement of the valve flap 306 is further enhanced by the Bernoulli principle. The Bernoulli effect will initially cause the valve flap 306 to quickly move to the seal aperture 320 in the event of a reverse flow through the valve 300. In this fourth valve state, the engagement of the valve flap 306 with the valve seal prevents back flow through the outlet 312 and into the inlet 310 when the outlet pressure exceeds the inlet pressure. As the outlet pressure increases, the strength of the seal between the valve flap 306 and the valve seal 308 increases proportionately. As such, the valve flap 306 in combination with the valve seal 308 provides a bi-directional self-energizing seal for the bi-directional self-energizing valve 300.

Similarly, in order for the valve 200 shown and described with reference to FIGS. 2A-2D to operate, the valve head 204 must be selectively and precisely actuated between a first position where the valve 200 is forced to a closed position and a second position where the valve 200 can open if the valve inlet pressure exceeds the valve outlet pressure. As shown in FIGS. 4A-4D, the basic valve configuration of the valve 200 shown and described with reference to FIGS. 2A-2D has been incorporated into a mechanically actuated valve 400. The valve is a bi-directional self-energizing valve and is shown in various states of operation in accordance with the principles of the present invention.

The valve 400 is comprised of a valve body 402 within which is contained a valve head 404, valve ball 406 and valve seal 408. The valve body 402 includes a fluid inlet 410 and a fluid outlet 412. The valve head 404 resides within a cylinder wall 414 and is vertically movable within the space 416 defined by the cylinder wall 414. The valve seal 408 resides above the inlet 410 and includes a central aperture 420 that is arranged concentrically with the inlet 410 so that fluid flowing through the inlet can flow through the central aperture 420. The valve seal 408 is retained on its outer perimeter 422 by a seal recess 424 formed within the valve body 402. The valve ball 406 is a bi-directional sealing member that performs a similar bi-directional sealing function as the valve flap 306 shown and described with reference to FIGS. 3A-3D. The valve ball 406 is positioned within an inner valve chamber 434 defined by the valve body 402 that is in fluid communication with both the inlet 410 and outlet 412 of the valve body 202.

Figure 4A:
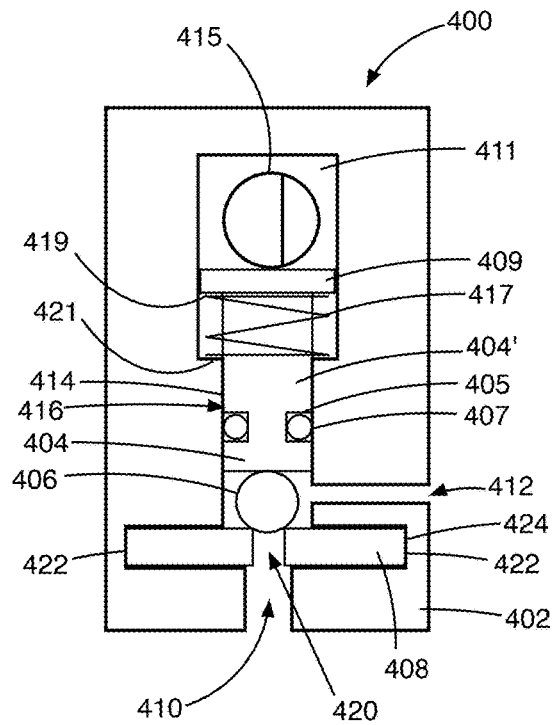
FIG. 4A is a cross-sectional side view of a fourth embodiment of a valve in a first state of operation in accordance with the principles of the present invention.

As shown in FIG. 4A, the valve head 404 comprises a vertically movable piston body 404' that defines a circumferential groove 405 for receiving and retaining an O-ring 407 to seal the piston body 404' to the cylinder wall 414 as the piston body 404' translates between first and second positions as illustrated in FIGS. 4A-4D. The valve head 404 further includes a cam head 409 positioned within a cam chamber 411. The cam head 409 is biased into contact with a rotatable cam 415 positioned above the cam head 409 with a biasing device 417, such as a coil spring, that extends between the underside 419 of the cam head and a floor 421 of the cam chamber. The biasing device 417 forces the valve head 404 toward the cam 415 and away from the valve ball 406.

Figure 4B:
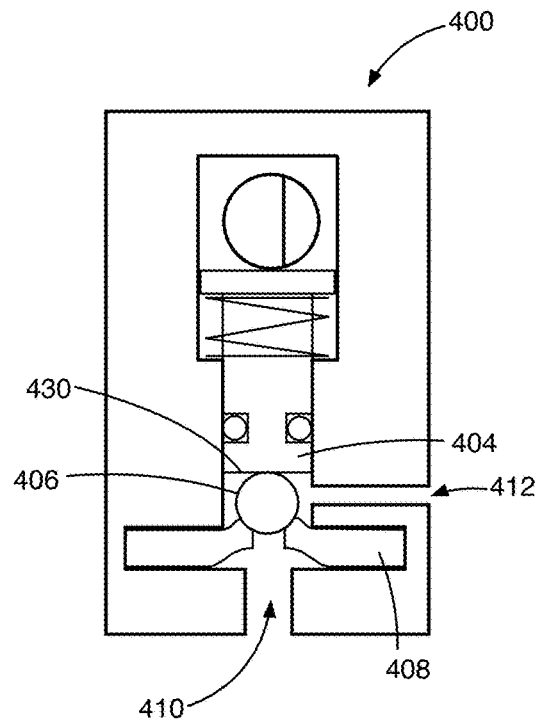
FIG. 4B is a cross-sectional side view of the valve of FIG. 2A in a second state of operation in accordance with the principles of the present invention.

In the closed position as illustrated in FIG. 4A, the lower end of the valve head 404 holds the valve ball 406 over the valve seal 408 to thereby create a seal between the valve seal 408 and the valve ball 406. This first valve state prevents a flow of fluid from the inlet 410 to the outlet 412. As the inlet pressure increases, as shown in FIG. 4B, with the valve head 404 still in contact with the upper surface 430 of the valve flap 406, due to the pressure differential between the inlet 410 and the outlet 412 and the flexible and resilient nature of the valve seal 408 and valve ball 406, in this second valve state the valve seal 408 is upwardly forced into the valve ball 406, effectively increasing the strength of the seal between the valve seal 408 and the valve ball 406 in proportion to the pressure differential between the valve inlet 410 and the valve outlet 412.

Figure 4C:
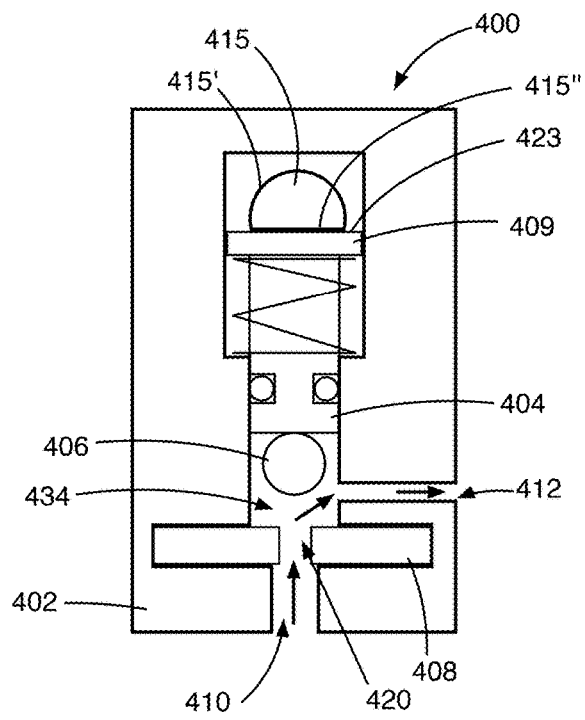
FIG. 4C is a cross-sectional side view of the valve of FIG. 2A in a third state of operation in accordance with the principles of the present invention.

As shown in FIG. 4C, a third valve state occurs when the valve head 404 is lifted relative to the valve seal 408. This occurs as the cam 415 is rotated so that the upper surface 423 of the cam head 409 engages at least partially with the second cam surface 415". The second cam surface 415" has a shorter radius from a center of rotation of the cam 415 than the first cam surface 415'. When this occurs, the valve head 404 moves away from the valve flap 406. When the inlet pressure is greater than the outlet pressure, as the valve head 404 is lifted, the valve ball 406 is upwardly forced by fluid pressure toward the valve head 404. This allows fluid flow (as represented by arrows) through the inlet 410, through the aperture 420 of the valve seal 408 into the inner valve chamber 434 defined by the valve body 402 and out the outlet 412.

Figure 4D:
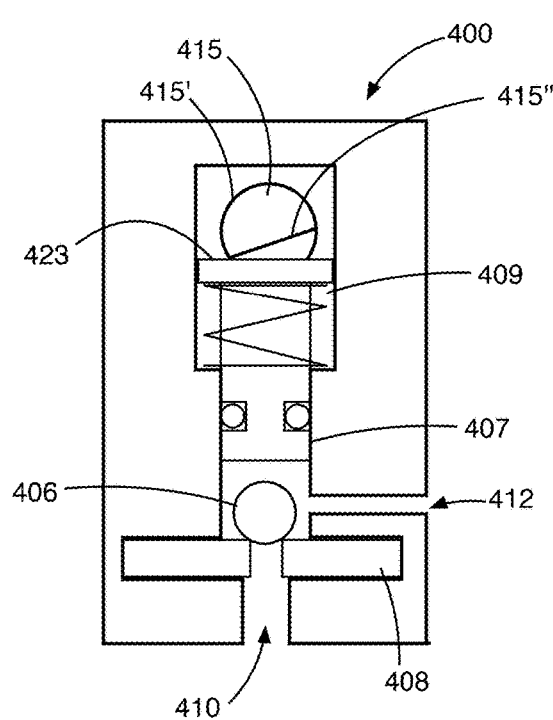
FIG. 4D is a cross-sectional side view of the valve of FIG. 2A in a fourth state of operation in accordance with the principles of the present invention.

As shown in FIG. 4D, however, when the valve head 404 is still in a lifted position relative to the valve seal 408 such that valve ball 406 is not forced into engagement with the valve seal 408, which may be when the cam 415 is rotated so that the upper surface 423 of the cam head 409 engages at least partially with the second cam surface 415", and the inlet pressure drops below the outlet pressure, the pressure differential between the outlet 412 will force the valve ball 406 into contact with the valve seal 408, thereby sealing the aperture 420 of the valve seal 408. This movement of the valve ball 406 is further enhanced by the Bernoulli principle. The Bernoulli effect will initially cause the valve ball 406 to quickly move to the seal aperture 420 in the event of a reverse flow through the valve 400. In this fourth valve state, the engagement of the valve ball 406 with the valve seal prevents back flow through the outlet 412 and into the inlet 410 when the outlet pressure exceeds the inlet pressure. As the outlet pressure increases, the strength of the seal between the valve ball 406 and the valve seal 408 increases proportionately. As such, the valve ball 406 in combination with the valve seal 408 provides a bi-directional self-energizing seal for the bi-directional self-energizing valve 400.

Figure 5A:
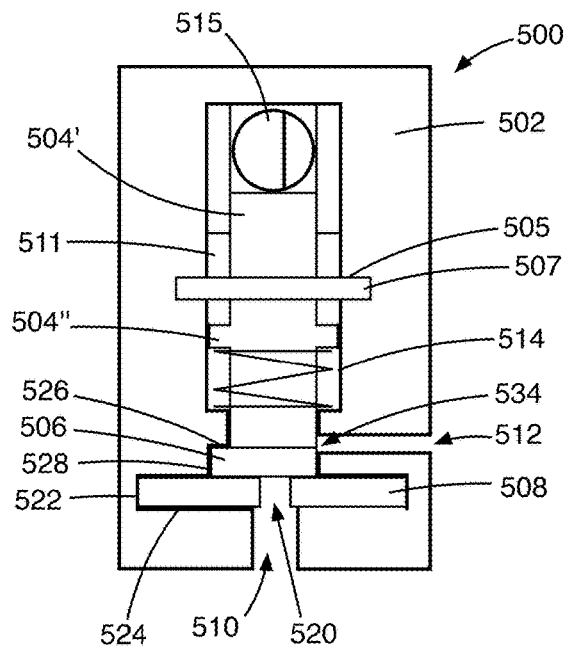
FIG. 5A is a cross-sectional side view of a fifth embodiment of a valve in a first state of operation in accordance with the principles of the present invention.
Figure 5C:
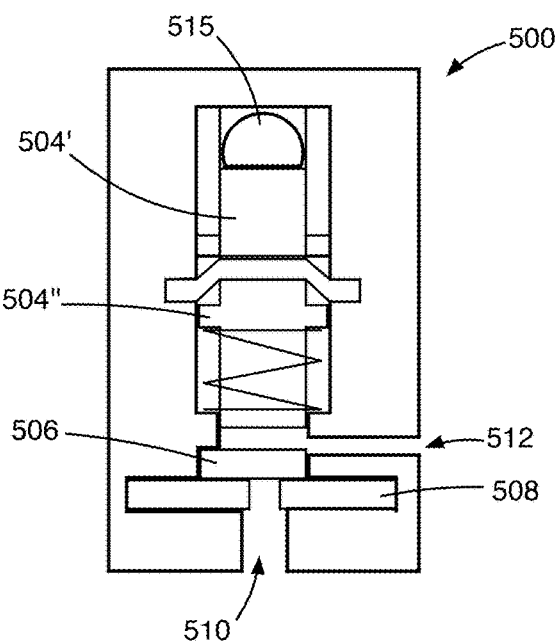
FIG. 5C is a cross-sectional side view of the valve of FIG. 5A in a third state of operation in accordance with the principles of the present invention.
Figure 5B:
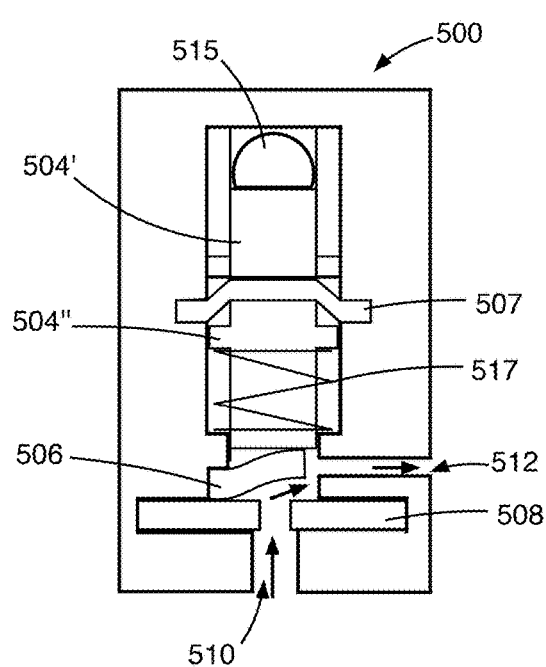
FIG. 5B is a cross-sectional side view of the valve of FIG. 5A in a second state of operation in accordance with the principles of the present invention.

As shown in FIGS. 5A-5C, a basic valve configuration of the valve 100 shown and described with reference to FIGS. 1A-1D has been incorporated into a mechanically actuated valve 500. The valve 500 is a bi-directional self-energizing valve and is shown in various states of operation in accordance with the principles of the present invention. The valve 500 is comprised of a valve body 502 within which is contained a two-piece valve head 504' and 504", valve flap 506 and valve seal 508. The valve body 502 includes a fluid inlet 510 and a fluid outlet 512. The two-piece valve head 504' and 504" resides within a cylinder wall 514 and is vertically movable within the space 516 defined by the cylinder wall 514. The valve seal 508 resides above the inlet 510 and includes a central aperture 520 that is arranged concentrically with the inlet 510 so that fluid flowing through the inlet can flow through the central aperture 520. The valve seal 508 is retained on its outer perimeter 522 by a seal recess 524 formed within the valve body 502. The valve flap 506 is held one side 526 to the valve body 502 with a portion of the valve flap 506 positioned within a valve flap recess 528 within the valve body 502.

Interposed between the two sections of the two-piece valve head 504' and 504" is a head seal 507. The valve body 502 defines a circumferential groove 505 for receiving and retaining an outer perimeter of the head seal 507 to seal cam chamber 511 and cam 515 from the valve chamber 534. As the cam 515 rotates between a closed position as shown in FIG. 5A to an open position as shown in FIG. 5B, the two sections 504' and 504" are moved in unison relative to the valve body 502. Because the valve head seal 507 is interposed between the two sections 504' and 504" of the valve head, the valve head seal 507 is upwardly flexed relative to the valve body 502 as the lower valve head section 504" is lifted away from the valve flap 506 by spring 517. In this position, a flow of fluid (represented by arrows) can flow through the inlet 510 past the valve flap 506 and out the outlet 512.

As shown in FIG. 5C, if the outlet pressure exceeds the inlet pressure, the valve flap 506 will return to a closed position due to the pressure applied by the outlet to the top surface of the valve flap 506 to cause the valve flap 506 to seal against the valve seal 522. That is, the valve flap 506 will return to its closed position even though the cam 515 and thus the valve head 504' and 504" is in an open position.

Figure 6A:
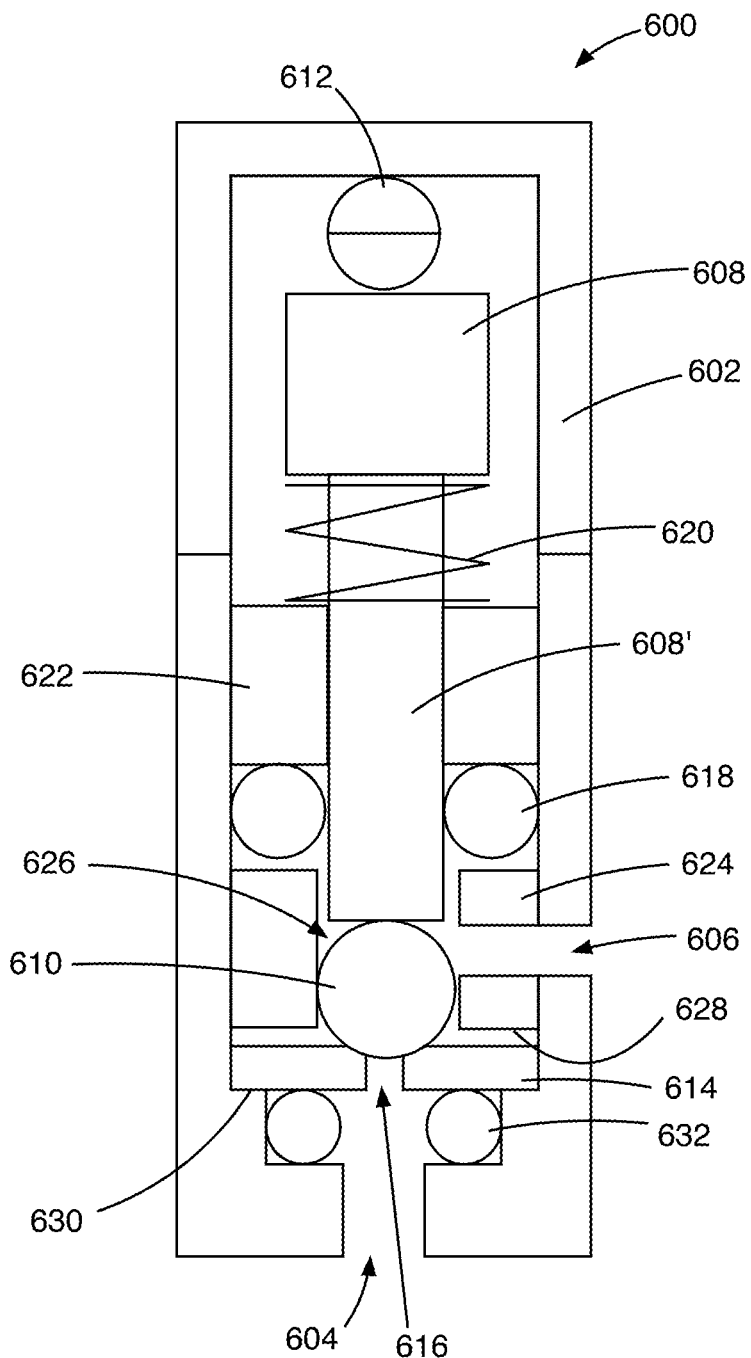
FIG. 6A is a cross-sectional side view of a sixth embodiment of a valve in a first state of operation in accordance with the principles of the present invention.

In order to maintain a sterile valve chamber during operation of a valve in accordance with the present invention, as shown in FIG. 6A, a valve 600 comprises one or more additional seals on the various moving components. The valve 600 is comprised of a valve body 602 having an inlet port 604 and an outlet port 606. A valve head 608 is driven toward a valve ball 610 by the cam 612 as the cam rotates. When the valve ball 610 is forced into contact with the valve seal 614, flow from the inlet port 604 through the valve 600 is prevented. It should be noted that the valve 600 is a generally cylindrical structure, with the various seals shown in cross-section. Thus, the seal 614 is a circular disc-shaped structure defining a central cylindrical aperture 616. Likewise, a slide O-ring seal 618 extends around the lower end 608' of the valve head 608 and maintains a seal around the valve head 608 as the valve head 608 vertically reciprocates, first by being driven toward the valve seal 614 when the cam 612 is in the position as shown and second when it is retracted toward the cam 612 by the coil spring 620 when the cam 612 is rotated at 180 degrees. The slide O-ring seal 618 is maintained in position relative to the valve body 602 by being positioned between a slide seal retainer 622 that is positioned directly above the slide O-ring seal 618 and the valve seal retainer 624 that is positioned directly below the slide O-ring seal 618. The valve seal retainer defines a cylindrical valve chamber 626 between the valve seal 614 and the lower end 608' of the valve head 608. The ball valve 610 is sized to fit within the valve chamber 626 and to be freely vertically movable within the valve chamber 626 when the valve head 608 is in the lifted valve open position. The valve seal 614 resides between a lower wall surface 628 of the valve seal retainer and an upper wall surface 630 defined by the valve body 602. A lower O-ring seal 632 is positioned below the valve seal 614 and provides an additional seal between the bottom surface of the valve seal 614 and the valve body 602 so that fluid in the valve chamber 626 cannot flow around the valve seal 614 and into the inlet 604 when the valve chamber pressure exceeds the inlet pressure. The lower O-ring seal also gives increased compliance to the valve seal 614 when the valve head 608 is pushed down by the cam 612. For example, if the valve seal is 0.030 thick silicon rubber and is compressed 20%, only 0.006 inch of the valve seal is compress, which is a rather tight tolerance. With the O-ring in place, the tolerance is increase. For example, if the valve seal is 0.030 inch thick and the O-ring is 0.07 inch thick, the total thickness of the two seals combined is 0.100 inch. A 20% compression of 0.100 inch seal material is 0.02 inch, which is a much less difficult to achieve in such a valve system. In addition, rotary seals may be placed on the cam shaft to prevent contamination of the valve during operation. Such additional seals can be employed to create a sterile environment for both the inlet and outlet sides of the valve.

Figure 6B:
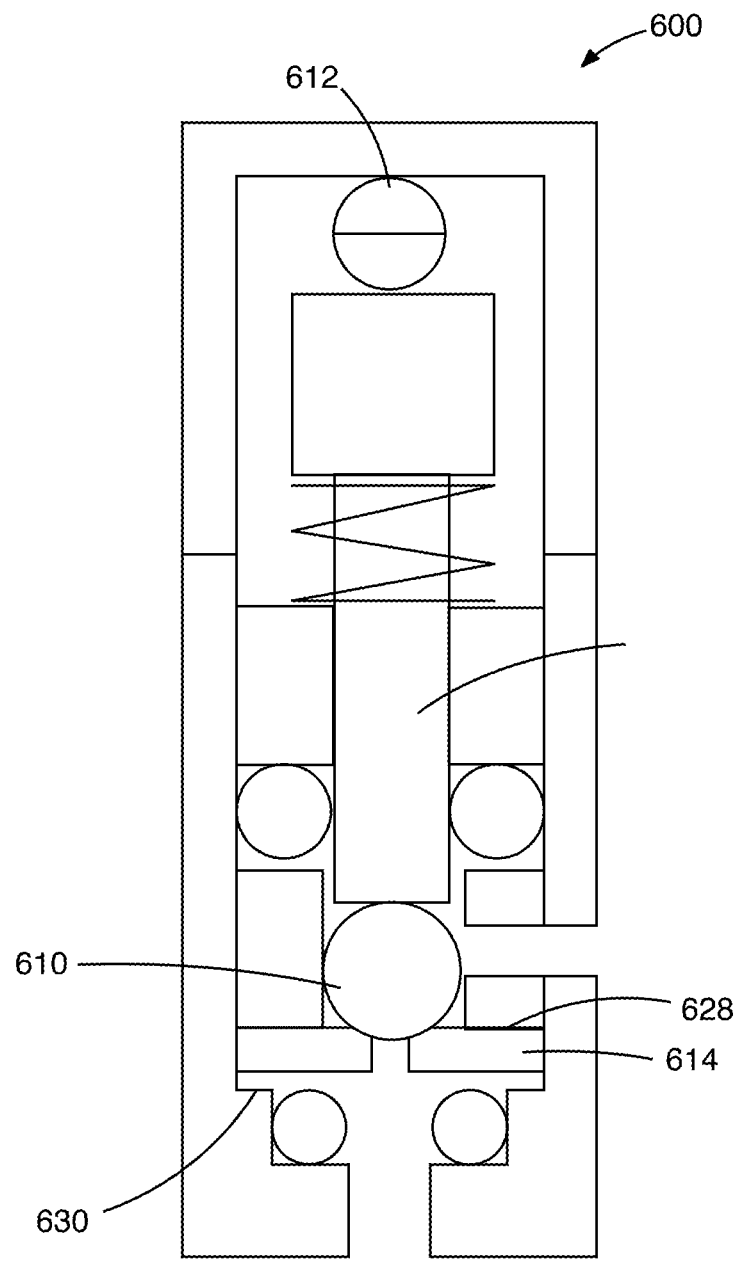
FIG. 6B is a cross-sectional side view of the valve of FIG. 6A in a second state of operation in accordance with the principles of the present invention.
Figure 6C:
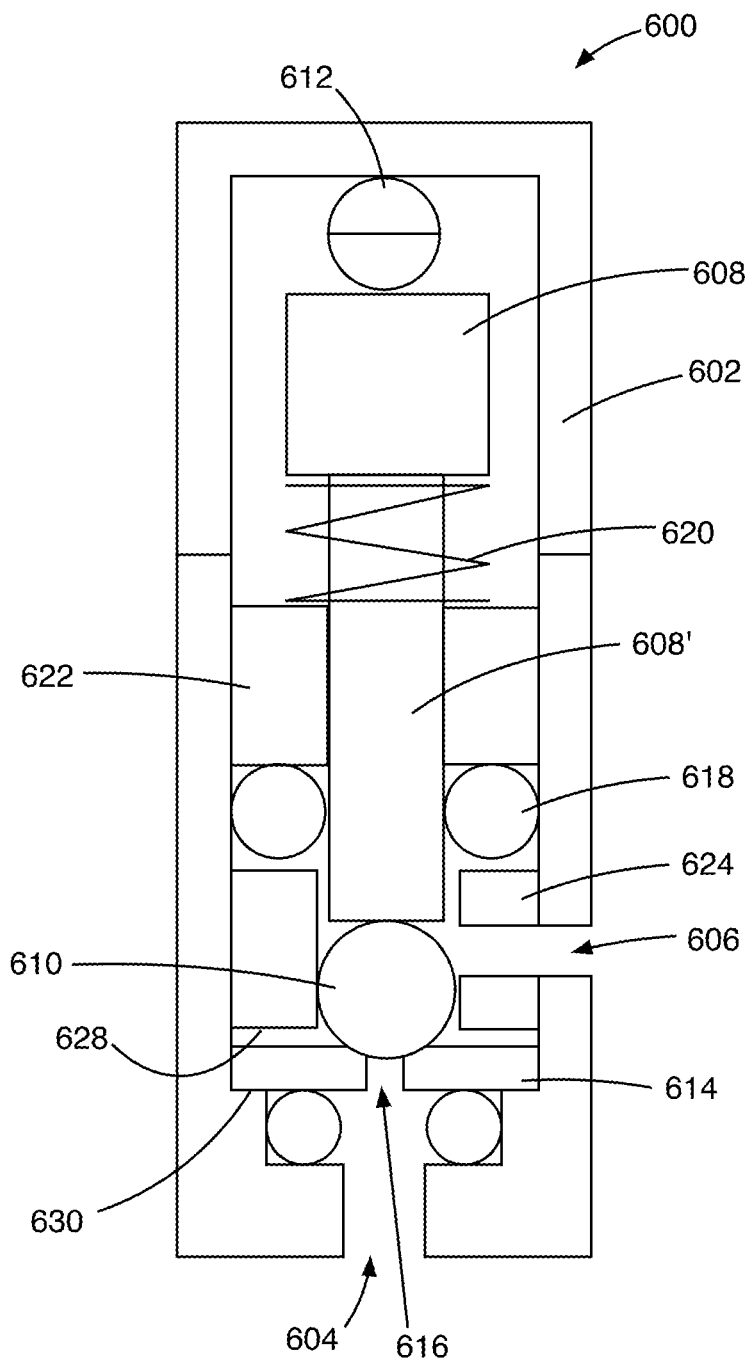
FIG. 6C is a cross-sectional side view of the valve of FIG. 6A in a third state of operation in accordance with the principles of the present invention.

Moreover, as shown in FIG. 6B, when the inlet pressure is higher than the outlet pressure and the valve 600 is mechanically closed by the cam 612. The inlet pressure pushes the valve seal 614 up into the valve ball 610, thus energizing that seal. The valve seal 614 is also being pushed up into the wall 628. Thus, even though there is a gap between the wall 630 and the valve seal 614, the valve seal 614 is still sealing to the ball valve 610. Conversely, as shown in FIG. 6C, when the outlet pressure is higher than the inlet pressure and the valve 600 is mechanically closed. The outlet pressure pushes the ball valve 610 down into the valve seal 614 thus energizing the seal between the valve ball 610 and the valve seal 614. Also, the outlet pressure pushes the valve seal 614 into the lower wall 630 and thus the seal between the valve seal 614 and the wall 630 is energized. The result is that the gap between the wall 628 and wall 630 does not need to be a precise tolerance. This greatly reduces manufacturing costs. It also allows the valve seal 614 to be undeformed, as compared to when the valve seal is compressed between the two walls 628 and 630, and thus highly predictable.

The valve 600 can thus be constructed by inserting the valve seal 614 into the valve body. The valve seal retainer 624, which may comprise a cylindrical body having a central bore and a recessed peripheral groove and an outlet port in fluid communication between the central bore and the peripheral groove, is pressed into the valve body 602 with a press fit sufficient to retain the valve seal retainer 624 in place as well as make a seal between the valve body 602 and the valve seal retainer 624. The peripheral groove around the outside of the valve seal retainer 624 allows it to be installed at any rotation and still be in fluid communication with the outlet 606 of the valve body 602.

The valve seal retainer 624 is positioned 0.001 in to 0.01 inches above the valve seal 614. The valve ball 610 is dropped into place and the sliding seal 618 is inserted. The slide seal retainer 622 is then pressed into place. It is press fit to hold it in place. The valve head 608 is then slid into the slide seal retainer 622 and the sliding seal 618. The cam 612 is then slid into place.

As such, the valve seal 614 can be constructed of a more rigid material or constructed as a composite with two soft outer layers and a rigid core. Such a valve seal construction can withstand higher pressure.

The valves of the present invention are sufficiently inexpensive to manufacture and sufficiently low in energy consumption to operate that such valves can be incorporated into a system that is capable of operating on low power batteries.

Figure 7A:
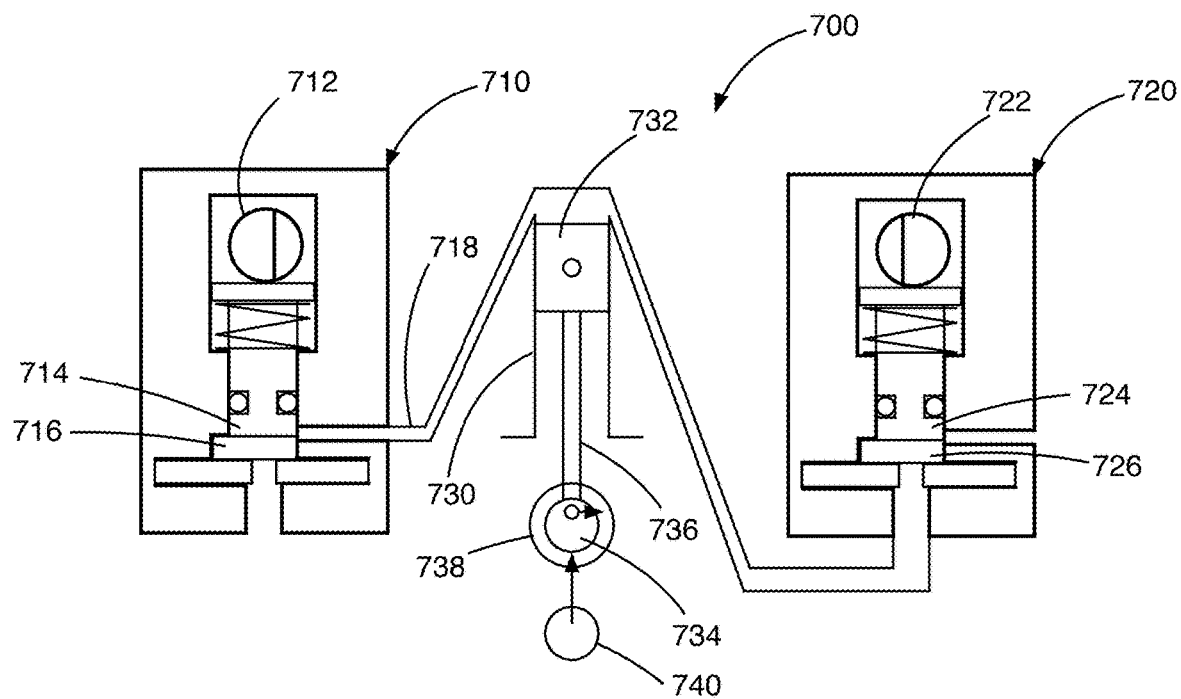
FIG. 7A is a cross-sectional side view of a first embodiment of a pump system in a first state of operation in accordance with the principles of the present invention.

FIG. 7A illustrates a pump, generally indicated at 700 in accordance with the principles of the present invention. The pump 700 is comprised of two valve assemblies 710 and 720. The valve assemblies 710 and 720 are identically configured and as previously described with reference to valve 300 shown and described with reference to FIGS. 3A-3D. The valve 710 includes a cam 712 and the valve 720 includes a cam 722. The cams 712 and 722 are oriented at 180 degrees from one another so that, as will be described in detail herein, when the valve 710 is in the open position the valve 720 is in the closed position and when the valve 720 is in the open position, the valve 710 is in the closed position. At the beginning of the pump cycle as shown in FIG. 7A, both cams 712 and 722 are in a closed position such that the valve heads 714 and 724, respectively, are in contact with their respective valve flaps 716 and 726. The outlet 718 of the valve 710 is coupled to and in fluid communication with pump piston cylinder 730. The pump piston cylinder 730 houses a pump piston 732 that is coupled a crank 734 with piston rod 736. A crank seal 738 is provided around the crank 734 to seal the crank 734. An electric motor 740 is coupled to the crank 734 and thus rotatably drives the crank 734. The piston rod 736 is pivotally coupled to the crank 734 in an off center manner so that rotation of the crank causes reciprocal movement of the piston rod 736 and thus vertical movement of the piston 732 within the piston cylinder 730. As will be described in more detail, the crank and cams 712 and 722 are timed so that they work in concert to draw fluid into the pump cylinder 730 when the piston is lowered, the valve 710 is open and the valve 720 is closed. To force the fluid drawn into the pump cylinder 730 through the valve 720, the valve 710 is closed, the valve 720 is opened and the piston is raised within the piston cylinder 730 to force the fluid contained within the piston cylinder through the valve 720. Repeating this cycle provides a precisely measured amount of fluid to flow through the pump 700 depending on the size of the piston cylinder and the rate at which the pump is cycled.

Figure 7B:
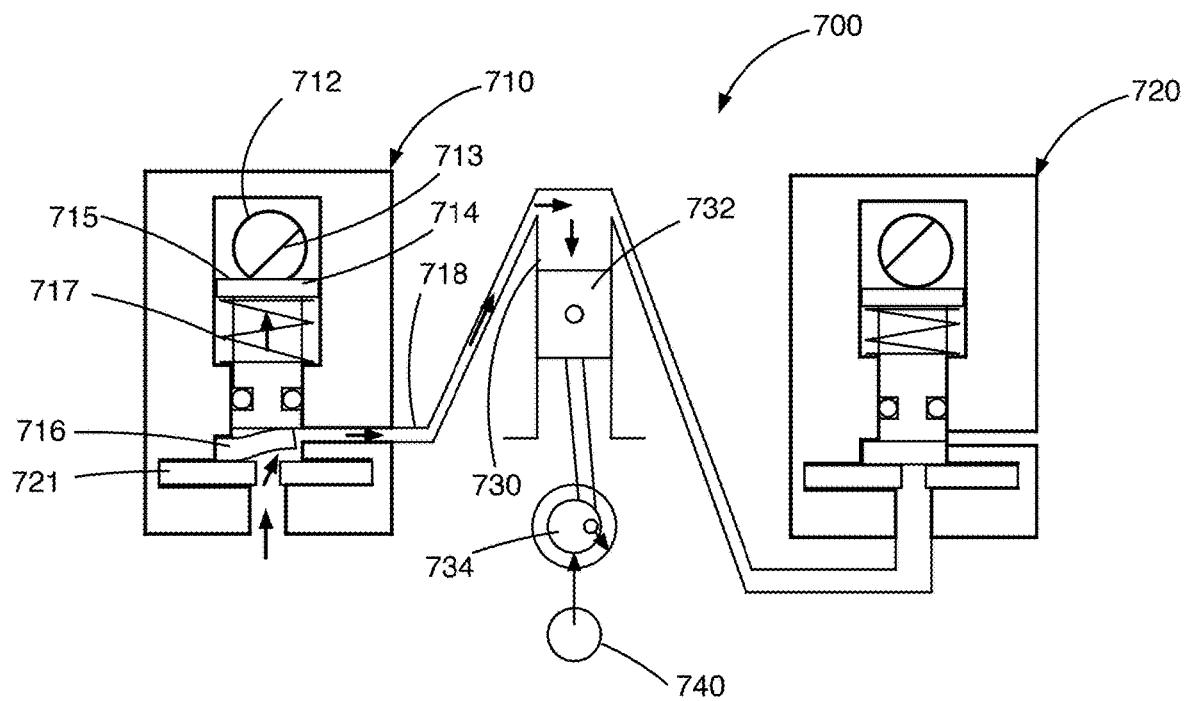
FIG. 7B is a cross-sectional side view of the pump system of FIG. 7A in a second state of operation in accordance with the principles of the present invention.

As shown in FIG. 7B, as the crank 734 continues to rotate, the piston 732 is downwardly pulled. At the same time, the cam 712 of valve 710 is rotated in a clockwise direction so that the cam surface 713 begins to engage with the top surface 715 of the valve head 714. As a result, the coil spring 717 forces the top surface 715 of the valve head 714 into contact with the cam surface 713 thereby causing the valve head 714 to lift relative to the valve flap 716. As the valve flap 716 lifts from the valve seal 721 fluid (represented by arrows) is drawn through the inlet of the valve 710, through the valve outlet and into the piston cylinder 730. Because the valve 720 is still in a closed position, the fluid cannot flow through the inlet of the valve 720 that is in fluid communication with the piston cylinder 730. Just as importantly, fluid at the outlet side of the valve 720 also cannot back flow into the valve cylinder 730 with the valve 720 in the closed position.

Figure 7C:
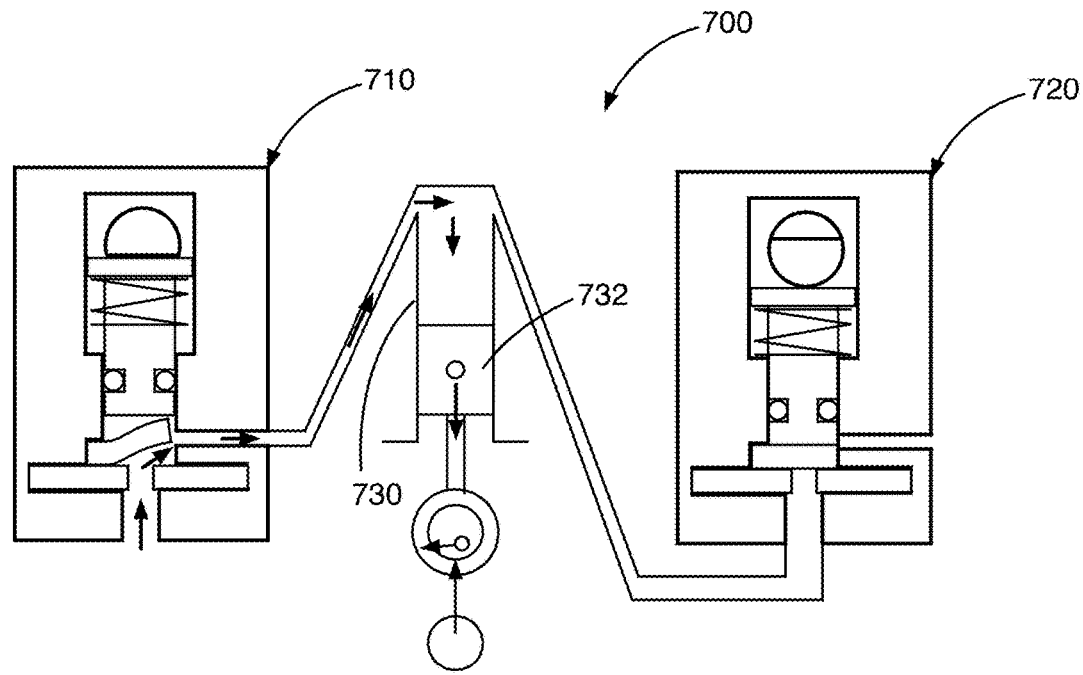
FIG. 7C is a cross-sectional side view of the pump system of FIG. 7A in a third state of operation in accordance with the principles of the present invention.
Figure 7D:
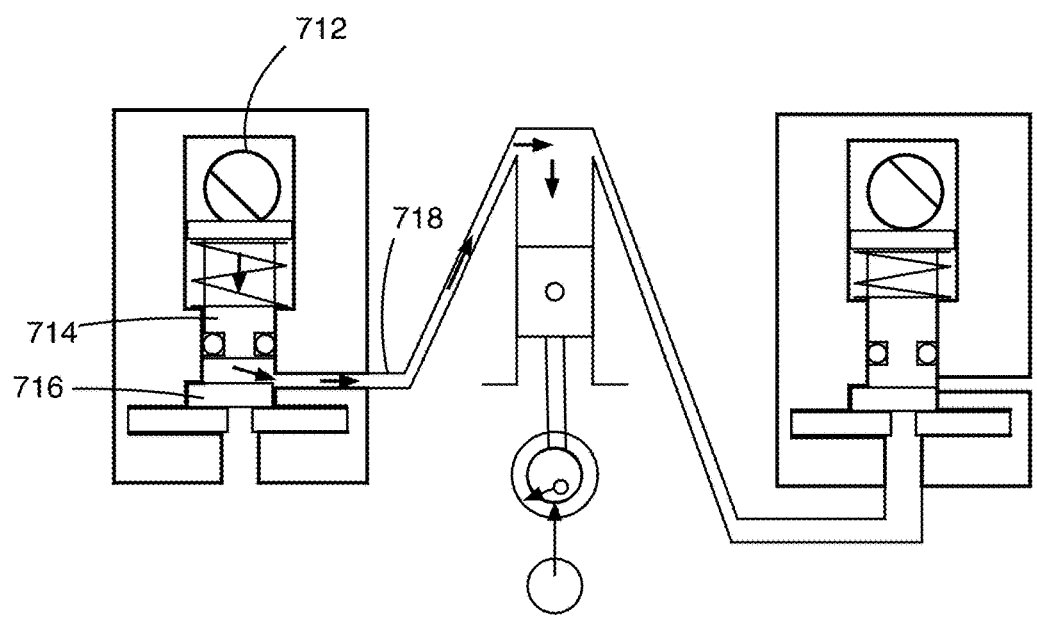
FIG. 7D is a cross-sectional side view of the pump system of FIG. 7A in a fourth state of operation in accordance with the principles of the present invention.

As the valve 710 continues to open as shown in FIG. 7C, which represents the valve 710 in a fully open position, the flow of fluid continues to be drawn into the valve cylinder 730 until the piston 732 reaches its maximum displacement. As further shown in FIG. 7D, when the piston 732 nears the bottom of its stroke, the cam 712 starts to move the valve head 714 toward the valve flap 716. This movement of the valve head 714 causes any residual fluid between the valve head 714 and the valve flap 716 to be forced out the valve outlet 718 while simultaneously forcing the valve flap 716 into a closed position.

Figure 7E:
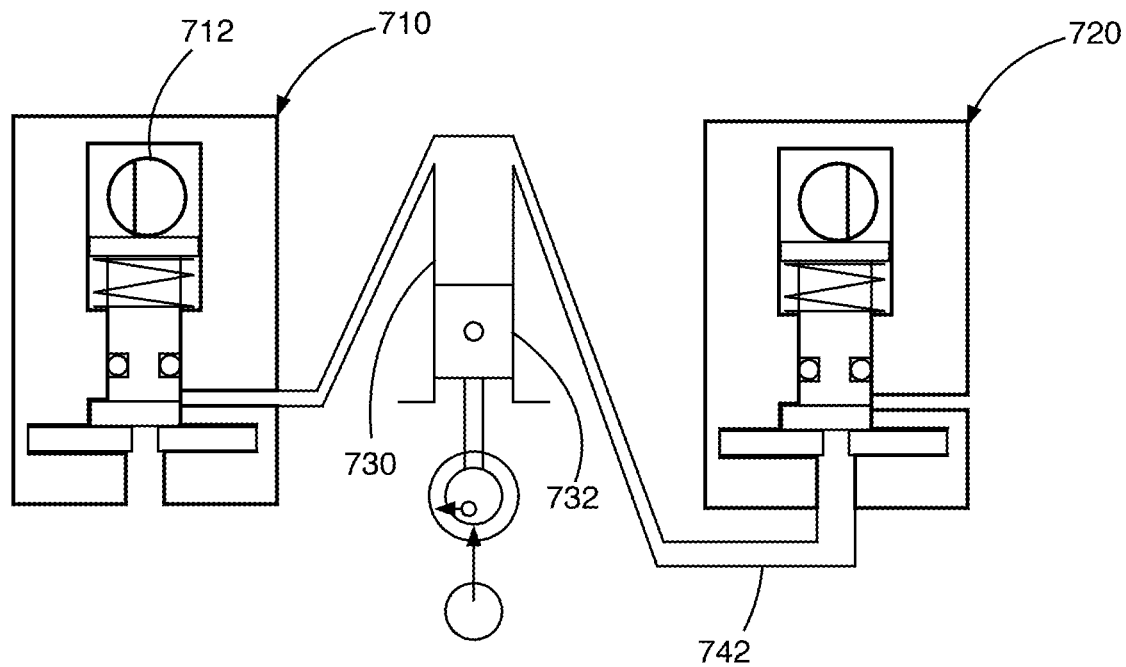
FIG. 7E is a cross-sectional side view of the pump system of FIG. 7A in a fifth state of operation in accordance with the principles of the present invention.

Continued rotation of the cam 712 causes the valve 710 to close, thus preventing any fluid to flow into the piston chamber 730 or fluid in the piston chamber 730 to flow back out the valve 710 as the piston 732 reaches is maximum displacement as shown in FIG. 7E. In this stage of the pump cycle, the valve 720 is also in a closed position to continue to prevent the flow of fluid through the valve 720 until the piston 732 begins its positive stroke to pressurize the fluid in the piston chamber 730 thereby forcing the fluid contained in the valve chamber 730 into the inlet 742 of the valve 720.

Figure 7F:
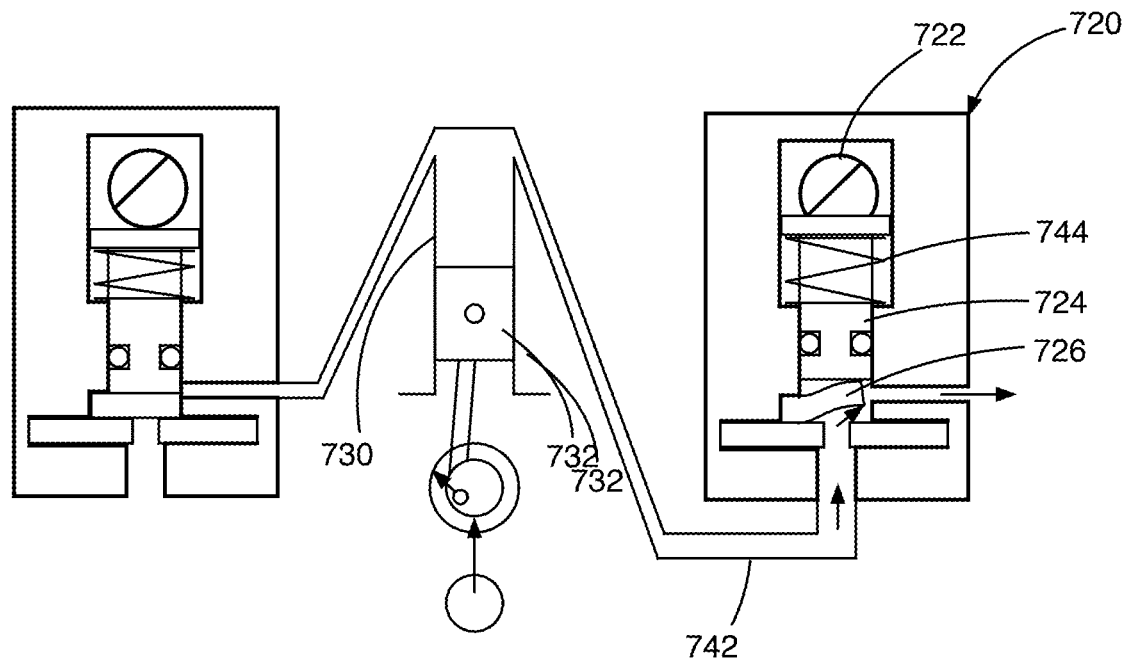
FIG. 7F is a cross-sectional side view of the pump system of FIG. 7A in a sixth state of operation in accordance with the principles of the present invention.
Figure 7G:
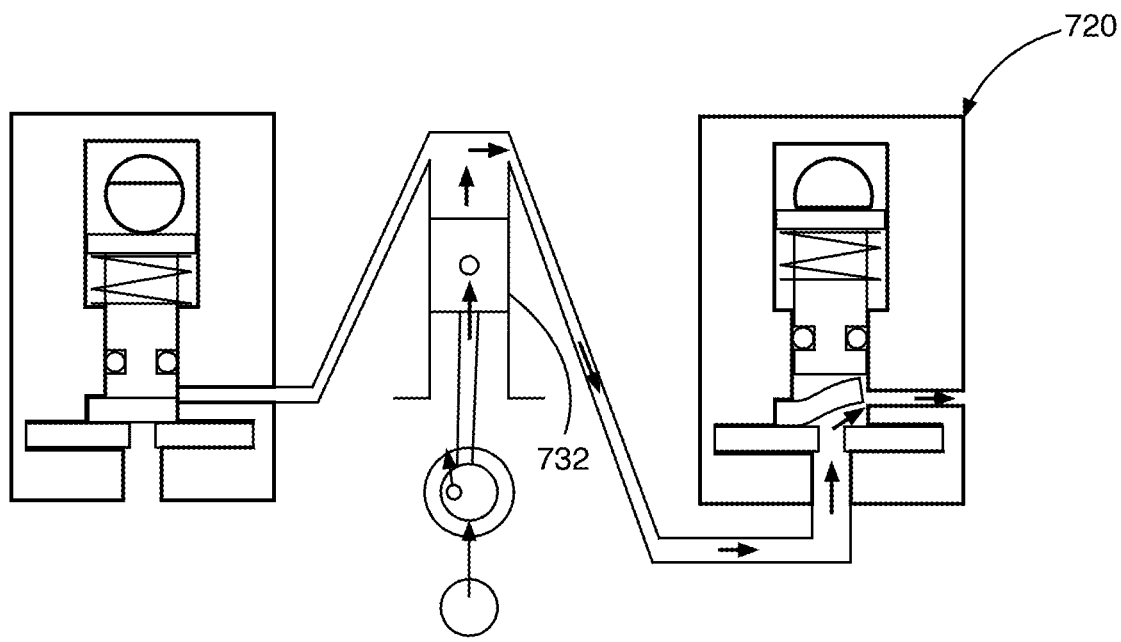
FIG. 7G is a cross-sectional side view of the pump system of FIG. 7A in a seventh state of operation in accordance with the principles of the present invention.

As the piston 732 is advanced into the piston chamber 730 as shown in FIG. 7F, the cam 722 is rotated to simultaneously open the valve 720 as the piston 732 pressurizes the fluid in the piston cylinder 730. The pressurized fluid enters the inlet 742 of the valve 720 and forces the valve flap 726 against the valve head as it is raised by the spring 744. As further shown in FIG. 7G, as the piston 732 continues its positive stroke, the valve 720 continues to open so that the fluid will continue to flow through the valve 720.

Figure 7H:
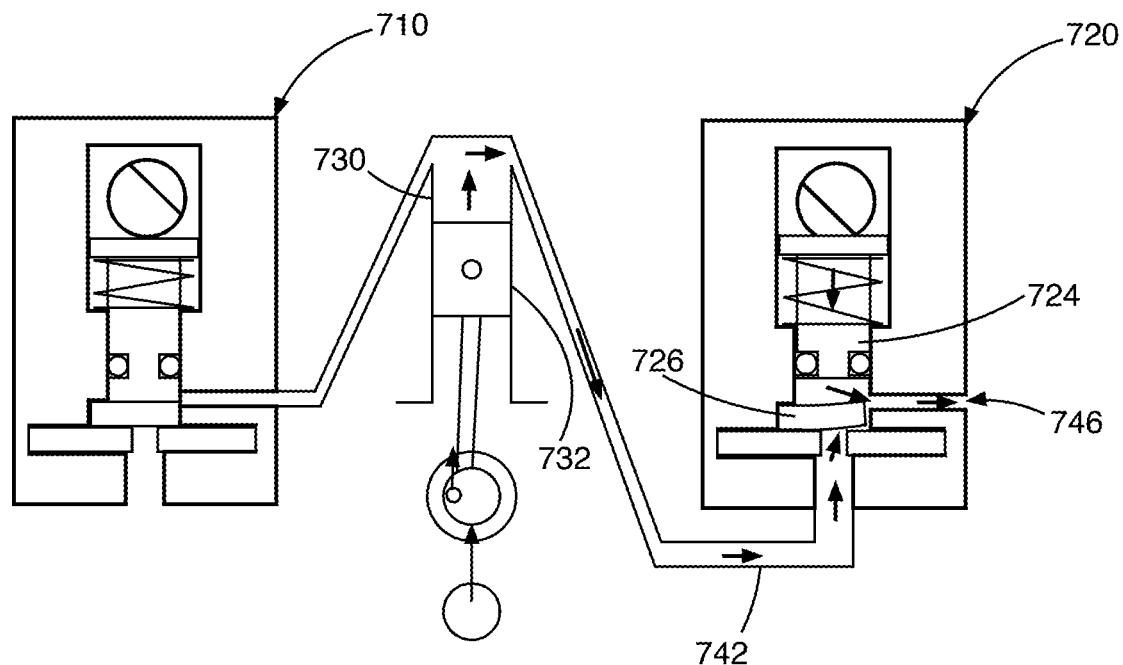
FIG. 7H is a cross-sectional side view of the pump system of FIG. 7A in an eighth state of operation in accordance with the principles of the present invention.

As shown in FIG. 7H, as the piston 732 continues to apply positive pressure to the fluid in the piston cylinder 730, the valve 720 begins to close. The valve 710 also remains closed during this phase of the pump cycle. As the valve 720 begins to close, any fluid that exists between the valve head 724 and the valve flap 726 is forced through the outlet 746 of the valve 720 as well as fluid that is continued to be forced through the valve 720 by the piston 732.

Figure 7I:
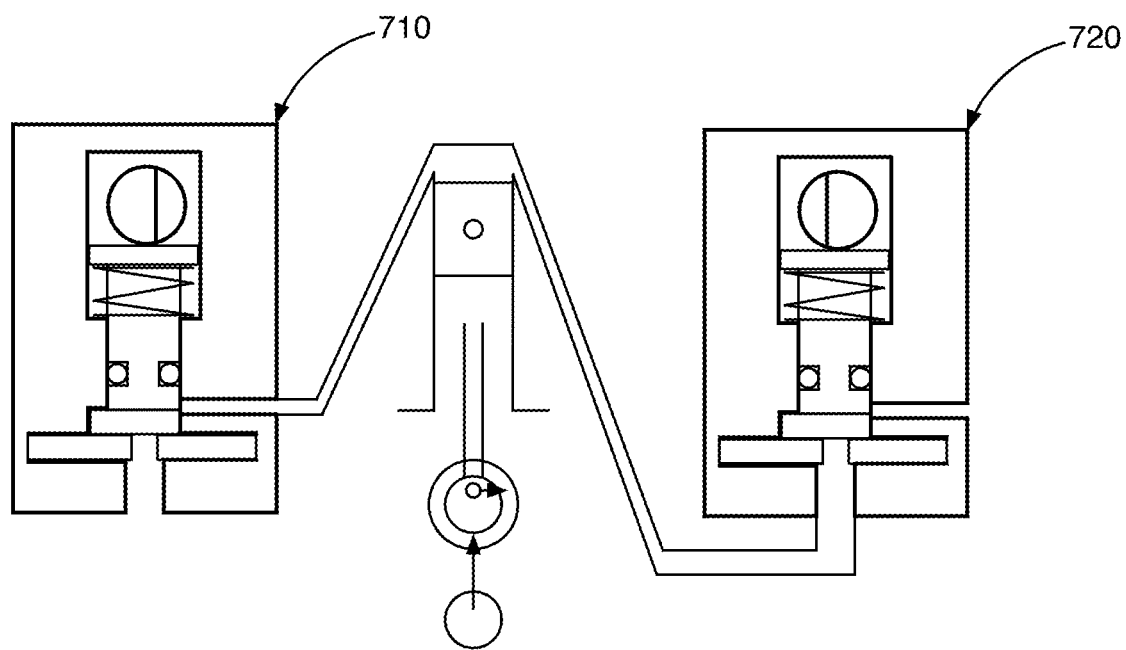
FIG. 7I is a cross-sectional side view of the pump system of FIG. 7A in a ninth state of operation in accordance with the principles of the present invention.

As shown in FIG. 7I, at the end of the pump cycle, the valves 710 and 720 return to the starting position in which both valves are closed. The pump cycle then repeats through each of the valve cycle phases as described with reference to FIGS. 7B-7I. Because the diameters of the valve heads and piston of the present invention are small, relatively high pressures can be accommodated. Despite being small, however, the pump system is capable of delivering significant volumes of fluid by rapid cycling of the pump system 700.

Figure 8A:
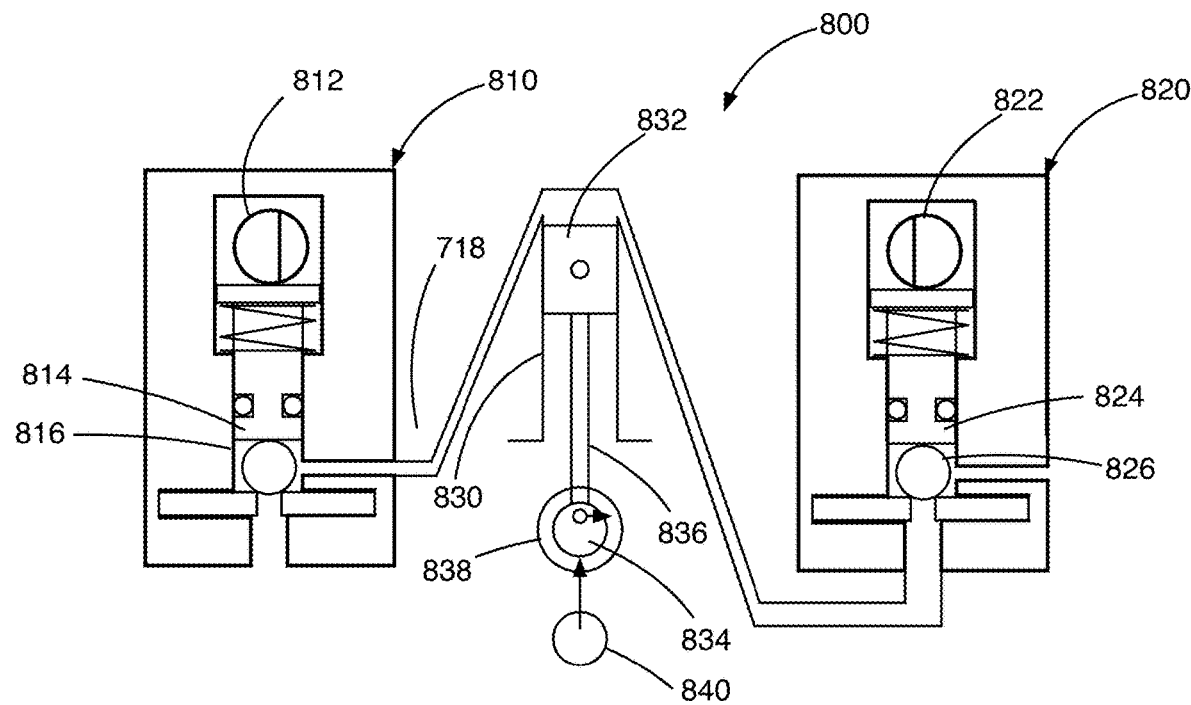
FIG. 8A is a cross-sectional side view of a second embodiment of a pump system in a first state of operation in accordance with the principles of the present invention.

FIG. 8A illustrates another embodiment of a pump, generally indicated at 800 in accordance with the principles of the present invention. The pump 800 is comprised of two valve assemblies 810 and 820. The valve assemblies 810 and 820 are identically configured and as previously described with reference to valve 400 shown and described with reference to FIGS. 4A-4D. The valve 810 includes a cam 812 and the valve 820 includes a cam 822. The cams 812 and 822 are oriented at 180 degrees from one another so that, as will be described in detail herein, when the valve 810 is in the open position the valve 820 is in the closed position and when the valve 820 is in the open position, the valve 810 is in the closed position. At the beginning of the pump cycle as shown in FIG. 8A, both cams 812 and 822 are in a closed position such that the valve heads 814 and 824, respectively, are in contact with their respective valve balls 816 and 826. The outlet 818 of the valve 810 is coupled to and in fluid communication with pump piston cylinder 830. The pump piston cylinder 830 houses a pump piston 832 that is coupled a crank 834 with piston rod 836. A crank seal 838 is provided around the crank 834 to seal the crank 834. An electric motor 840 is coupled to the crank 834 and thus rotatably drives the crank 834. The piston rod 836 is pivotally coupled to the crank 834 in an off center manner so that rotation of the crank causes reciprocal movement of the piston rod 836 and thus vertical movement of the piston 832 within the piston cylinder 830. As will be described in more detail, the crank and cams 812 and 822 are timed so that they work in concert to draw fluid into the pump cylinder 830 when the piston is lowered, the valve 810 is open and the valve 820 is closed. To force the fluid drawn into the pump cylinder 830 through the valve 820, the valve 810 is closed, the valve 820 is opened and the piston is raised within the piston cylinder 830 to force the fluid contained within the piston cylinder through the valve 820. Repeating this cycle provides a precisely measured amount of fluid to flow through the pump 800 depending on the size of the piston cylinder and the rate at which the pump is cycled.

Figure 8B:
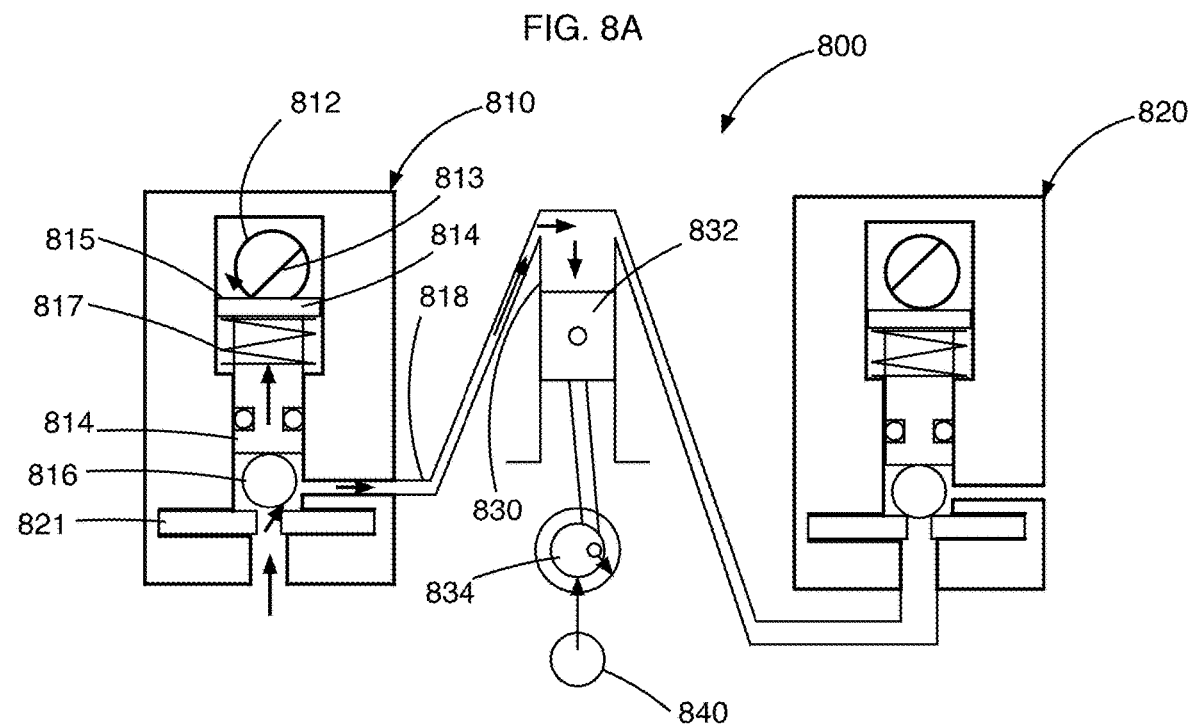
FIG. 8B is a cross-sectional side view of the pump system of FIG. 8A in a second state of operation in accordance with the principles of the present invention.

As shown in FIG. 8B, as the crank 834 continues to rotate, the piston 832 is downwardly pulled. At the same time, the cam 812 of valve 810 is rotated in a clockwise direction so that the cam surface 813 begins to engage with the top surface 815 of the valve head 814. As a result, the coil spring 817 forces the top surface 815 of the valve head 814 into contact with the cam surface 813 thereby causing the valve head 814 to lift relative to the valve ball 816. As the valve ball 816 lifts from the valve seal 821 fluid (represented by arrows) is drawn through the inlet of the valve 810, through the valve outlet and into the piston cylinder 830. Because the valve 820 is still in a closed position, the fluid cannot flow through the inlet of the valve 820 that is in fluid communication with the piston cylinder 830. Just as importantly, fluid at the outlet side of the valve 820 also cannot back flow into the valve cylinder 830 with the valve 820 in the closed position.

Figure 8C:
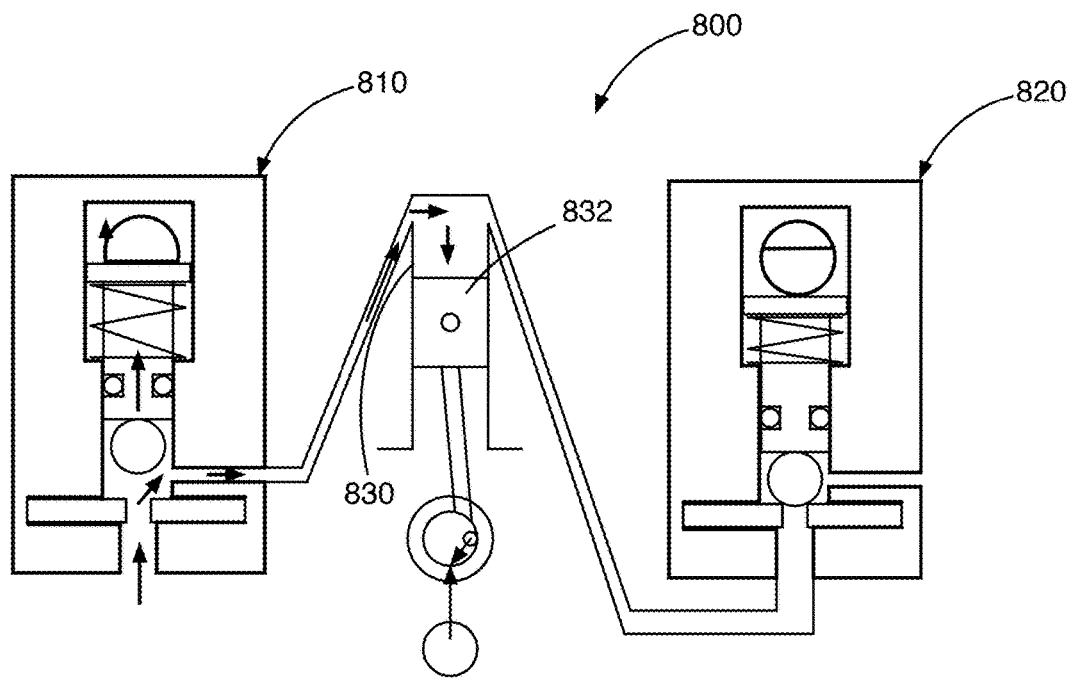
FIG. 8C is a cross-sectional side view of the pump system of FIG. 8A in a third state of operation in accordance with the principles of the present invention.
Figure 8D:
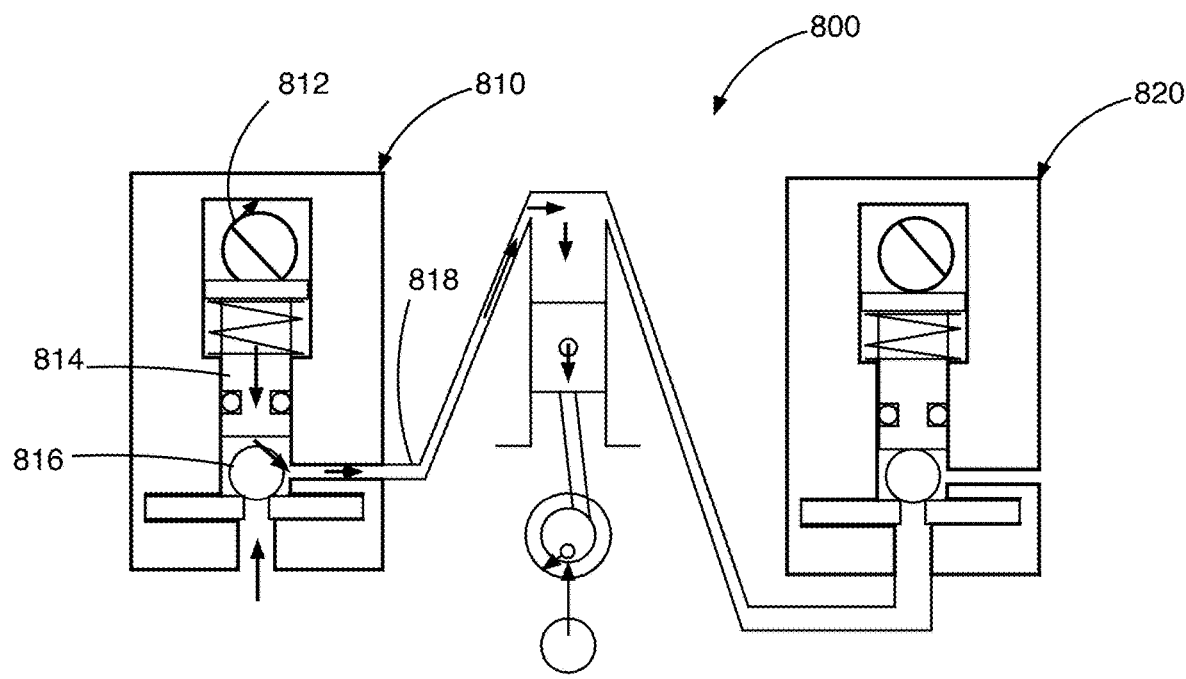
FIG. 8D is a cross-sectional side view of the pump system of FIG. 8A in a fourth state of operation in accordance with the principles of the present invention.

As the valve 810 continues to open as shown in FIG. 8C, which represents the valve 810 in a fully open position, the flow of fluid continues to be drawn into the valve cylinder 830 until the piston 832 reaches its maximum displacement. As further shown in FIG. 8D, when the piston 832 nears the bottom of its stroke, the cam 812 starts to move the valve head 814 toward the valve ball 716. This movement of the valve head 814 causes any residual fluid between the valve head 814 and the valve flap 816 to be forced out the valve outlet 818 while simultaneously forcing the valve ball 816 into a closed position.

Figure 8E:
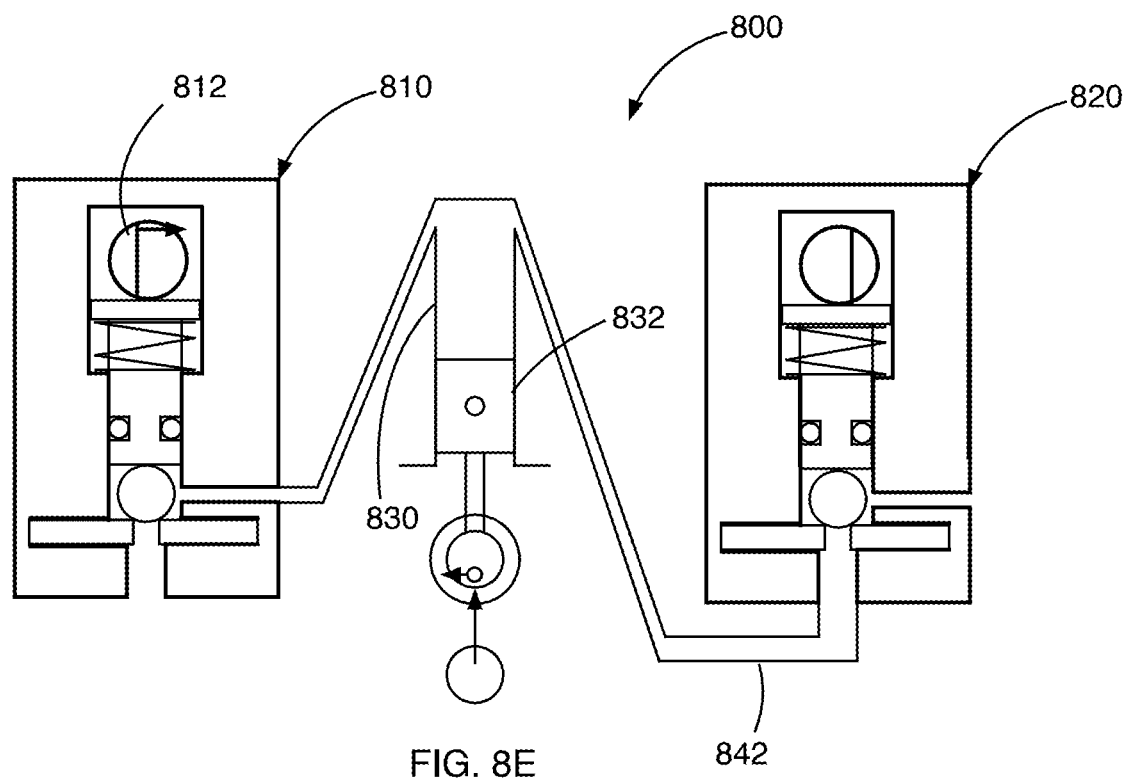
FIG. 8E is a cross-sectional side view of the pump system of FIG. 8A in a fifth state of operation in accordance with the principles of the present invention.

Continued rotation of the cam 812 causes the valve 810 to close, thus preventing any fluid to flow into the piston chamber 830 or fluid in the piston chamber 830 to flow back out the valve 810 as the piston 832 reaches is maximum displacement as shown in FIG. 8E. In this stage of the pump cycle, the valve 820 is also in a closed position to continue to prevent the flow of fluid through the valve 820 until the piston 832 begins its positive stroke to pressurize the fluid in the piston chamber 830 thereby forcing the fluid contained in the valve chamber 830 into the inlet 842 of the valve 820.

Figure 8F:
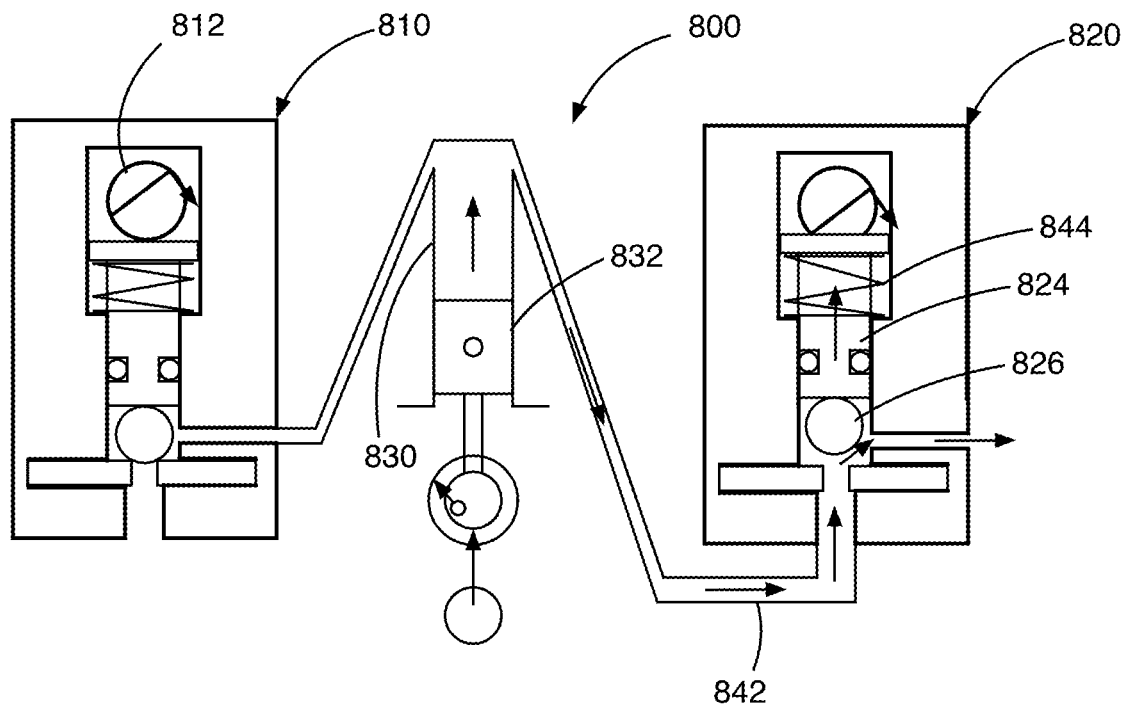
FIG. 8F is a cross-sectional side view of the pump system of FIG. 8A in a sixth state of operation in accordance with the principles of the present invention.
Figure 8G:
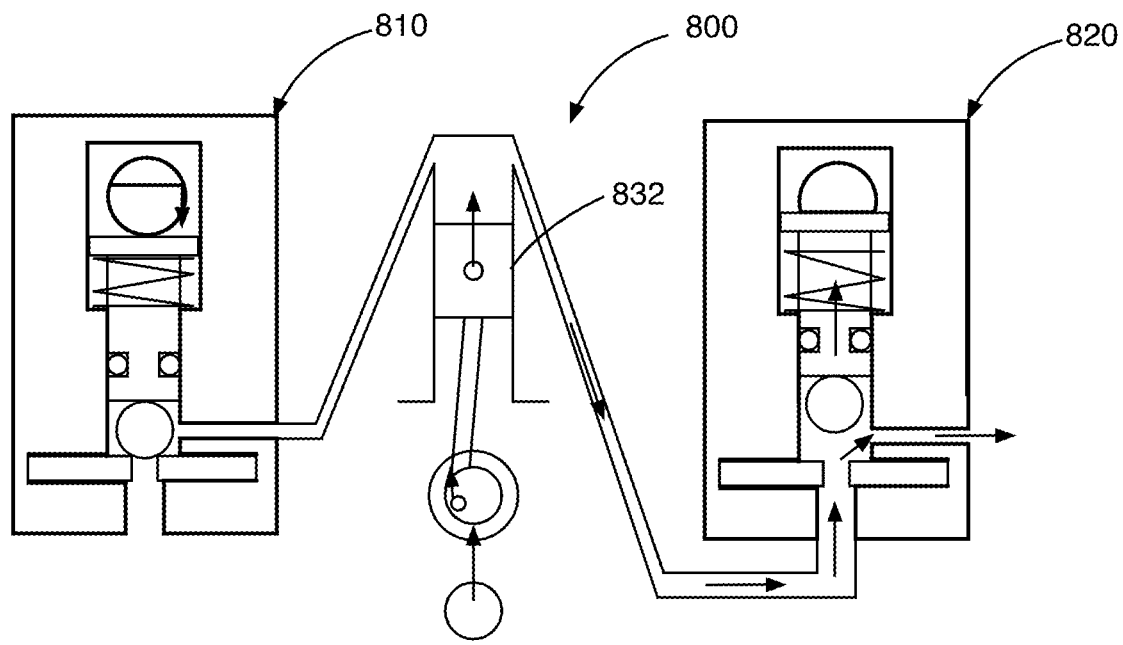
FIG. 8G is a cross-sectional side view of the pump system of FIG. 8A in a seventh state of operation in accordance with the principles of the present invention.

As the piston 832 is advanced into the piston chamber 830 as shown in FIG. 8F, the cam 822 is rotated to simultaneously open the valve 820 as the piston 832 pressurizes the fluid in the piston cylinder 830. The pressurized fluid enters the inlet 842 of the valve 820 and forces the valve flap 826 against the valve head as it is raised by the spring 844. As further shown in FIG. 8G, as the piston 832 continues its positive stroke, the valve 820 continues to open so that the fluid will continue to flow through the valve 820.

Figure 8H:
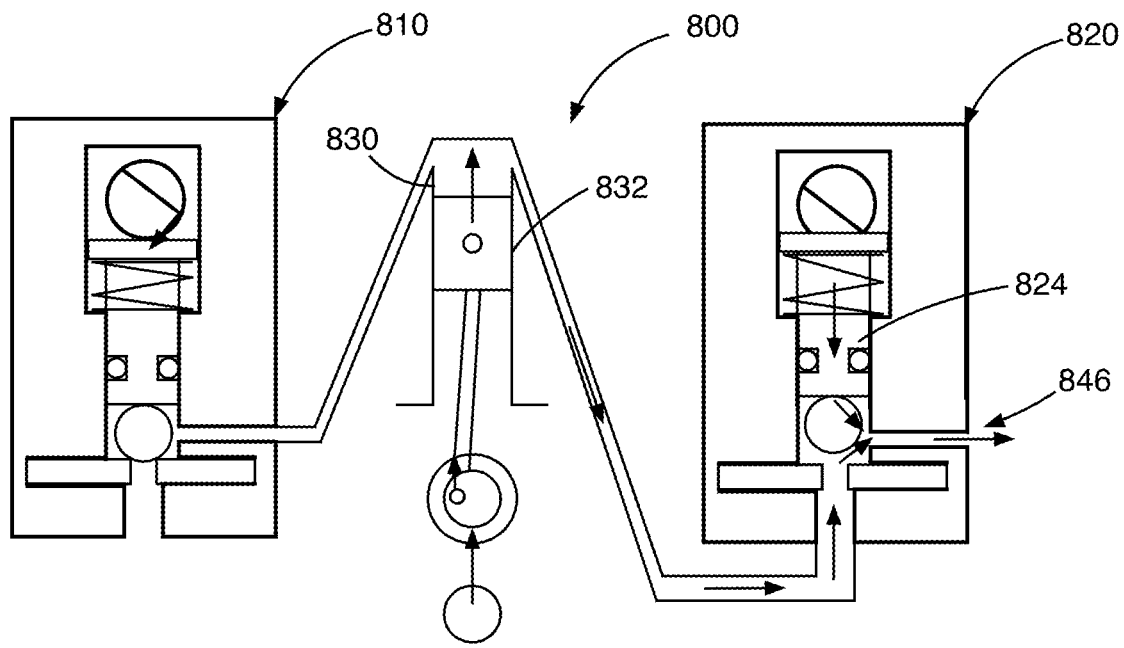
FIG. 8H is a cross-sectional side view of the pump system of FIG. 8A in an eighth state of operation in accordance with the principles of the present invention.

As shown in FIG. 8H, as the piston 832 continues to apply positive pressure to the fluid in the piston cylinder 830, the valve 820 begins to close. The valve 810 also remains closed during this phase of the pump cycle. As the valve 820 begins to close, any fluid that exists between the valve head 824 and the valve flap 826 is forced through the outlet 846 of the valve 820 as well as fluid that is continued to be forced through the valve 820 by the piston 832.

At the end of the pump cycle, the valves 810 and 820 return to the starting position as shown in FIG. 8A in which both valves are closed. The pump cycle then repeats through each of the valve cycle phases as described with reference to FIGS. 8B-8H. Because the diameters of the valve heads and piston of the present invention are small, relatively high pressures can be accommodated. Despite being small, however, the pump system is capable of delivering significant volumes of fluid by rapid cycling of the pump system 800.

Figure 9:
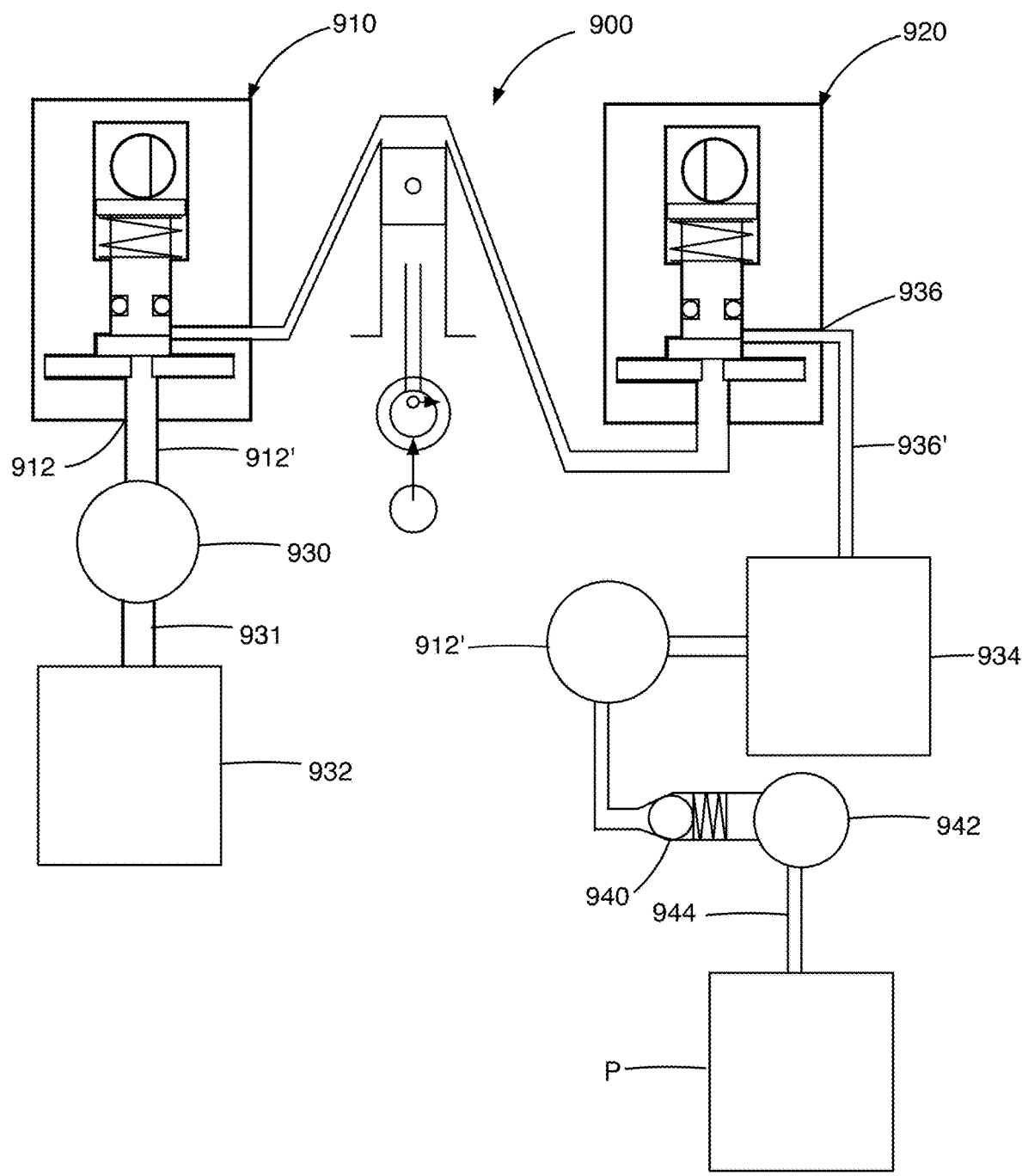
FIG. 9 is a cross-sectional side view of a first embodiment of a drug pump system in accordance with the principles of the present invention.

Referring now to FIG. 9, there is illustrated a drug pump, generally indicated at 900, in accordance with the principles of the present invention. The drug pump 900 is comprised of two valve assemblies 910 and 920 and a motor driven piston assembly 930. The valve assemblies 910 and 920 and piston assembly 930 comprise a pump system that is similar to and operates in a similar manner to the pump system 700 shown and described with reference to FIGS. 7A-7I.

The input 912 of the valve 910 is coupled to and in fluid communication with a pressure sensor 930. The pressure sensor 930 senses fluid pressure on the inlet line 912'. A low pressure from the pressure sensor 930 may indicate a blockage in the line 931 to the IV bag 932 or that the IV bag 932 is empty.

In order to ensure that air bubbles are not injected into the patient, an air bubble removal chamber 934 is coupled to an outlet line 936' that is in fluid communication with outlet 936 of the valve 920. The air bubble removal chamber 934 comprises a gas permeable membrane through which air bubbles pass and through which the liquid in the system cannot. Thus, the air bubble removal chamber efficiently removes air from the fluid exiting the valve 920 before the fluid enters the patient P. In order to ensure that fluid is flowing through the air bubble removal chamber 934, a pressure sensor 938 is coupled to the air bubble removal device. The pressure sensor 938 checks to ensure that fluid is flowing through the system. If only air is present, fluid pressure is not able to be built up in the air bubble removal chamber.

The system 900 also includes a pressure check valve 940. The check valve 940 slightly elevates the pressure in the air bubble removal chamber thus making the air bubbles smaller and able to pass through the air bubble removal membrane more quickly. The check valve also prevents back flow of fluid from the patient P into the system 900 that could otherwise contaminate the pump. A pressure out sensor 942 is coupled to the check valve 940. The pressure out sensor 942 senses fluid pressure on the outlet line 944 that is going to the patient P. A high pressure detected by the pressure out sensor 942 indicates that the line to the patient may be blocked.

Figure 10A:
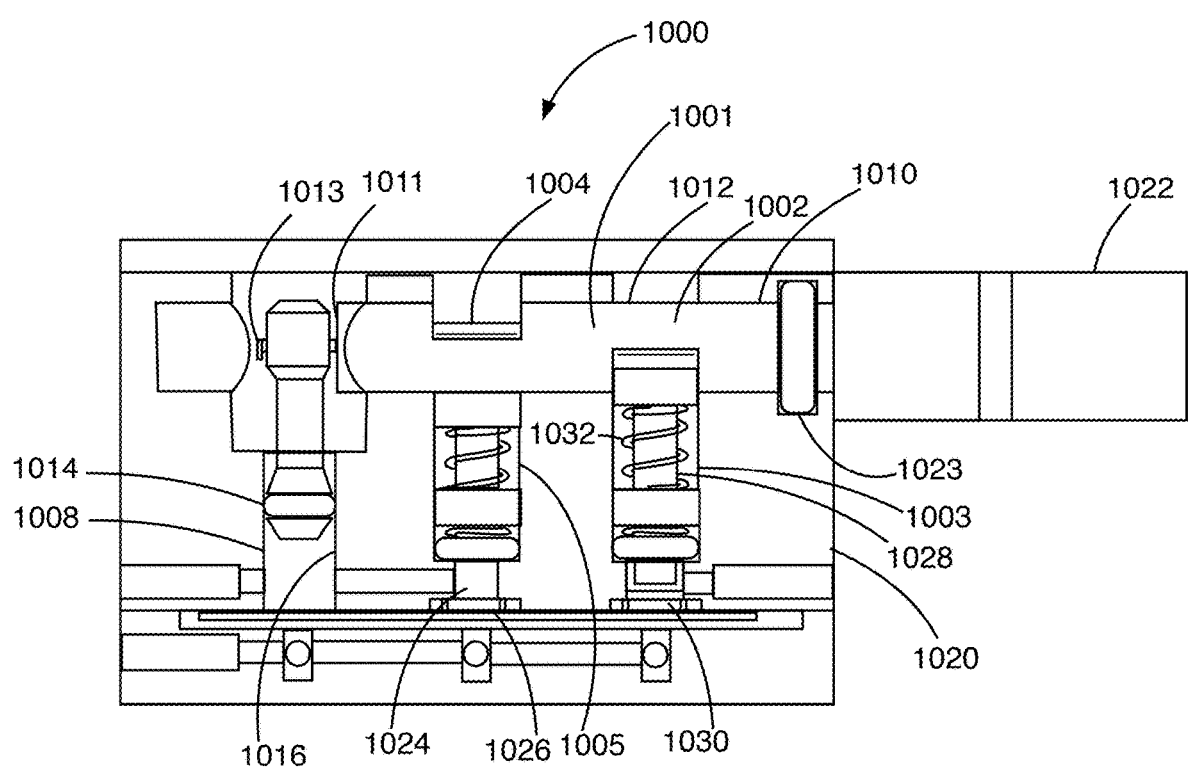
FIGS. 10A and 10B are a side plan view and a side perspective view, respectively, of a second embodiment of a pump system in accordance with the principles of the present invention.
Figure 10B:
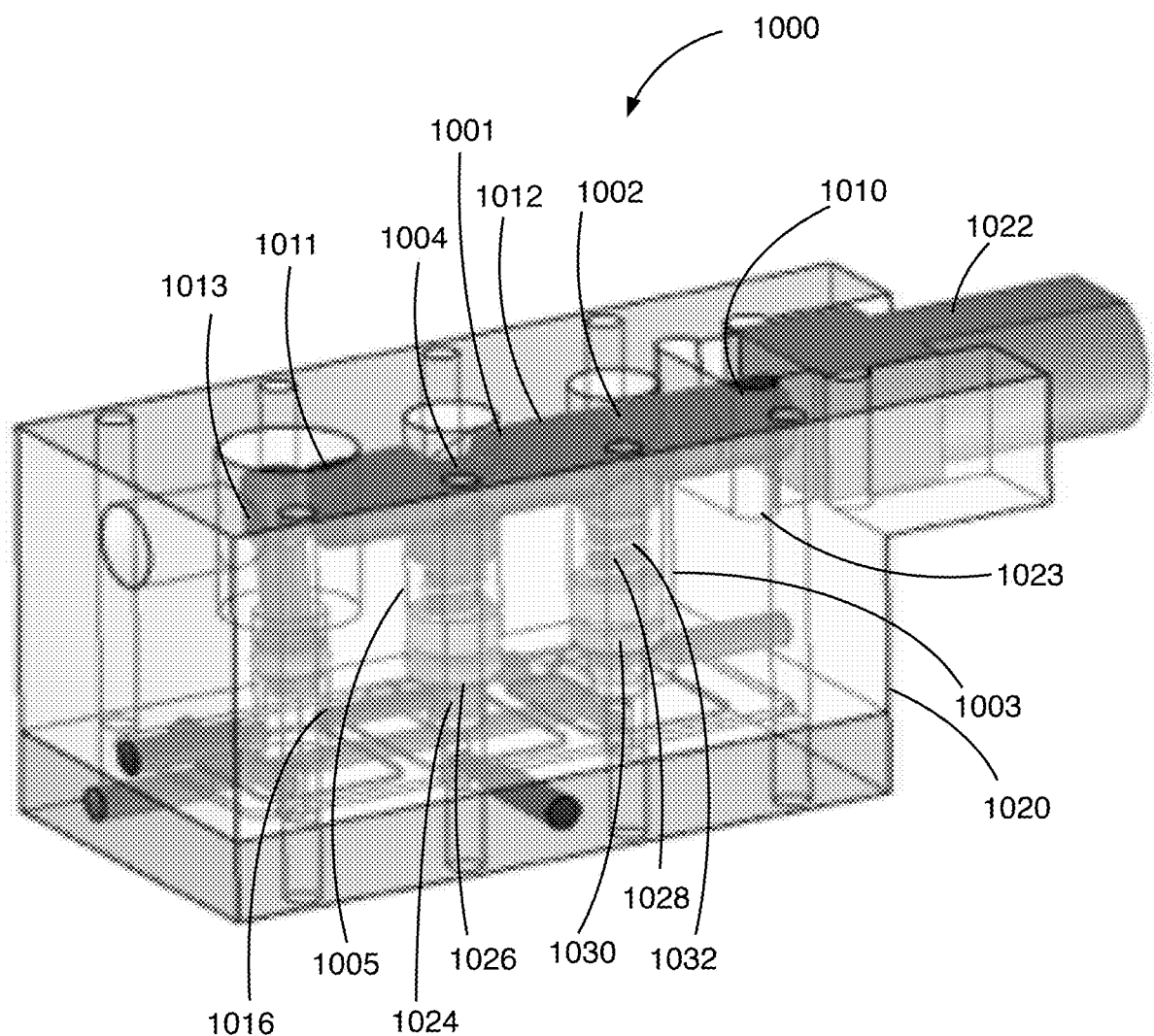
Figure 10C:
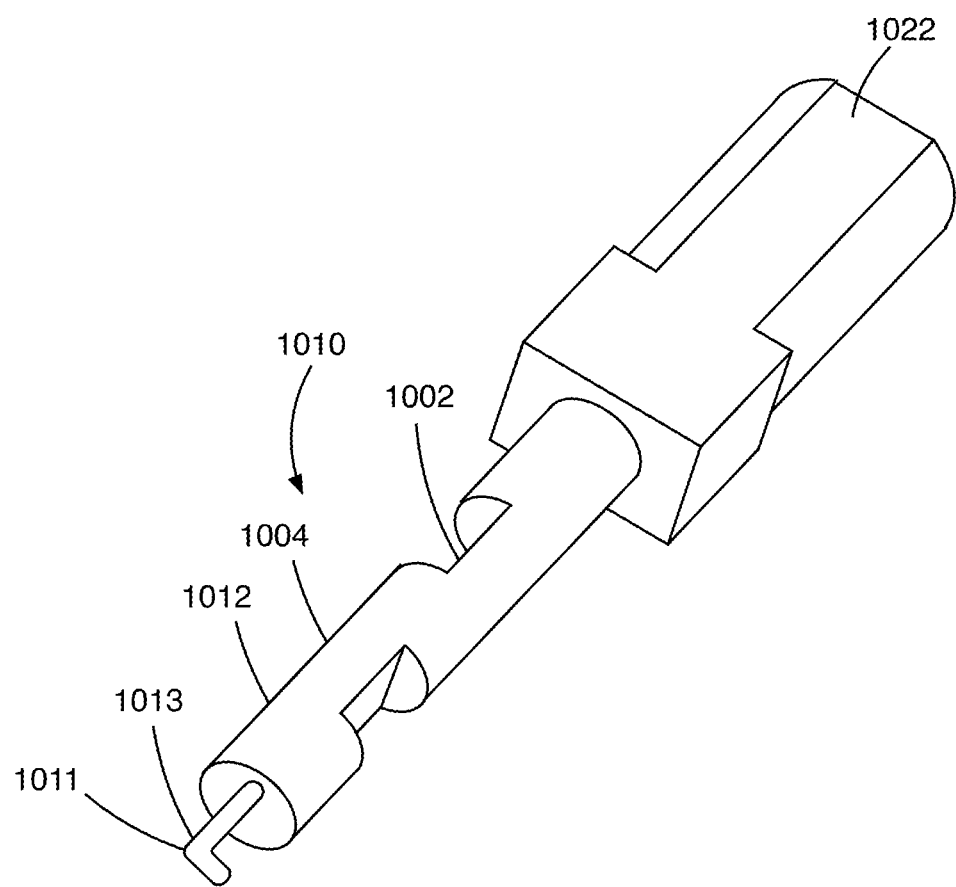
FIG. 10C is a side perspective view of the combination crank and cam shaft shown in FIGS. 10A and 10B according to the principles of the present invention.

Referring now to FIGS. 10A and 10B, there is illustrated a pump, generally indicated at 1000, in accordance with the principles of the present invention. While the foregoing embodiments illustrate a pump in which the cams and crank shaft may be separate components separately driven by separate motors or by a single motor that is coupled to each component with a linkage, the present invention contemplates a combination crank shaft and cam shaft. In this embodiment, in order to ensure that the two cam portions 1002 and 1004 of the shaft 1001 for the valves 1003 and 1005, respectively, and the pump 1008 are precisely timed, the shaft comprises a combination crank shaft and cam shaft or cramshaft 1010. As also show in FIG. 10C, the cramshaft 1010 comprises a cam shaft along its length with cam surfaces 1002 and 1004 and a distal end forming a crack shaft portion 1011 in which an elongate rod 1013 extending from the distal end of the cramshaft 1010 that is offset from a centerline of the cramshaft 1010 so that upon rotation of the cramshaft 1010, the rod 1013 moves in a circular path. The crank shaft portion 1011 of the combination crank shaft and cam shaft engages the top end of the piston 1014 and as it is rotated by the cramshaft 1010 operates the piston 1014 in an oscillating manner within the pump chamber 1016 while the cam shaft portion 1012 of the cramshaft 1010 synchronizes the operation of the cams 1002 and 1004 of the respective valve assemblies 1003 and 1005.

The pump 1000 is comprised of a pump housing 1020 to which an electric motor 1022 is coupled. The motor 1022 is coupled to and rotates the cramshaft 1010. The speed of the motor 1022, in combination with the cycle volume of the pump 1000, dictates the volume of fluid that can be pumped. For example, if the single cycle pump volume is 0.05 ml, and the electric motor rotates the combination crank shaft and cam shaft at 20 rpm. The pump 1000 would deliver 1 ml of fluid per minute. The combination crank shaft and cam shaft 1010 is sealed to the housing 1020 with a toroidal combination crank shaft and cam shaft seal 1022, which may be in the form of a sliding O-ring.

As shown in FIGS. 10A and 10B, the pump is in a particular stage of operation. Here the inlet valve 1005 is in a closed position, with the valve head 1024 in contact with the valve seal 1026 and the outlet valve 1003 is in an open position with the valve head 1028 being forced away from the valve seal 1030 by the spring 1032 as allowed by the cam 1002. The piston 1014 of the pump is being forced by the cam portion 1011 of the cramshaft 1010 into the pump chamber 1016 to force fluid contained in the pump chamber 1016 into the outlet valve 1003.

Figure 11:
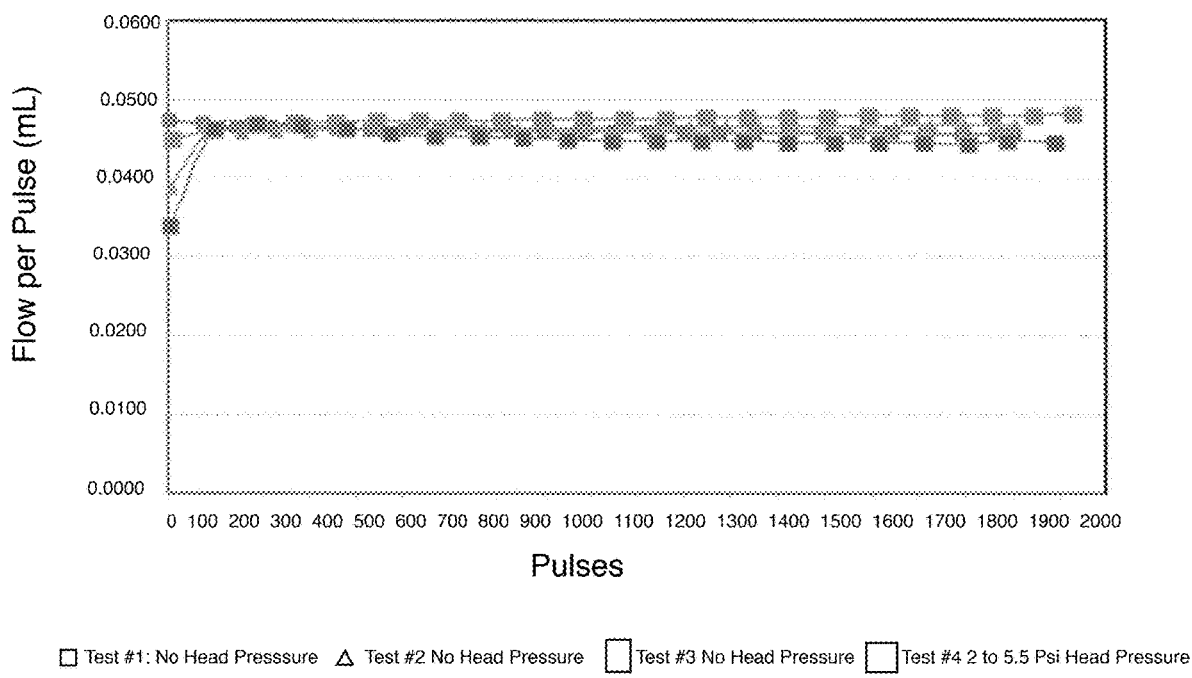
FIG. 11 is a graph of pump flow per pulse of a pump configured in accordance with the principles of the present invention.
Figure 12:
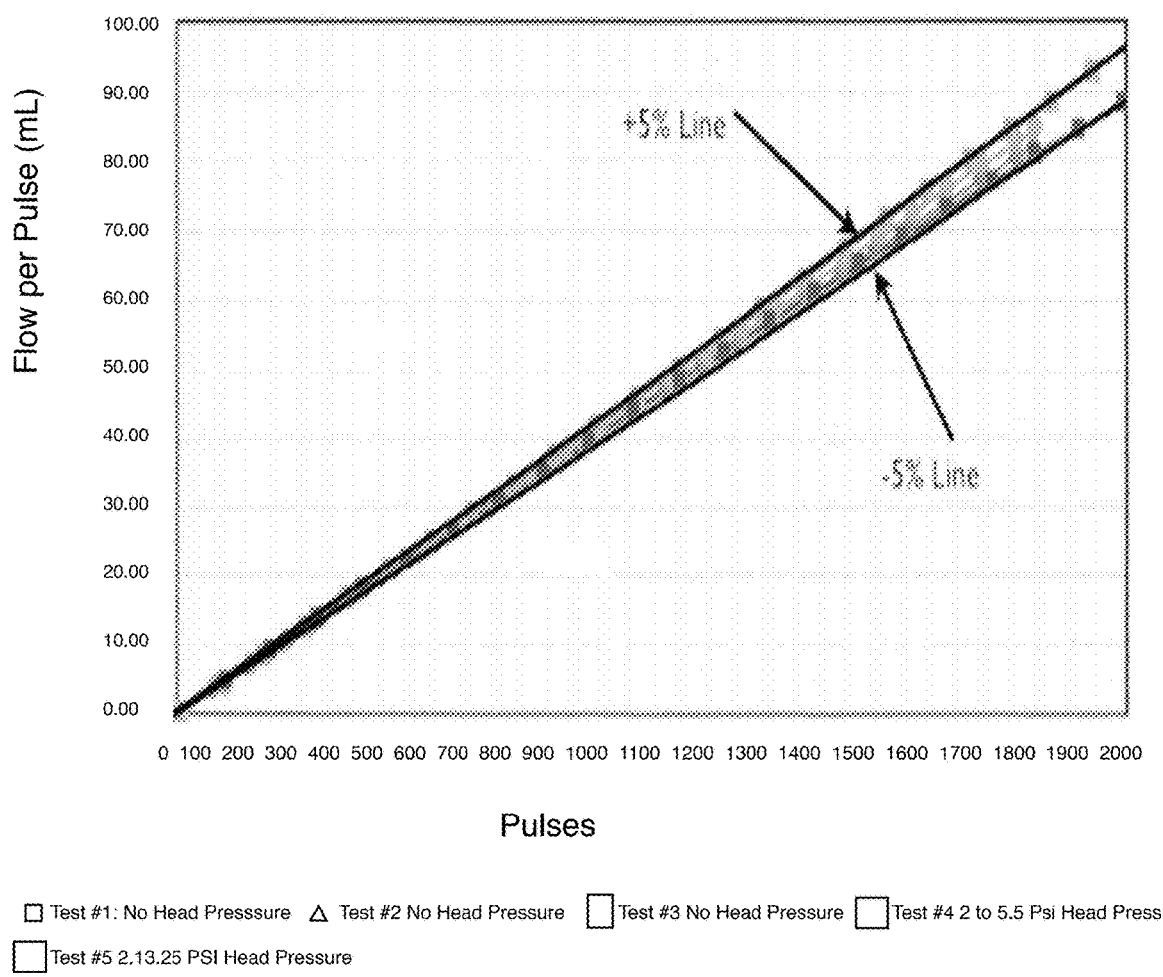
FIG. 12 is a graph of pump total flow per pulse count of a pump configured in accordance with the principles of the present invention.

As shown in the graph of FIG. 11, the pump 1000 is capable of maintaining relatively constant pulsed flow. The graph represents four tests of the pump 1000. The y-axis (Flow per Pulse (mL)) is the volume of fluid that exited the pump each cycle. The x-axis (Pulses) is the number of times the pump made a full cycle. It also represents time since the pump is turning at a constant speed. Test 1 was performed with zero pressure at the outlet. Test 2 was performed with zero pressure at the outlet. Test 3 was performed with zero pressure at the outlet. Test 4 was performed with 5.5 psi at the outlet. Thus, even with elevated pressures, the pump is within ±5% volumetric accuracy.

The First pulse is a startup pulse and will deviate as shown in the graph. The reason is that the pump has to build some output pressure and it takes a few pulse to do this. Note the ratio of one pulse out of 2000 pulses. So ½₀₀₀=0.05% Even if it is 10 pulses to get to pressure, the worse deviation is 0.5% on the entire run. In addition, these pulse are moving fluid as shown above so the deviation is much less than 0.5%.

Power consumption for the pumps of the present invention have been demonstrated to operate at 0.22 W or less. For a pump according to the present invention, that means that the pump can run for an hour on no more than 792 J of energy. An "AAA" battery produces 6210 of energy. A coin battery (CR2032) provides 3 volts and 225 mAH. Two such coin batteries will produce 4850 J. As such, the pump of the present invention could operate for several hours on a single small battery.

Figure 13:
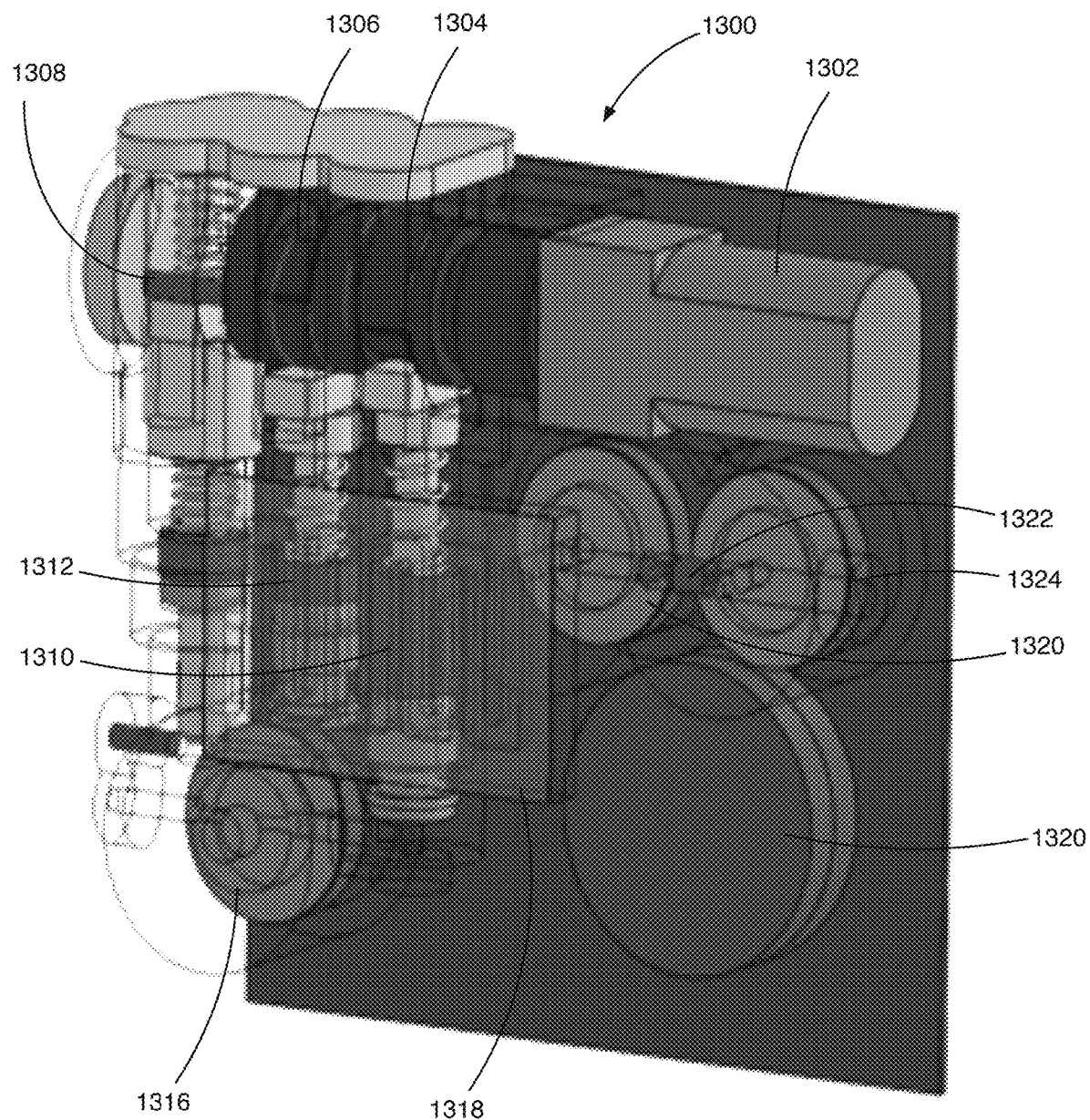
FIG. 13 is a perspective side view of a third embodiment of a drug pump system in accordance with the principles of the present invention.

Thus, as shown in FIG. 13, a compact drug pump 1300 is illustrated. The drug pump 1300 comprises a motor 1302 for driving the cams 1304 and 1306. A crank 1308 is integrally formed with the cams 1304 and 1306. The in valve 1310 is coupled to the first cam 1304 and the out valve 1312 is coupled to the second cam 1306.

Batteries 1314 are electrically coupled to the motor 1302 to provide power to the motor 1314.

Inlet pressure sensor 1316 is coupled to the inlet valve while bubble remover 1318, bubble pressure sensor 1320, pressure check valve 1322 and outlet pressure sensor 1324 are coupled to the outlet of the out valve 1312. The various sensors and check valve are arranged similarly to the arrangement of such components shown in FIG. 9.

Figure 14A:
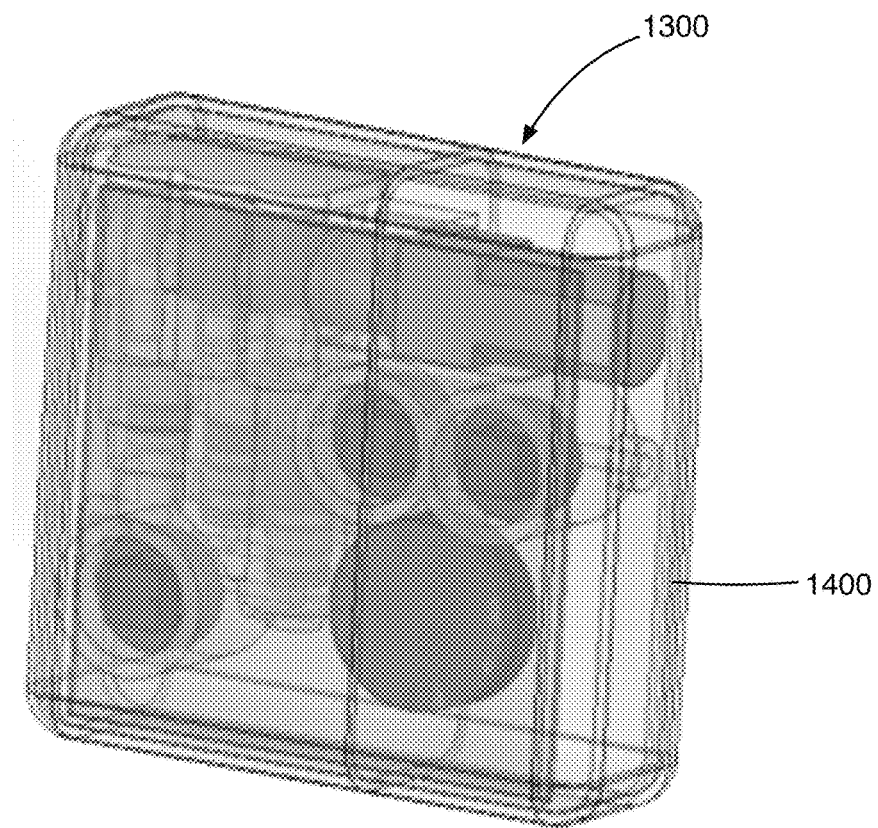
FIG. 14A is a perspective front side view of a case for a drug pump system in accordance with the principles of the present invention.
Figure 14B:
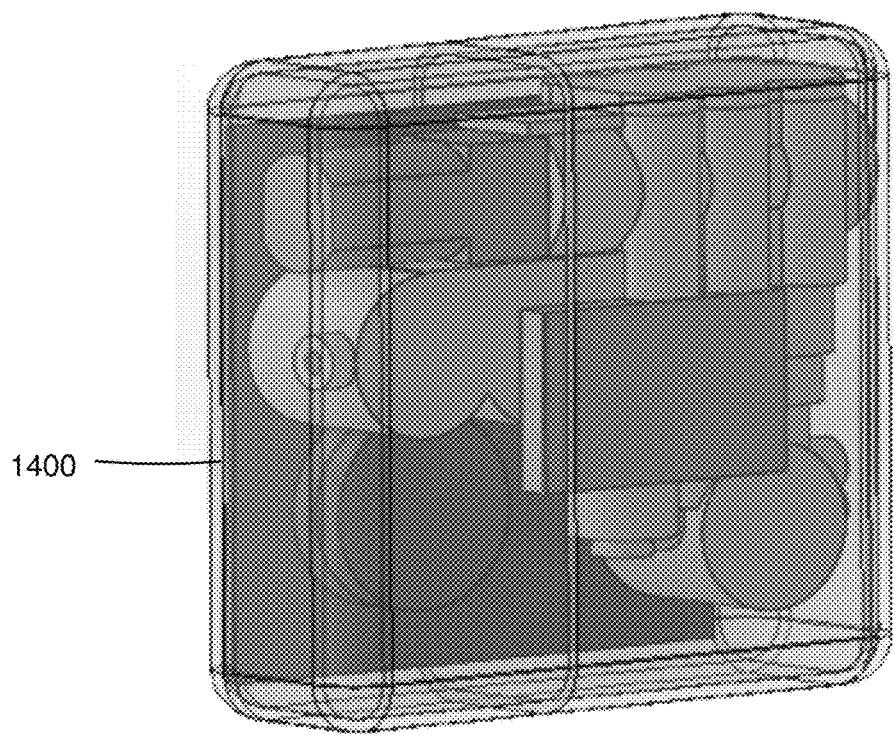
FIG. 14B is a perspective back side view of the case shown in FIG. 14A.

As shown in FIGS. 14A and 14B, the compact drug pump 1300 illustrated in FIG. 13 is housed within a case 1400, such as a plastic clam-shell type case to protect the components of the pump 1300.

Figure 15A:
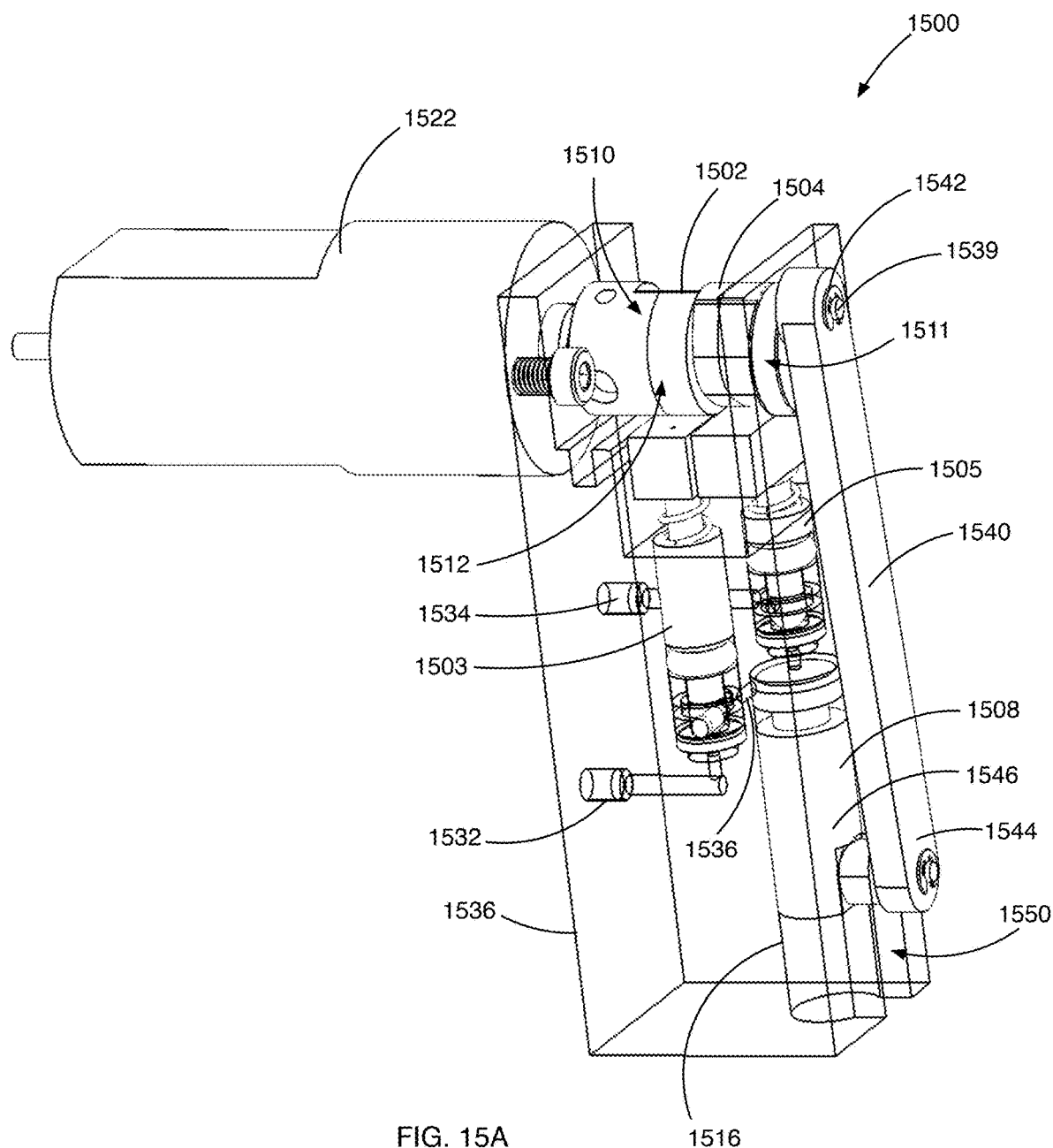
FIG. 15A is a first perspective side view of a fourth embodiment of a drug pump system in accordance with the principles of the present invention.
Figure 15B:
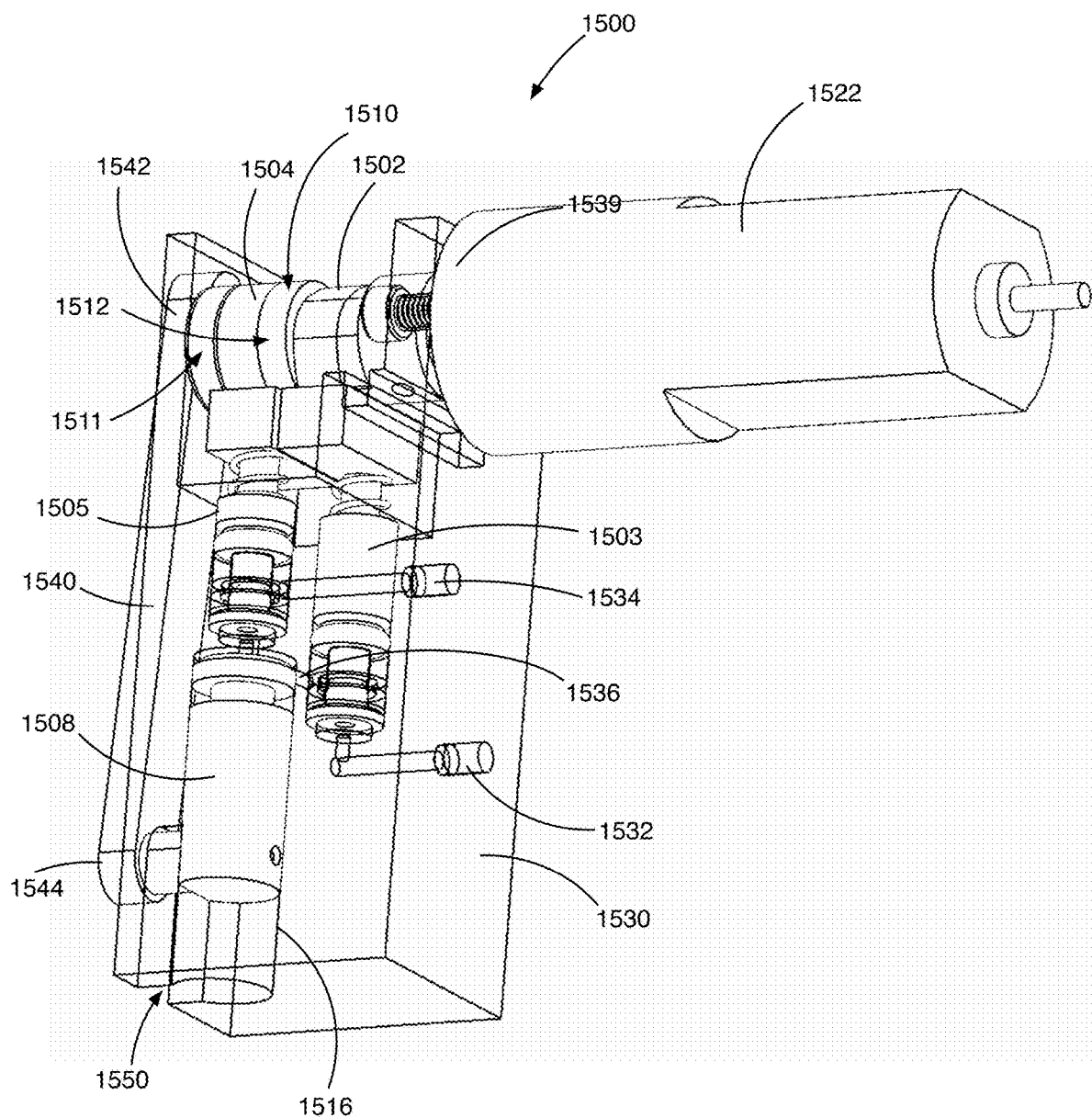
FIG. 15B is a second perspective side view of the drug pump system shown in FIG. 15A.

Referring now to FIGS. 15A and 15B, there is illustrated another embodiment of a pump, generally indicated at 1500, in accordance with the principles of the present invention. Similar in concept to the pump 1000 illustrated and described with reference to FIG. 10, a single motor is coupled to a combination crank shaft and cam assembly for mechanically actuating the various components of the pump 1500. In this embodiment, in order to ensure that the two cams 1502 and 1504 of the valves 1503 and 1505, respectively, and the pump 1508 are precisely timed, a combination crank shaft and cam shaft 1510 is employed. The combination crank shaft and cam shaft 1510 is a combination crank shaft and cam shaft. The crank shaft portion 1511 of the combination crank shaft and cam shaft 1510 operates the piston 1514 in the pump chamber 1516 while the cam shaft portion 1512 of the combination crank shaft and cam shaft 1510 synchronizes the operation of the cams 1502 and 1504 of the respective valve assemblies 1503 and 1505.

The pump 1500 is comprised of an electric motor 1522 that is coupled to the combination crank shaft and cam shaft 1510. The motor 1522 rotates the combination crank shaft and cam shaft 1510. The speed of the motor 1522, in combination with the cycle volume of the pump 1500, dictates the volume of fluid that can be pumped. For example, if the single cycle pump volume is 0.05 ml, and the electric motor rotates the combination crank shaft and cam shaft at 20 rpm. The pump 1500 would deliver 1 ml of fluid per minute.

The valves 1503 and 1505 are housed within a housing body 1530, within which are formed an inlet passage 1532 and an outlet passage 1534. The inlet passage is in fluid communication with the inlet of the first valve 1503 and the outlet passage is in fluid communication with the outlet of the second valve 1505. The outlet 1536 of the first valve is in fluid communication with an inlet of the pump 1508. Likewise, the inlet of the second valve 1505 is in fluid communication with the outlet of the pump 1508. The operation of the valves 1503 and 1505 in concert with the movement of the pump 1508 via the combination crank shaft and cam shaft 1510 is similar to the movement of other embodiments of pumps herein described.

The crank portion 1511 of the combination crank shaft and cam shaft 1510 includes a crank shaft 1539 that is coupled to a crank arm 1540 at a proximal end 1542 thereof. The crank member 1539 is offset from the center of rotation of the crank portion 1511 of the combination crank shaft and cam shaft 1510 so that as the combination crank shaft and cam shaft rotates, the crank member 1539 moves in a circular motion, which motion is determined by the radial distance the crank member 1539 is from the center of rotation of the combination crank shaft and cam shaft 1510. The distal end 1544 of the crank arm is coupled to the piston 1546 of the pump 1508. In this configuration, the pump piston 1546 is driven vertically back and forth within the pump chamber 1516 as the crank arm 1540 pushes or pulls the piston 1546 of the pump 1508 as the crank member 1539 rotates. By attaching the distal end 1544 of the crank arm 1540 to the piston body 1546 of the pump 1508, the crank arm 1540 does not need to be sealed relative to the pump body 1530. A vertical slot 1550 in the side of the pump body 1530 provides an opening for the distal end 1544 of the crank arm 1540 to be coupled to the piston 1546 of the pump 1530. The slot 1550 is long enough to allow full range of motion of the crank arm 1540 with the piston 1546 sealed to the pump housing 1530 above the slot 1550.

Figure 16A:
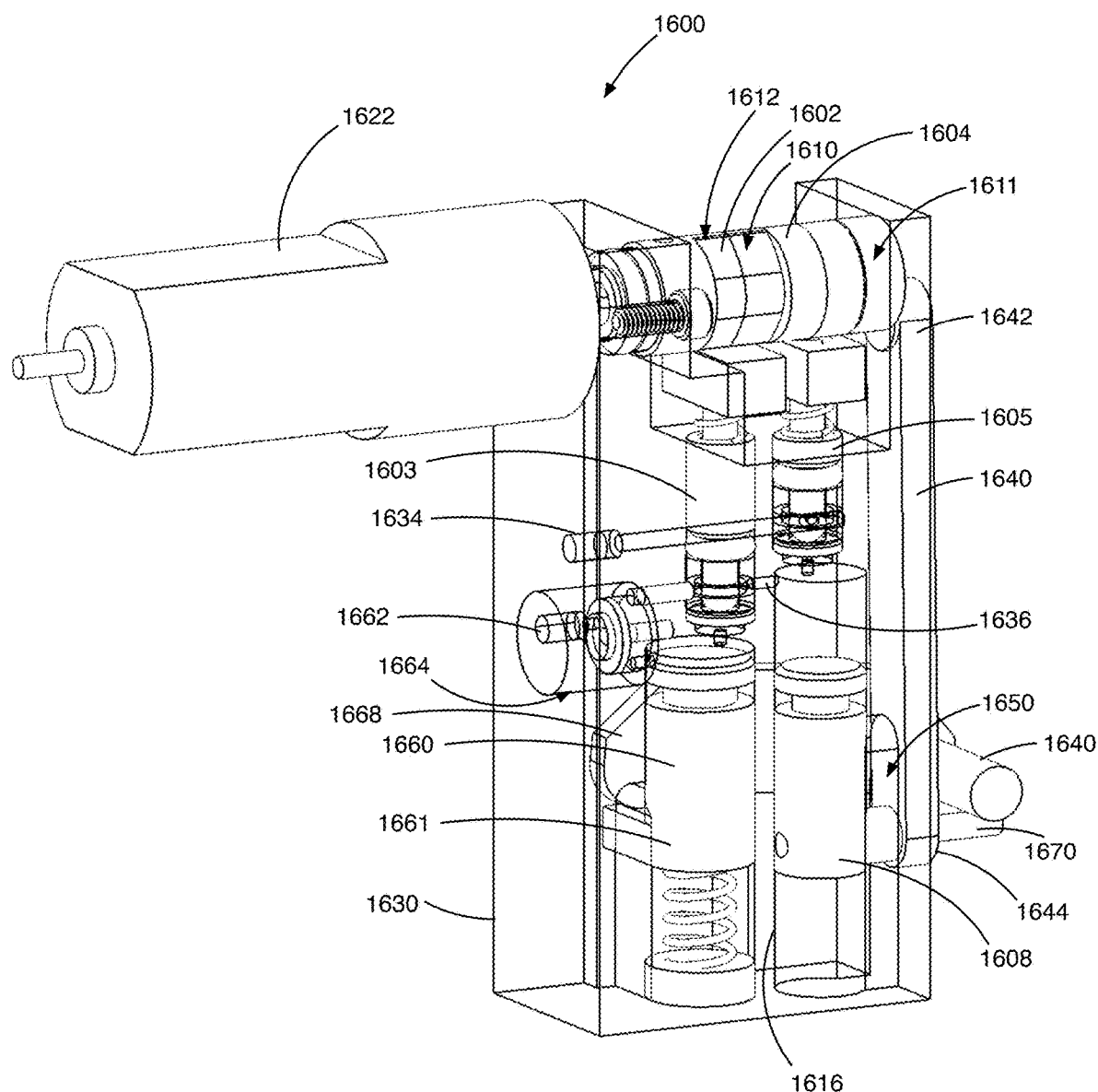
FIG. 16A is a first perspective side view of a fifth embodiment of a drug pump system in accordance with the principles of the present invention.
Figure 16B:
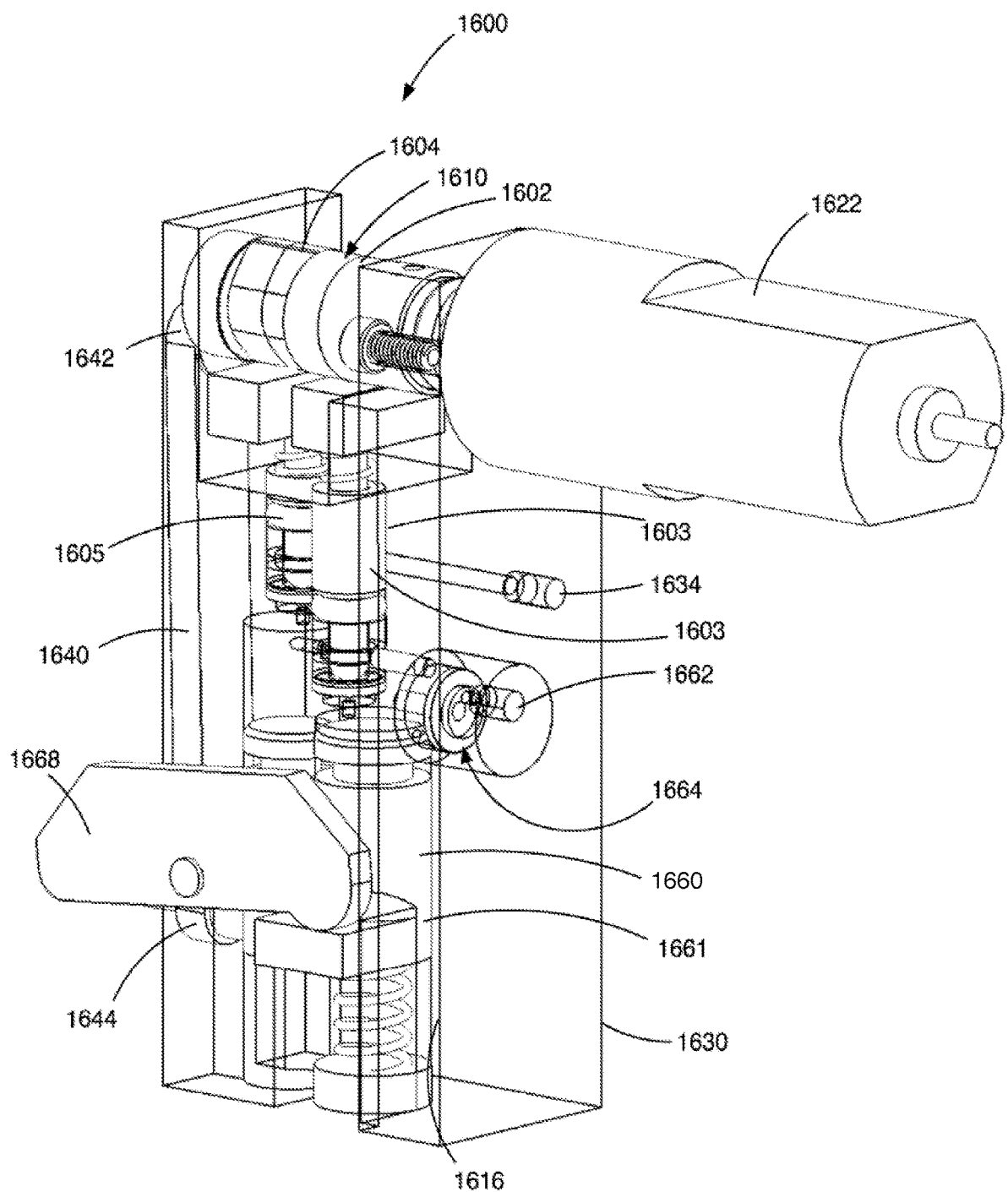
FIG. 16B is a second perspective side view of the drug pump system shown in FIG. 16A.
Figure 16C:
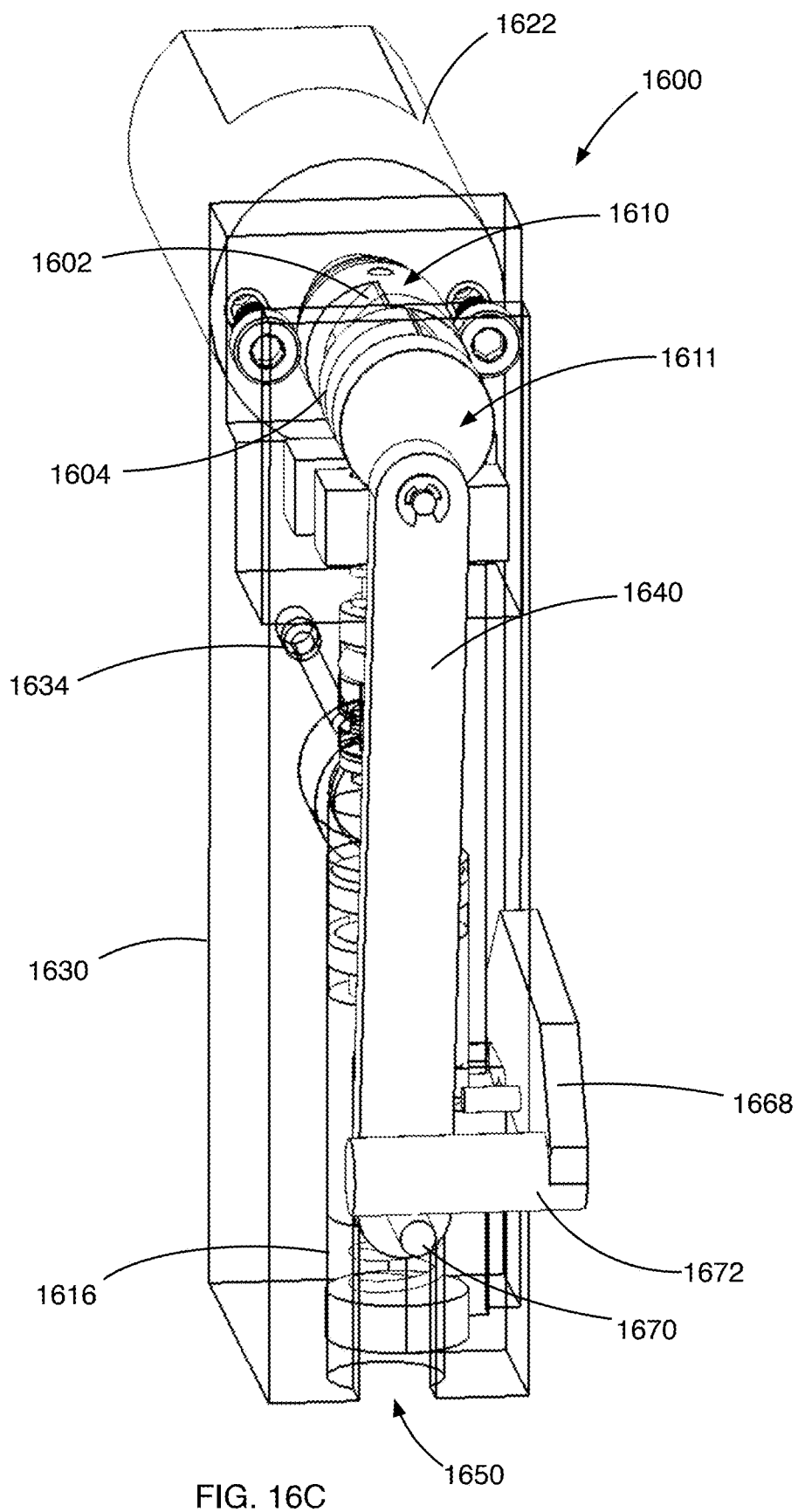
FIG. 16C is a third perspective side view of the drug pump system shown in FIGS. 16A and 16B.

Referring now to FIGS. 16A, 16B and 16C, there is illustrated another embodiment of a pump, generally indicated at 1600, in accordance with the principles of the present invention. Similar in concept to the pump 1500 illustrated and described with reference to FIGS. 15A and 15B, a single motor is coupled to a combination crank shaft and cam assembly for mechanically actuating the various components of the pump 1600. In this embodiment, in order to ensure that the two cams 1602 and 1604 of the valves 1603 and 1605, respectively, and the pump 1608 are precisely timed, a combination crank shaft and cam shaft 1610 is employed. The combination crank shaft and cam shaft 1610 is a combination crank shaft and cam shaft. The crank shaft portion 1611 of the combination crank shaft and cam shaft 1610 operates the piston 1614 in the pump chamber 1616 while the cam shaft portion 1612 of the combination crank shaft and cam shaft 1610 synchronizes the operation of the cams 1602 and 1604 of the respective valve assemblies 1603 and 1605.

The pump 1600 is comprised of an electric motor 1622 that is coupled to the combination crank shaft and cam shaft 1610. The motor 1622 rotates the combination crank shaft and cam shaft 1610. The speed of the motor 1622, in combination with the cycle volume of the pump 1600, dictates the volume of fluid that can be pumped. For example, if the single cycle pump volume is 0.05 ml, and the electric motor rotates the combination crank shaft and cam shaft at 20 rpm. The pump 1600 would deliver 1 ml of fluid per minute.

The valves 1603 and 1605 are housed within a housing body 1630, within which are formed an inlet passage 1632 and an outlet passage 1634. The inlet passage is in fluid communication with the inlet of the first valve 1603 and the outlet passage is in fluid communication with the outlet of the second valve 1605. The outlet 1636 of the first valve is in fluid communication with an inlet of the pump 1608. Likewise, the inlet of the second valve 1605 is in fluid communication with the outlet of the pump 1608. The operation of the valves 1603 and 1605 in concert with the movement of the pump 1608 via the combination crank shaft and cam shaft 1610 is similar to the movement of other embodiments of pumps herein described.

The crank portion 1611 of the combination crank shaft and cam shaft 1610 includes a crank shaft 1639 that is coupled to a crank arm 1640 at a proximal end 1642 thereof. The crank member 1639 is offset from the center of rotation of the crank portion 1611 of the combination crank shaft and cam shaft 1610 so that as the combination crank shaft and cam shaft rotates, the crank member 1639 moves in a circular motion, which motion is determined by the radial distance the crank member 1639 is from the center of rotation of the combination crank shaft and cam shaft 1610. The distal end 1644 of the crank arm is coupled to the piston 1646 of the pump 1608. In this configuration, the pump piston 1646 is driven vertically back and forth within the pump chamber 1616 as the crank arm 1640 pushes or pulls the piston 1646 of the pump 1608 as the crank member 1639 rotates. By attaching the distal end 1644 of the crank arm 1640 to the piston body 1646 of the pump 1608, the crank arm 1640 does not need to be sealed relative to the pump body 1630. A vertical slot 1650 in the side of the pump body 1630 provides an opening for the distal end 1644 of the crank arm 1640 to be coupled to the piston 1546 of the pump 1630. The slot 1650 is long enough to allow full range of motion of the crank arm 1640 with the piston 1646 sealed to the pump housing 1630 above the slot 1650.

In order to prime the system a priming pump 1660 is coupled to the inlet 1635 of the valve 1603. The inlet 1662 of the pump housing 1630 is provided with a check valve 1664, which prevents back flow from the priming pump 1660. In order to drive the priming pump 1660, a lever member 1668 is pivotally attached to the pump housing 1630. One side of the lever 1668 is coupled to the distal end 1644 of the crank arm 1640. The distal end 1644 of the crank arm 1640 is provided with a perpendicularly extending rod 1670. The rod 1670 engages with a lever bar 1672 that is attached to and perpendicularly extends from a proximal end of the lever 1668. The distal end of the lever 1668 is coupled to the piston body 1661 of the primer pump 1660 in a similar manner as the connection of the crank arm 1640 to the piston of the pump 1608. As such, actuation of the primer pump 1660 is synchronized with the movement of the other pump system components. Thus, at the beginning of the pump cycle, fluid is drawn into the inlet 1662 of the pump housing 1630 by the primer pump 1660. As the first valve 1603 opens, the direction of the primer pump is reversed so as to force fluid into the inlet of the first valve 1603 to provide an initial priming of fluid into the system and to offset the volume of empty space of the pump 1600 at the start up of the pump. As such, the initial dosage of fluid flowing through the pump 1600 is more precise as a result of the initial priming of the pump by the primer pump.

Figure 17:
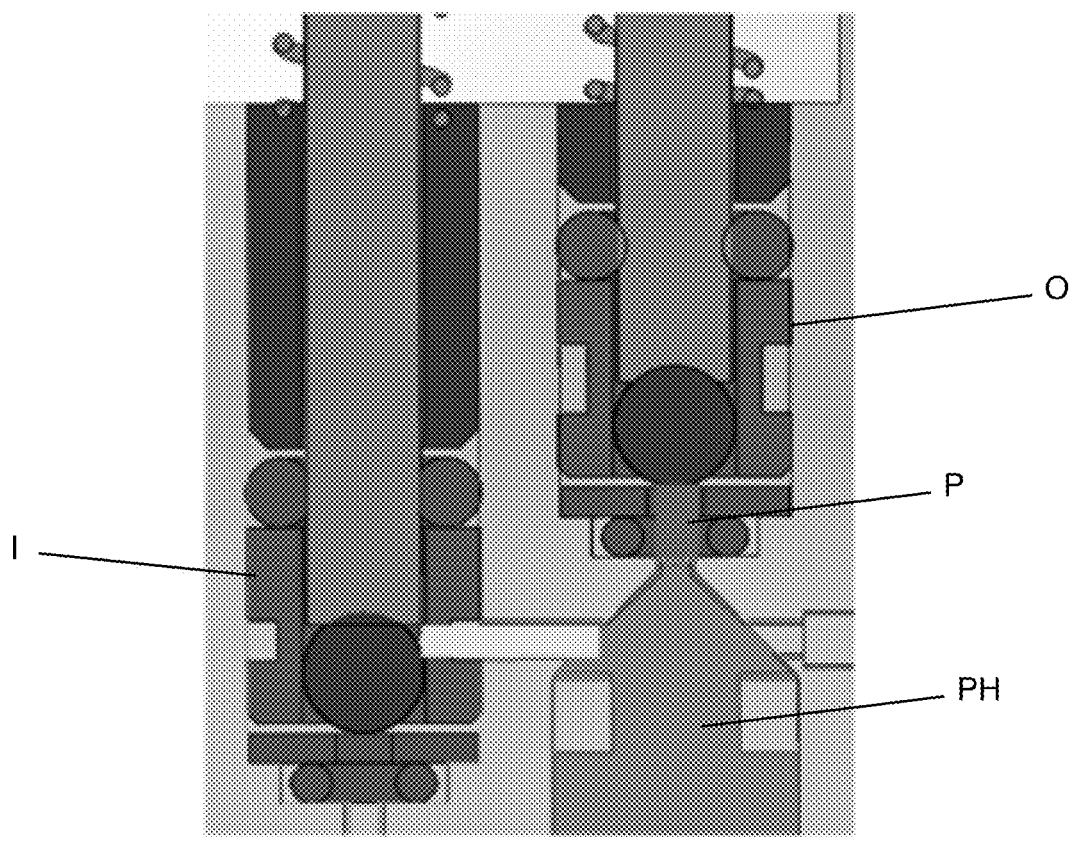
FIG. 17 is a partial cross-sectional side view of a pump in accordance with the principles of the present invention.

As shown in FIG. 17, a drug pump according to the present invention uses two pump valves. The dead volume is relatively small because the piston head comes up into the valve area. The piston head PH is pointed. It starts to penetrate the bottom of the output valve O and could actually be formed to take up more dead space. Note that the dead volume is just the port P from the ball to the tip of the piston head. It should be appreciated that the piston head could have an extended tip piece that fills the port P to take up the majority of the dead volume. Also, the dead area of the intake valve I is also small. It is the volume of the port from the piece to the piston head. It also includes the minimal area around the ball.

The pumps described herein can have a flow rate of 0 to 500 mL/hr or more with a volume of 0 to 1000 mL or more. In addition, the pumps of the present invention have particular advantages because one valve is always in a closed position and all valves are positively closed during each pump cycle. Moreover, because of the efficiency of the pumps, the pumps can run on small batters, such as button batteries. For example, a pump of the present invention can run on two Cr123 batteries for up to 3 days, on three Cr123 batteries for up to 5 days. A battery gauge on the pump could indicate remaining batter life.

The various components of the pump of the present invention may be comprised of plastic, metal or other materials known in the art. For example and not by way of limitation, the pump housing may be comprises of various plastic materials known in the art. The ball valves may be comprised of acetyl ball valves and the piston may be comprised of Delrin rod. Regardless of the materials, however, the drug pump of the present invention is configured to be so inexpensive to manufacture that it can be disposable. The pump could be used for medical and nonmedical applications. The drug pump of the present invention, however, is capable of drug infusion with better than ±5% accuracy. Such accuracy has been difficult to achieve unless highly complex and expensive pump systems are employed.

Because the drug delivery system of the present invention can be so inexpensively manufactured, while achieving highly accurate and reliable volumetric drug delivery, the drug pump could be sold in combination with an IV bag in a single sterilized package. Moreover, the drug pump could be calibrated for delivery of a specific drug requiring specific dosing. That way, a doctor or other health care provider does not need to program the delivery system. Simply activating the drug delivery system will dispense the drug according to the proper dosing requirements.

It is contemplated, and will be apparent to those skilled in the art from the foregoing specification, drawings, and examples that modifications and/or changes may be made in the embodiments of the invention. Accordingly, it is expressly intended that the foregoing are only illustrative of preferred embodiments and modes of operation, not limiting thereto, and that the true spirit and scope of the present invention be determined by reference to the appended claims.

While the present invention has been described with reference to certain illustrative embodiments to illustrate what is believed to be the best mode of the invention, it is contemplated that upon review of the present invention, those of skill in the art will appreciate that various modifications and combinations may be made to the present embodiments without departing from the spirit and scope of the invention as recited in the claims. The claims provided herein are intended to cover such modifications and combinations and all equivalents thereof. Reference herein to specific details of the illustrated embodiments is by way of example and not by way of limitation.

Thus, aspects and applications of the invention presented here are described in the drawings and in the foregoing detailed description of the invention. Those of ordinary skill in the art will realize that the description of the present invention is illustrative only and not in any way limiting. Other embodiments of the invention will readily suggest themselves to such skilled persons including, without limitation, combinations of elements of the various embodiments. Various representative implementations of the present invention may be applied to any valve.

Unless specifically noted, it is intended that the words and phrases in the specification and the claims be given their plain, ordinary, and accustomed meaning to those of ordinary skill in the applicable arts. It is noted that the inventor can be his own lexicographer. The inventor expressly elects, as his own lexicographer, to use the plain and ordinary meaning of terms in the specification and claims unless they clearly state otherwise in which case, the inventor will set forth the "special" definition of that term and explain how it differs from the plain and ordinary meaning. Absent such statements of the application of a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description of the Invention or claims is not intended to somehow indicate a desire to invoke the special provisions of 35 U.S.C. § 112(f) to define the invention. To the contrary, if the provisions of 35 U.S.C. § 112(f) are sought to be invoked to define the inventions, the claims will specifically and expressly state the exact phrases "means for" or "step for" and the specific function (e.g., "means for heating"), without also reciting in such phrases any structure, material or act in support of the function. Thus, even when the claims recite a "means for . . . " or "step for . . . " if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the illustrated embodiments, but in addition, include any and all structures, materials or acts that perform the claimed function as described in alternative embodiments or forms of the invention, or that are well known present or later-developed, equivalent structures, material or acts for performing the claimed function.

What is claimed is:

1. A pump, comprising:
   a pump housing;
   first and second valves housed within the pump housing, each valve comprising:
      a valve body defining an inner chamber in fluid communication with a valve inlet and a valve outlet:
      a valve head positioned within the inner chamber, the valve head moveable between a first position and a second position;
      a valve seal defining an aperture in fluid communication with the valve inlet and having a sealing surface, the valve seal being disc-shaped, having an outer rim portion that is fixed to the valve body and having a flexible inner portion around the aperture that can move from a resting position to a flexed position where the flexible inner portion extends into the inner chamber;
      a bi-directional sealing member positioned between the valve head and the valve seal, the bi-directional sealing member movable between a first closed position where the bi-directional sealing member engages with the sealing surface of the valve seal to seal the aperture and a second open position where the bi-directional sealing member car disengages from the sealing surface of the valve seal to allow flow through the aperture of the valve seal; and
      a cam engaged with a first surface of the valve head, whereby rotation of the cam causes movement of the valve head between the first position and the second position and whereby movement of the valve head to the first position holds the bi-directional sealing member in the first closed position;
   a piston and a piston chamber, the piston chamber in fluid communication with the outlet of the first valve and the inlet of the second valve above the piston;
   a cam shaft comprising first and second cams, with the first cam engaging a valve head of the first valve and the second cam engaging a valve head of the second valve,
   the first and second cams oriented to open the first valve when the second valve is closed and to close the second valve when the first valve is open; and
   a crankshaft coupled to the piston for moving the piston within the piston chamber, the crankshaft configured to move the piston in a first direction when the first valve is open and the second valve is closed to draw fluid through the first valve and into the piston chamber and to move the piston in a second direction when the second valve is open and the first valve is closed to force the fluid from the piston chamber through the second valve.

2. The pump of claim 1, wherein the crankshaft and cam shaft are integrally formed with the crank shaft extending from a distal end of the cam shaft.

3. The pump of claim 2, wherein the crankshaft further comprises a crank arm coupled thereto with the crank arm coupled to a crank member at a distal end of the crankshaft, the crank member extending from the crankshaft at a position offset from a center axis of the crankshaft so that as the crankshaft rotates, the crank arm moves in a circular motion, which motion is determined by a radial distance the crank member is from a center of rotation of the crankshaft.

4. The pump of claim 3, wherein a distal end of the crank arm is coupled to the piston to drive the piston vertically back and forth within a pump chamber as the crank arm pushes or pulls the piston as the crank member rotates.

5. The pump of claim 4, further comprising a pump body defining a vertical slot in a side of the pump body to provide an opening for the distal end of the crank arm to be coupled to the piston, the slot being sufficiently long enough to allow full range of motion of the crank arm with the piston sealed to the pump body above the slot.

6. The pump of claim 3, further comprising a priming pump in fluid communication with the inlet of the first valve.

7. The pump of claim 6, further comprising a check valve in fluid communication with an inlet of the pump housing to prevent back flow from the priming pump.

8. The pump of claim 7, further comprising a lever member pivotally attached to the pump housing, a first side of the lever coupled to the distal end of the crank arm, and further comprising a perpendicularly extending rod extending from the distal end of the crank arm, the rod engaging with a lever bar attached to and perpendicularly extending from a proximal end of the lever, the distal end of the lever being coupled to a body of a piston of the priming pump so that actuation of the priming pump is synchronized with the movement of the cam shaft.

9. The pump of claim 6, wherein, at a beginning of a pump cycle, fluid is drawn into the inlet of the pump housing by the priming pump and as the first valve opens, the direction of the priming pump is reversed so as to force fluid into the inlet of the first valve to provide an initial priming of fluid into the first valve and help offset a volume of empty space of the pump at the start up of the pump.

10. The pump of claim 1, wherein the inner chamber of each valve defines an inner cylindrical wall and the valve head is sized and shaped to slidably engage the inner cylindrical wall and the bidirectional sealing member is disc-shaped.

11. The pump of claim 10, wherein each valve further comprises a head seal interposed between the valve head and the inner cylindrical wall to form a slidable seal therein between.

12. The pump of claim 1, wherein the valve inlet of each valve is positioned below the sealing member and the outlet comprises a port in fluid communication with the inner chamber at a position above the sealing member.

13. The pump of claim 1, wherein the bi-directional sealing member comprises a flexible flap held in a fixed position along a first side relative to the inner chamber and sealed to one side of the sealing surface and having a second side that is free to move from a resting position on the sealing surface to a flexed position into the inner chamber where the second side disengages from the sealing surface with a change in fluid pressure between the inlet and the outlet to allow a flow through the inlet.

14. The pump of claim 1, wherein the valve head of each valve comprises a body portion having a distal end for engagement with the sealing member and a proximal end defining a cam engagement surface in contact with the cam, whereby rotation of the cam causes movement of the valve head between the first position and the second position.

15. The pump of claim 14, wherein the cam shaft comprises first and second cams, one for each of the first and second valves, each of the first and second cams have a generally cylindrical body with a semicircular side and a flat side that forms a chordally extending surface, the flat side of the first cam oriented 180 degrees from the flat side of the second cam.

16. The pump of claim 15, wherein the first and second cams of each of the first and second valves, for a respective valve, each force the valve head toward the sealing member when the semicircular side engages the valve head and allows the valve head to move in a direction away from the sealing member when the flat side engages the valve head.

17. The pump of claim 16, wherein each of the first and second valves comprise a biasing member interposed between the valve head and the inner chamber to apply a biasing force to bias the valve head away from the sealing member, the cam providing sufficient force against the valve head when the semicircular side of the cylindrical body forces the valve head toward the sealing member to overcome the biasing force of the biasing member.

18. The pump of claim 1, wherein the bi-directional sealing member comprises a spherical member interposed between a distal end of the valve head and the valve seal, the spherical member having a diameter greater than a diameter of the aperture of the valve seal.

19. The pump of claim 18, wherein when the valve head is in the first position, the distal end of the valve head forces the spherical member into engagement with the valve seal to seal the inlet and when the valve head is in the second position, the valve head moves in a direction away from the spherical member to open the inlet.

20. The pump of claim 19, wherein when the valve head is in transition between the first position and the second position, a pressure differential between the inlet and the outlet causes the inner portion to flex and seal against the spherical member until the valve head moves to the second position.

21. The pump of claim 1, further comprising a motor coupled to the cam shaft to control rotation of the cams and thereby control opening and closing of the first and second valves.

22. The pump of claim 1, wherein the cam of the first valve and the cam of the second valve are synchronized in their respective rotations such that when the first valve is open, the second valve is closed and when the second valve is open, the first valve is closed.

23. The pump of claim 1, wherein the crankshaft further comprises a crank arm coupled thereto with the crank arm coupled to a crank member at a distal end of the crankshaft, the crank member extending from the crankshaft at a position offset from a center axis of the crankshaft so that as the crankshaft rotates, the crank arm moves in a circular motion, which motion is determined by a radial distance the crank member is from a center of rotation of the crankshaft.

24. The pump of claim 23, wherein a distal end of the crank arm is coupled to the piston to drive the piston vertically back and forth within a pump chamber as the crank arm pushes or pulls the piston as the crank member rotates.

25. The pump of claim 24, further comprising a pump body defining a vertical slot in a side of the pump body to provide an opening for the distal end of the crank arm to be coupled to the piston, the slot being sufficiently long enough to allow full range of motion of the crank arm with the piston sealed to the pump body above the slot.

26. A pump, comprising:
a pump housing;
first and second valves housed within the pump housing, each valve comprising:

a valve body defining an inner chamber in fluid communication with a valve inlet and a valve outlet;
a valve head positioned within the inner chamber, the valve head moveable between a first position and a second position;
a valve seal defining an aperture in fluid communication with the valve inlet and having a sealing surface;
a bi-directional sealing member positioned between the valve head and the valve seal, the bi-directional sealing member movable between a first closed position where the bi-directional sealing member engages with the sealing surface of the valve seal to seal the aperture and a second open position where the bi-directional sealing member disengages from the sealing surface of the valve seal to allow flow through the aperture of the valve seal; and
a cam engaged with a first surface of the valve head, whereby rotation of the cam causes movement of the valve head between the first position and the second position and whereby movement of the valve head to the first position holds the bi-directional sealing member in the first closed position;
a piston and a piston chamber, the piston chamber in fluid communication with the outlet of the first valve and the inlet of the second valve above the piston;
a cam shaft comprising first and second cams, with the first cam engaging a valve head of the first valve and the second cam engaging a valve head of the second valve, the first and second cams oriented to open the first valve when the second valve is closed and to close the second valve when the first valve is open; and
a crankshaft coupled to the piston for moving the piston within the piston chamber, the crankshaft configured to move the piston in a first direction when the first valve is open and the second valve is closed to draw fluid through the first valve and into the piston chamber and to move the piston in a second direction when the second valve is open and the first valve is closed to force the fluid from the piston chamber through the second valve, the crankshaft comprising a crank arm coupled thereto with the crank arm coupled to a crank member at a distal end of the crankshaft, the crank member extending from the crankshaft at a position offset from a center axis of the crankshaft so that as the crankshaft rotates, the crank arm moves in a circular motion, which motion is determined by a radial distance the crank member is from a center of rotation of the crankshaft.

27. The pump of claim 26, wherein the crankshaft and cam shaft are integrally formed with the crank shaft extending from a distal end of the cam shaft.

28. The pump of claim 26, wherein the inner chamber of each valve defines an inner cylindrical wall and the valve head is sized and shaped to slidably engage the inner cylindrical wall and the bidirectional sealing member is disc-shaped.

29. The pump of claim 28, wherein the valve inlet of each valve is positioned below the sealing member and the outlet comprises a port in fluid communication with the inner chamber at a position above the sealing member.

30. The pump of claim 28, wherein each valve further comprises a head seal interposed between the valve head and the inner cylindrical wall to form a slidable seal therein between.

31. The pump of claim 26, wherein the bi-directional sealing member comprises a flexible flap held in a fixed position along a first side relative to the inner chamber and sealed to one side of the sealing surface and having a second side that is free to move from a resting position on the sealing surface to a flexed position into the inner chamber where the second side disengages from the sealing surface with a change in fluid pressure between the inlet and the outlet to allow a flow through the inlet.

32. The pump of claim 26, wherein the valve seal of each valve is disc-shaped having an outer rim portion that is fixed to the sealing surface, defines a central aperture that is in fluid communication with the inlet, and has a flexible inner portion around the aperture that can move from a resting position to a flexed position where the flexible portion extends into the inner chamber.

33. The pump of claim 26, wherein the valve head of each valve comprises a body portion having a distal end for engagement with the sealing member and a proximal end defining a cam engagement surface in contact with the cam, whereby rotation of the cam causes movement of the valve head between the first position and the second position.

34. The pump of claim 33, wherein the cam shaft comprises first and second cams, one for each of the first and second valves, each of the first and second cams have a generally cylindrical body with a semicircular side and a flat side that forms a chordally extending surface, the flat side of the first cam oriented 180 degrees from the flat side of the second cam.

35. The pump of claim 34, wherein the first and second cams of each of the first and second valves, for a respective valve, each force the valve head toward the sealing member when the semicircular side engages the valve head and allows the valve head to move in a direction away from the sealing member when the flat side engages the valve head.

36. The pump of claim 35, wherein each of the first and second valves comprise a biasing member interposed between the valve head and the inner chamber to apply a biasing force to bias the valve head away from the sealing member, the cam providing sufficient force against the valve head when the semicircular side of the cylindrical body forces the valve head toward the sealing member to overcome the biasing force of the biasing member.

37. The pump of claim 1, wherein the bi-directional sealing member comprises a spherical member interposed between a distal end of the valve head and the valve seal, the spherical member having a diameter greater than a diameter of the aperture of the valve seal.

38. The pump of claim 18, wherein when the valve head is in the first position, the distal end of the valve head forces the spherical member into engagement with the valve seal to seal the inlet and when the valve head is in the second position, the valve head moves in a direction away from the spherical member to open the inlet.

39. The pump of claim 38, wherein when the valve head is in transition between the first position and the second position, a pressure differential between the inlet and the outlet causes the inner portion to flex and seal against the spherical member until the valve head moves to the second position.

40. The pump of claim 26, further comprising a motor coupled to the cam shaft to control rotation of the cams and thereby control opening and closing of the first and second valves.

41. The pump of claim 26, wherein the cam of the first valve and the cam of the second valve are synchronized in their respective rotations such that when the first valve is open, the second valve is closed and when the second valve is open, the first valve is closed.

42. The pump of claim 26, wherein a distal end of the crank arm is coupled to the piston to drive the piston vertically back and forth within a pump chamber as the crank arm pushes or pulls the piston as the crank member rotates.

43. The pump of claim 42, further comprising a pump body defining a vertical slot in a side of the pump body to provide an opening for the distal end of the crank arm to be coupled to the piston, the slot being sufficiently long enough to allow full range of motion of the crank arm with the piston sealed to the pump body above the slot.

44. The pump of claim 43, further comprising a priming pump in fluid communication with the inlet of the first valve.

45. The pump of claim 44, further comprising a check valve in fluid communication with an inlet of the pump housing to prevent back flow from the priming pump.

46. The pump of claim 44, further comprising a lever member pivotally attached to the pump housing, a first side of the lever coupled to the distal end of the crank arm, and further comprising a perpendicularly extending rod extending from the distal end of the crank arm, the rod engaging with a lever bar attached to and perpendicularly extending from a proximal end of the lever, the distal end of the lever being coupled to a body of a piston of the priming pump so that actuation of the priming pump is synchronized with the movement of the cam shaft.

47. The pump of claim 44, wherein, at a beginning of a pump cycle, fluid is drawn into the inlet of the pump housing by the priming pump and as the first valve opens, the direction of the priming pump is reversed so as to force fluid into the inlet of the first valve to provide an initial priming of fluid into the first valve and help offset a volume of empty space of the pump at the start up of the pump.

48. A pump, comprising:
a pump housing;
first and second valves housed within the pump housing, each valve comprising:
 a valve body defining an inner chamber in fluid communication with a valve inlet and a valve outlet:
 a valve head positioned within the inner chamber, the valve head moveable between a first position and a second position;
 a valve seal defining an aperture in fluid communication with the valve inlet and having a sealing surface;
 a bi-directional sealing member positioned between the valve head and the valve seal, the bi-directional sealing member movable between a first closed position where the bi-directional sealing member engages with the sealing surface of the valve seal to seal the aperture and a second open position where the bi-directional sealing member car disengages from the sealing surface of the valve seal to allow flow through the aperture of the valve seal; and
 a cam engaged with a first surface of the valve head, whereby rotation of the cam causes movement of the valve head between the first position and the second position and whereby movement of the valve head to the first position holds the bi-directional sealing member in the first closed position;
a piston and a piston chamber, the piston chamber in fluid communication with the outlet of the first valve and the inlet of the second valve above the piston;
a cam shaft comprising first and second cams, with the first cam engaging a valve head of the first valve and the second cam engaging a valve head of the second valve, the first and second cams oriented to open the first valve when the second valve is closed and to close the second valve when the first valve is open; and
a crankshaft coupled to the piston for moving the piston within the piston chamber, the crankshaft configured to move the piston in a first direction when the first valve is open and the second valve is closed to draw fluid through the first valve and into the piston chamber and to move the piston in a second direction when the second valve is open and the first valve is closed to force the fluid from the piston chamber through the second valve, wherein the crankshaft further comprises a crank arm coupled thereto with the crank arm coupled to a crank member at a distal end of the crankshaft; and
a priming pump in fluid communication with the inlet of the first valve; and
a lever member pivotally attached to the pump housing, a first side of the lever coupled to a distal end of the crank arm, and further comprising a perpendicularly extending rod extending from the distal end of the crank arm, the rod engaging with a lever bar attached to and perpendicularly extending from a proximal end of the lever, the distal end of the lever being coupled to a body of a piston of the priming pump so that actuation of the priming pump is synchronized with the movement of the cam shaft.

49. The pump of claim 48, wherein the crankshaft and cam shaft are integrally formed with the crank shaft extending from a distal end of the cam shaft.

50. The pump of claim 48, wherein the inner chamber of each valve defines an inner cylindrical wall and the valve head is sized and shaped to slidably engage the inner cylindrical wall and the bidirectional sealing member is disc-shaped.

51. The pump of claim 50, wherein each valve further comprises a head seal interposed between the valve head and the inner cylindrical wall to form a slidable seal therein between.

52. The pump of claim 48, wherein the valve inlet of each valve is positioned below the sealing member and the outlet comprises a port in fluid communication with the inner chamber at a position above the sealing member.

53. The pump of claim 48, wherein the bi-directional sealing member comprises a flexible flap held in a fixed position along a first side relative to the inner chamber and sealed to one side of the sealing surface and having a second side that is free to move from a resting position on the sealing surface to a flexed position into the inner chamber where the second side disengages from the sealing surface with a change in fluid pressure between the inlet and the outlet to allow a flow through the inlet.

54. The pump of claim 48, wherein the valve seal of each valve is disc-shaped having an outer rim portion that is fixed to the sealing surface, defines a central aperture that is in fluid communication with the inlet, and has a flexible inner portion around the aperture that can move from a resting position to a flexed position where the flexible portion extends into the inner chamber.

55. The pump of claim 48, wherein the valve head of each valve comprises a body portion having a distal end for engagement with the sealing member and a proximal end defining a cam engagement surface in contact with the cam, whereby rotation of the cam causes movement of the valve head between the first position and the second position.

56. The pump of claim 55, wherein the cam shaft comprises first and second cams, one for each of the first and second valves, each of the first and second cams have a generally cylindrical body with a semicircular side and a flat side that forms a chordally extending surface, the flat side of the first cam oriented 180 degrees from the flat side of the second cam.

57. The pump of claim 56, wherein the first and second cams of each of the first and second valves, for a respective valve, each force the valve head toward the sealing member when the semicircular side engages the valve head and allows the valve head to move in a direction away from the sealing member when the flat side engages the valve head.

58. The pump of claim 57, wherein each of the first and second valves comprise a biasing member interposed between the valve head and the inner chamber to apply a biasing force to bias the valve head away from the sealing member, the cam providing sufficient force against the valve head when the semicircular side of the cylindrical body forces the valve head toward the sealing member to overcome the biasing force of the biasing member.

59. The pump of claim 1, wherein the bi-directional sealing member comprises a spherical member interposed between a distal end of the valve head and the valve seal, the spherical member having a diameter greater than a diameter of the aperture of the valve seal.

60. The pump of claim 18, wherein when the valve head is in the first position, the distal end of the valve head forces the spherical member into engagement with the valve seal to seal the inlet and when the valve head is in the second position, the valve head moves in a direction away from the spherical member to open the inlet.

61. The pump of claim 60, wherein when the valve head is in transition between the first position and the second position, a pressure differential between the inlet and the outlet causes the inner portion to flex and seal against the spherical member until the valve head moves to the second position.

62. The pump of claim 48, further comprising a motor coupled to the cam shaft to control rotation of the cams and thereby control opening and closing of the first and second valves.

63. The pump of claim 48, wherein the cam of the first valve and the cam of the second valve are synchronized in their respective rotations such that when the first valve is open, the second valve is closed and when the second valve is open, the first valve is closed.

64. The pump of claim 48, further comprising a check valve in fluid communication with an inlet of the pump housing to prevent back flow from the priming pump.

65. The pump of claim 48, wherein, at a beginning of a pump cycle, fluid is drawn into the inlet of the pump housing by the priming pump and as the first valve opens, the direction of the priming pump is reversed so as to force fluid into the inlet of the first valve to provide an initial priming of fluid into the first valve and help offset a volume of empty space of the pump at the start up of the pump.

* * * * *